(12) United States Patent
Kataoka et al.

(10) Patent No.: US 8,712,977 B2
(45) Date of Patent: Apr. 29, 2014

(54) COMPUTER PRODUCT, INFORMATION RETRIEVAL METHOD, AND INFORMATION RETRIEVAL APPARATUS

(75) Inventors: Masahiro Kataoka, Kawasaki (JP);
Masahiro Kurishima, Kawasaki (JP);
Takashi Tsubokura, Yokohama (JP);
Ryouta Komatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 451 days.

(21) Appl. No.: 12/623,025

(22) Filed: Nov. 20, 2009

(65) Prior Publication Data
US 2010/0131476 A1  May 27, 2010

Related U.S. Application Data

(63) Continuation of application No. PCT/JP2008/059585, filed on May 23, 2008.

(30) Foreign Application Priority Data

May 24, 2007  (WO) .................. PCT/JP2007/060647

(51) Int. Cl.
*G06F 17/30*  (2006.01)
(52) U.S. Cl.
USPC .... 707/693; 707/769; 707/780; 707/E17.002; 707/E17.014
(58) Field of Classification Search
USPC .......................................... 707/693, 769, 780
See application file for complete search history.

(56) References Cited

U.S. PATENT DOCUMENTS

| | | | |
|---|---|---|---|
| 4,700,175 A | 10/1987 | Bledsoe | |
| 4,797,855 A * | 1/1989 | Duncan et al. | ................. 715/236 |
| 4,862,167 A * | 8/1989 | Copeland, III | ................ 341/107 |
| 4,955,066 A | 9/1990 | Notenboom | |
| 5,351,047 A | 9/1994 | Behlen | |

(Continued)

FOREIGN PATENT DOCUMENTS

| | | |
|---|---|---|
| JP | A 4-363970 | 12/1992 |
| JP | A 6-189140 | 7/1994 |

(Continued)

OTHER PUBLICATIONS

Tomohiko Uematsu, "Introduction of document data compression algorithm," CQ Publishing Co., Ltd., pp. 51-53, Oct. 15, 1994.

(Continued)

*Primary Examiner* — Shyue Jiunn Hwa
(74) *Attorney, Agent, or Firm* — Greer Burns & Crain, Ltd.

(57) ABSTRACT

A computer-readable recording medium stores therein an information retrieval program that causes a computer to execute a retrieval process in which files to be retrieved are narrowed down by using a bit string for each character in the files to find characters making up a retrieval keyword to retrieve a keyword identical to or related to the retrieval keyword in the files to be retrieved. The bit strings indicate the presence of the characters in the files. The information retrieval program causes the computer to execute extracting, from among the bit strings, a bit string of an arbitrary character; and compressing the extracted bit string, by using a special Huffman tree having leaves of plural types of symbol strings covering patterns represented by a predetermined number of bits and a special symbol string having a number of bits greater than the predetermined number of bits.

12 Claims, 88 Drawing Sheets

(56) References Cited

U.S. PATENT DOCUMENTS

| | | |
|---|---|---|
| 5,696,507 A | 12/1997 | Nam |
| 5,745,745 A | 4/1998 | Tada et al. |
| 5,748,953 A | 5/1998 | Mizutani et al. |
| 5,796,356 A | 8/1998 | Okada et al. |
| 5,802,534 A | 9/1998 | Hatayama et al. |
| 5,812,076 A * | 9/1998 | Yoshida .................. 341/106 |
| 5,970,177 A | 10/1999 | Chinnock |
| 6,215,906 B1 * | 4/2001 | Okada .................. 382/239 |
| 6,240,455 B1 | 5/2001 | Kamasaka et al. |
| 6,518,895 B1 | 2/2003 | Weiss et al. |
| 6,529,912 B2 | 3/2003 | Satoh et al. |
| 6,563,440 B1 | 5/2003 | Kangas |
| 6,771,824 B1 | 8/2004 | Chiu et al. |
| 7,043,088 B2 | 5/2006 | Chiu et al. |
| 7,283,591 B2 | 10/2007 | Ruehle |
| 7,348,901 B2 | 3/2008 | De Martin et al. |
| 7,365,658 B2 | 4/2008 | Todorov et al. |
| 7,539,692 B2 | 5/2009 | Min et al. |
| 7,856,595 B2 | 12/2010 | Itani |
| 2002/0063641 A1 * | 5/2002 | Fish .................. 341/87 |
| 2002/0099685 A1 | 7/2002 | Takano et al. |
| 2004/0223608 A1 * | 11/2004 | Oommen et al. ............... 380/28 |
| 2007/0273564 A1 | 11/2007 | Morel |
| 2008/0098024 A1 | 4/2008 | Kataoka et al. |

FOREIGN PATENT DOCUMENTS

| | | |
|---|---|---|
| JP | A 8-147311 | 6/1996 |
| JP | A 11-161672 | 6/1999 |
| JP | A 2001-211082 | 8/2001 |
| JP | A 2001-229067 | 8/2001 |
| WO | WO 2006-123448 A1 | 11/2006 |
| WO | WO 2008-142799 A1 | 11/2008 |

OTHER PUBLICATIONS

Haruhiko Okumura, "Data compression algorithm," C Magazine, vol. 10, No. 10, pp. 52 to 63, Oct. 1, 1998.

Satoru Yamazaki, "LZ77 (sliding dictionary) compression/Huffman coding Algorithm and implementation used in ZIP/LHA," C Magazine, vol. 18, No. 1, pp. 48 to 64, Jan. 1, 2006.

Toman-Vojtech, Compression of XML Data, Mar. 20, 2003, Dept. of Software Engineering, Master Thesis, Faculty of Mathematics and Physics, Charles University, Prague, pp. 1-123.

* cited by examiner

FIG.9

| CHARACTER DATA | APPEARANCE FREQUENCY (NUMBER OF TIMES) | APPEARANCE FILE COUNT | APPEARANCE ORDER | APPEARANCE MAP |
|---|---|---|---|---|
| A | 1,238 | 230 | 102 | 1011000110110011011101... |
| : | : | : | : | : |
| z | 635 | 157 | 135 | 1000101111000101001...0110111001 |
| あ | 14,397 | 382 | 58 | 1110110111111001111... |
| : | : | : | : | : |
| ん | 5,392 | 436 | 72 | 1011111101111101101... |
| 申 | 14,397 | 382 | 1,249 | 1110111110111101101... |
| : | : | : | : | : |
| 運 | 5,392 | 436 | 4,531 | 1011111101111001111... |
| : | : | : | : | : |
| NON-STANDARD CHARACTER 1 | 14,397 | 382 | 6,731 | 1110110111111001111... |
| : | : | : | : | : |
| NON-STANDARD CHARACTER n | 5,392 | 436 | 6,940 | 1011111101111101101... |
| CONSECUTIVE CHARACTER/ NON-STANDARD CHARACTER 1 | 1,238 | 230 | 1,235 | 1011000110110011011101... |
| : | : | : | : | : |
| CONSECUTIVE CHARACTER/ NON-STANDARD CHARACTER 256 | 635 | 157 | 2,045 | 1000101111000101001...0110111001 |

900 901 902 903 904

SEGMENT 0 (16-BIT BOUNDARY)

FIG.10

| CHARACTER DATA (900) | APPEARANCE FREQUENCY (NUMBER OF TIMES) (901) | APPEARANCE MAP (904) |
|---|---|---|
| 日 | 14,397 | 1101110111111001111··· |
| 月 | 8,372 | 1011111110111101101··· |
|   | 5,742 | 1011111110111101101··· <br> 1101110111111001111··· |
| 甘 | 2,843 | 1011111110111101101··· <br> 1101110111111001111··· |
| ｆ | 268 | 1011111110111101101··· |
| CONSECUTIVE CHARACTER/ NON-STANDARD CHARACTER 1 | 3,238 | 1011100011010011011101··· |
| CONSECUTIVE CHARACTER/ NON-STANDARD CHARACTER 256 | 335 | 1000101111000101010011···0110111001 |

FIG.15B

| COMPRESSED BLOCK DATA | | ORIGINAL UNCOMPRESSED BLOCK DATA | | |
|---|---|---|---|---|
| | OFFSET | LENGTH | OFFSET | NUMBER OF CHARACTERS | LENGTH |
| C1 | 100 | 1780 | 0 | 4000 | 3575 |
| C2 | 1880 | 1695 | 3575 | 4000 | 3275 |
| . | . | . | . | . | . |
| . | . | . | . | . | . |
| . | . | . | . | . | . |
| Cm | 16420 | 160 | 32770 | 352 | 320 |

| CHARACTER TYPE | CHAR-ACTER DATA | FILE NUMBER | | | | | | APPEARANCE RATE (COMPRESSION PARAMETER) | AREA |
|---|---|---|---|---|---|---|---|---|---|
| | | 0 | 1 | 2 | 3 | ... | i | ... | n | | |
| HIRAGANA | あ | 1 | 1 | 1 | 0 | ... | 0 | ... | 1 | 0.673 | A' |
| | ... | | | | | | | | | ... | ... |
| | ん | 1 | 1 | 1 | 1 | ... | 1 | ... | 1 | 0.815 | B' |
| KATAKANA | ア | 1 | 0 | 1 | 0 | ... | 1 | ... | 1 | 0.041 | A' |
| | ... | | | | | | | | | ... | ... |
| | ン | 0 | 0 | 1 | 1 | ... | 0 | ... | 1 | 0.297 | B |
| NUMERIC CHARACTER | 0 | 1 | 1 | 1 | 1 | ... | 0 | ... | 1 | 0.907 | C' |
| | ... | | | | | | | | | ... | ... |
| | 9 | 0 | 1 | 0 | 1 | ... | 0 | ... | 0 | 0.541 | A' |
| ALPHABET (UPPER CASE) | A | 0 | 0 | 0 | 1 | ... | 1 | ... | 0 | 0.298 | A |
| | ... | | | | | | | | | ... | ... |
| | Z | 1 | 0 | 0 | 0 | ... | 0 | ... | 0 | 0.114 | C |
| ALPHABET (LOWER CASE) | a | 1 | 1 | 1 | 0 | ... | 1 | ... | 1 | 0.316 | A |
| | ... | | | | | | | | | | |
| | z | 1 | 0 | 0 | 0 | ... | 0 | ... | 0 | 0.157 | B |
| KANJI | 足 | 0 | 0 | 0 | 0 | ... | 1 | ... | 0 | 0.103 | C |
| | 岡 | 0 | 0 | 0 | 1 | ... | 0 | ... | 0 | 0.085 | C |
| | ... | | | | | | | | | ... | ... |
| | 濱 | 1 | 0 | 0 | 0 | ... | 0 | ... | 0 | 0.032 | D |
| | 楓 | 0 | 0 | 0 | 0 | ... | 0 | ... | 0 | 0.028 | E |
| NON-STANDARD CHARACTER | ... | | | | | | | | | ... | ... |
| CONSECUTIVE, NON-STANDARD CHARACTER | | | | | | | | | | | |

FIG.16C

| AREA | COMPRESSION PATTERN | COMPRESSION RATE |
|---|---|---|
| E | 16+1(64-BIT)-TYPE HUFFMAN TREE | 7 % |
| D | 16+1(32-BIT)-TYPE HUFFMAN TREE | 14 % |
| C | 16+1(16-BIT)-TYPE HUFFMAN TREE | 28 % |
| B | 16-TYPE HUFFMAN TREE | 64 % |
| A | NOT COMPRESSED | 100 % |
| A' | NOT COMPRESSED | 100 % |
| B' | 16-TYPE HUFFMAN TREE | 64 % |
| C' | 16+1(16-BIT)-TYPE HUFFMAN TREE | 28 % |
| D' | 16+1(32-BIT)-TYPE HUFFMAN TREE | 14 % |
| E' | 16+1(64-BIT)-TYPE HUFFMAN TREE | 7 % |

FIG.16D

AREA A (AREA A')
APPEARANCE RATE: 0.5 ~ 0.25
AVERAGE APPEARANCE RATE (CENTER): √(1/2)÷2= 0.35355   0.64645

| SYMBOL STRING | OCCURRENCE PROBABILITY | CODE LENGTH | CODE WORD | QUANTITY | CODE LENGTH (SUBTOTAL) | OCCURRENCE PROBABILITY (REFERENCE) | OCCURRENCE PROBABILITY (SUBTOTAL) |
|---|---|---|---|---|---|---|---|
| [1111] | 0.0156244 | 10 | ... | 1 | 0.156244006 | 0.000976563 | 0.000976563 |
| [1110], [1101], [1011], [0111] | 0.0285685 | 8 | ... | 4 | 0.914192055 | 0.00390625 | 0.015625 |
| [1100], [0110], [0011]... | 0.0522362 | 5 | ... | 6 | 1.567085952 | 0.03125 | 0.1875 |
| [1000], [0100], [0010], [0001] | 0.0955115 | 3 | ... | 4 | 1.146137988 | 0.125 | 0.5 |
| [0000] | 0.174463841 | 2 | | 1 | 0.349276812 | 0.25 | 0.25 |
| | | | | AVERAGE CODE LENGTH | 1.033234203 | OCCURRENCE PROBABILITY (TOTAL) | 0.954101563 |

| NOT COMPRESSED (100 %) |
|---|

FIG.16E

AREA B (AREA B')
APPEARANCE RATE: 0.25 ~ 0.125
AVERAGE APPEARANCE RATE (CENTER): √(1/2)÷4= 0.176775  0.82323

| SYMBOL STRING | OCCURRENCE PROBABILITY | CODE LENGTH | CODE WORD | QUANTITY | CODE LENGTH (SUBTOTAL) | OCCURRENCE PROBABILITY (REFERENCE) | OCCURRENCE PROBABILITY (SUBTOTAL) |
|---|---|---|---|---|---|---|---|
| [1111] | 0.00097653 | 10 | ... | 1 | 0.00976525 | 0.000976563 | 0.000976563 |
| [1110], [1101], [1011], [0111] | 0.00454759 | 8 | ... | 4 | 0.145522808 | 0.00390625 | 0.015625 |
| [1100], [0110], [0011]... | 0.0211777 | 6 | ... | 6 | 0.762397203 | 0.015625 | 0.09375 |
| [1000], [0100] | 0.09862261 | 4 | ... | 2 | 0.788980892 | 0.0625 | 0.125 |
| [0010], [0001] | 0.09862261 | 3 | ... | 2 | 0.591735669 | 0.125 | 0.25 |
| [0000] | 0.45927648 | 1 | ... | 1 | 0.459276478 | 0.5 | 0.5 |
| | | | | AVERAGE CODE LENGTH | 0.689419575 | OCCURRENCE PROBABILITY (TOTAL) | 0.985351563 |

| 16-TYPE HUFFMAN TREE | (67 %) |
|---|---|

FIG.16F

AREA C (AREA C')
APPEARANCE RATE: 0.125 ~ 0.0625
AVERAGE APPEARANCE RATE (CENTER): $\sqrt{(1/2)} \div 8 = 0.0883875$  0.91161

| SYMBOL STRING | OCCURRENCE PROBABILITY | CODE LENGTH | CODE WORD | QUANTITY | CODE LENGTH (SUBTOTAL) | OCCURRENCE PROBABILITY (REFERENCE) | OCCURRENCE PROBABILITY (SUBTOTAL) |
|---|---|---|---|---|---|---|---|
| [1111] | 6.1033E-05 | 13 | ... | 1 | 0.000793427 | 0.00012207 | 0.00012207 |
| [1110], [1101], [1011], [0111] | 0.00062948 | 10 | ... | 4 | 0.025179251 | 0.000976563 | 0.00390625 |
| [1100], [0110], [0011]... | 0.00649235 | 7 | ... | 6 | 0.2726789 | 0.00012207 | 0.000732422 |
| [0001] | 0.06696096 | 4 | ... | 1 | 0.267843836 | 0.0625 | 0.0625 |
| [1000], [0100], [0010] | 0.01339219 | 3 | ... | 3 | 0.120529726 | 0.125 | 0.375 |
| [0000] | 0.17265577 | 2 | | 1 | 0.345311539 | 0.25 | 0.25 |
| [0000000000000000]16-BIT | 0.22749107 | 0.5 | | 1 | 0.113745533 | 0.25 | 0.25 |
| | | | | AVERAGE CODE LENGTH | 0.286520553 | OCCURRENCE PROBABILITY (TOTAL) | 0.942260742 |

| 16+1(16-BIT)-TYPE HUFFMAN TREE | (28 %) |
|---|---|

FIG.16G

AREA D (AREA D')
APPEARANCE RATE: 0.0625 ~ 0.0315
AVERAGE APPEARANCE RATE (CENTER): $\sqrt{(1/2)} \div 16 =$  0.04419375   0.95581

| SYMBOL STRING | OCCURRENCE PROBABILITY | CODE LENGTH | CODE WORD | QUANTITY | CODE LENGTH (SUBTOTAL) | OCCURRENCE PROBABILITY (REFERENCE) | OCCURRENCE PROBABILITY (SUBTOTAL) |
|---|---|---|---|---|---|---|---|
| [1111] | 3.8146E-06 | 13 | ... | 1 | 4.95892E-05 | 0.00012207 | 0.00012207 |
| [1110], [1101], [1011], [0111] | 8.25E-05 | 10 | ... | 4 | 0.003299988 | 0.000976563 | 0.00390625 |
| [1100], [0110], [0011]... | 0.00178427 | 7 | ... | 6 | 0.074493949 | 0.00012207 | 0.000732422 |
| [0001] | 0.03858962 | 4 | ... | 1 | 0.154358462 | 0.0625 | 0.0625 |
| [1000], [0100], [0010] | 0.00771792 | 3 | ... | 3 | 0.069461308 | 0.125 | 0.375 |
| [0000] | 0.10432526 | 2 | ... | 1 | 0.208650521 | 0.25 | 0.25 |
| [0000······0000]32-BIT | 0.235541586 | 0.25 | ... | 1 | 0.058853964 | 0.25 | 0.25 |
| | | | | AVERAGE CODE LENGTH | 0.142403331 | OCCURRENCE PROBABILITY (TOTAL) | 0.942260742 |

| 16+1(32-BIT)-TYPE HUFFMAN TREE |
|---|
| (14 %) |

FIG.16H

AREA E (AREA E')
APPEARANCE RATE: 0.0315 ~
AVERAGE APPEARANCE RATE (CENTER): √(1/2)÷132= 0.02209688 0.9779

| SYMBOL STRING | OCCURRENCE PROBABILITY | CODE LENGTH | CODE WORD | QUANTITY | CODE LENGTH (SUBTOTAL) | OCCURRENCE PROBABILITY (REFERENCE) | OCCURRENCE PROBABILITY (SUBTOTAL) |
|---|---|---|---|---|---|---|---|
| [1111] | 2.3841E-07 | 13 | ... | 1 | 3.09932E-06 | 0.00012207 | 0.00012207 |
| [1110], [1101], [1011], [0111] | 1.0551E-05 | 10 | ... | 4 | 0.000422035 | 0.000976563 | 0.00390625 |
| [1100], [0110], [0011] ... | 0.00046693 | 7 | ... | 6 | 0.019611133 | 0.00012207 | 0.000732422 |
| [0001] | 0.02066419 | 4 | ... | 1 | 0.082656755 | 0.0625 | 0.0625 |
| [1000], [0100], [0010] | 0.004413284 | 3 | ... | 3 | 0.037719554 | 0.125 | 0.375 |
| [0000] | 0.0571562 | 2 | ... | 1 | 0.114312402 | 0.25 | 0.25 |
| [0000·······0000]64-BIT | 0.23929486 | 0.125 | ... | 1 | 0.029911858 | 0.25 | 0.25 |
|  |  |  | AVERAGE CODE LENGTH | | 0.0710028205 | OCCURRENCE PROBABILITY (TOTAL) | 0.942260742 |

| 16+1(64-BIT)-TYPE HUFFMAN TREE |
|---|
| (7 %) |

FIG.16I

| SYMBOL STRING | CODE WORD |
|---|---|
| 0000000000000000 | 00 |
| 0000 | 01 |
| 0010 | 100 |
| 0100 | 101 |
| 1000 | 110 |
| 0001 | 1110 |
| 0111 | 111100 |
| 1011 | 111101 |
| 1101 | 1111100 |
| 1110 | 1111101 |
| 0011 | 11111100 |
| 0101 | 111111010 |
| 0110 | 111111011 |
| 1001 | 111111100 |
| 1010 | 1111111101 |
| 1100 | 1111111110 |
| 1111 | 1111111111 |

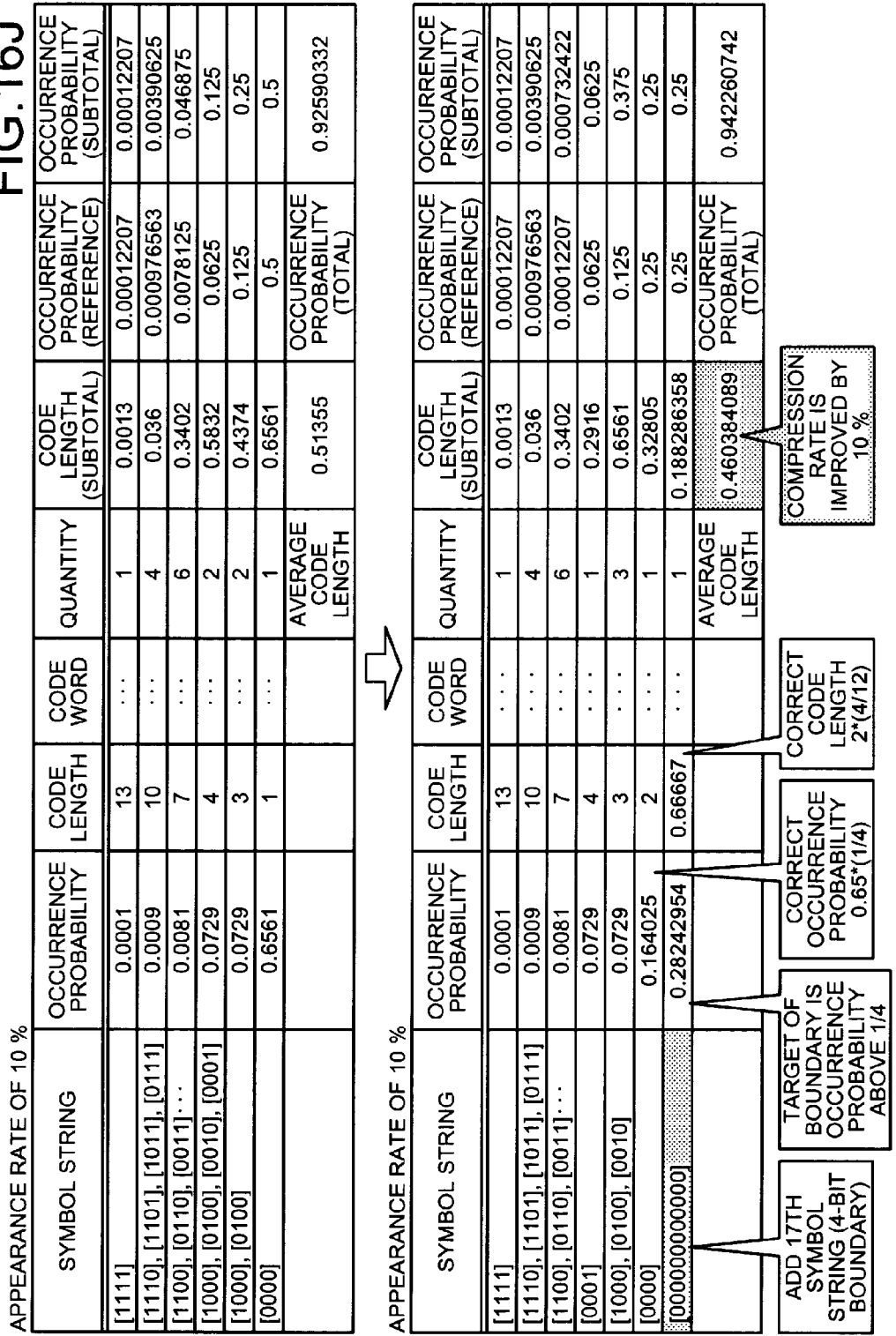

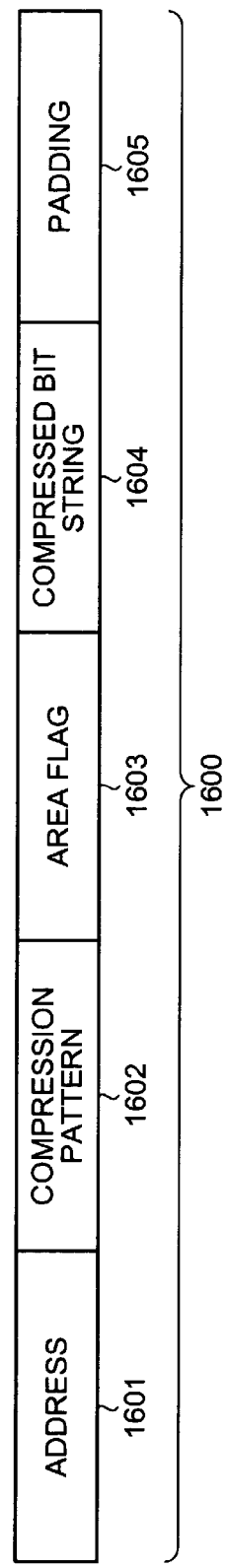

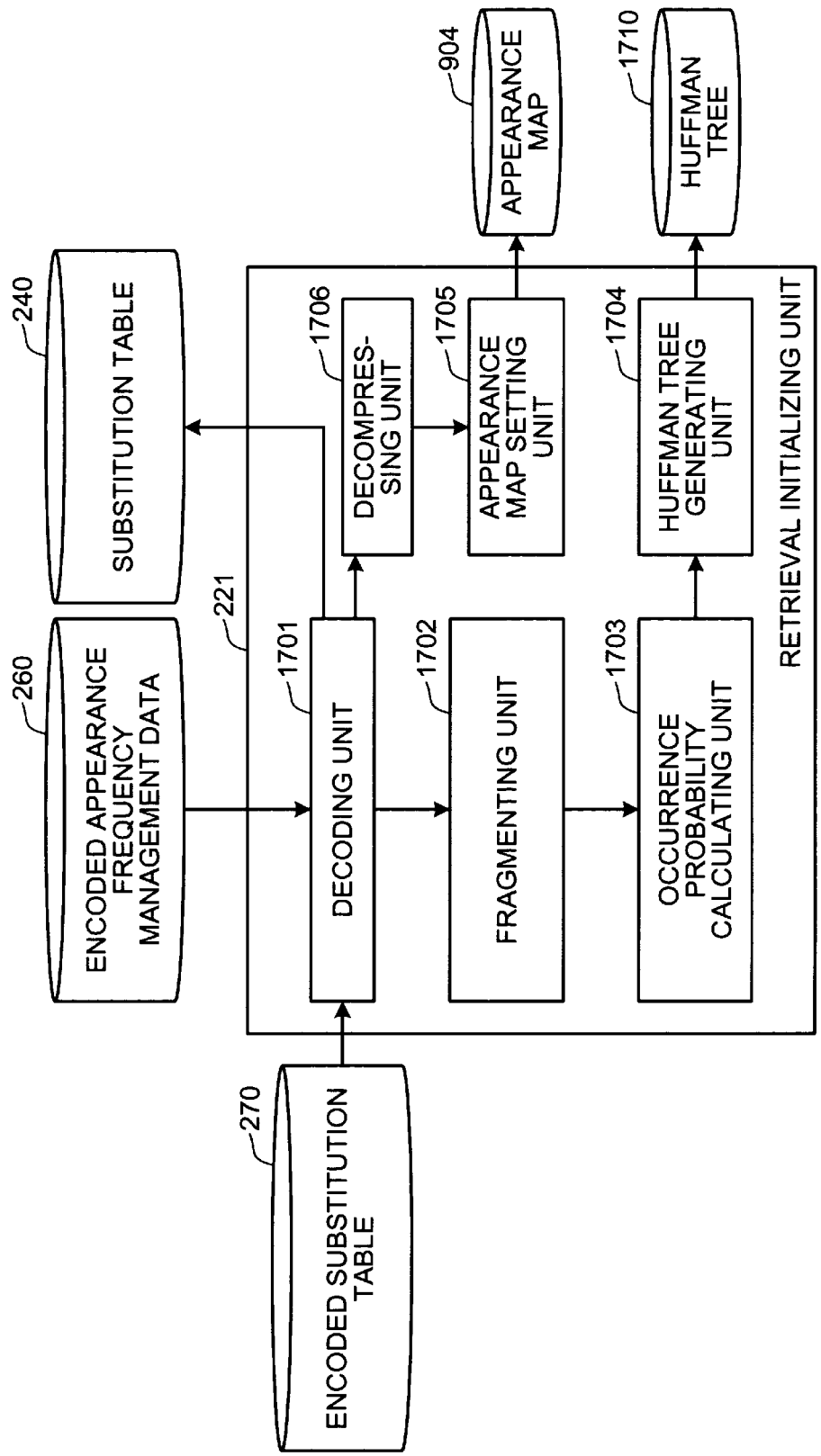

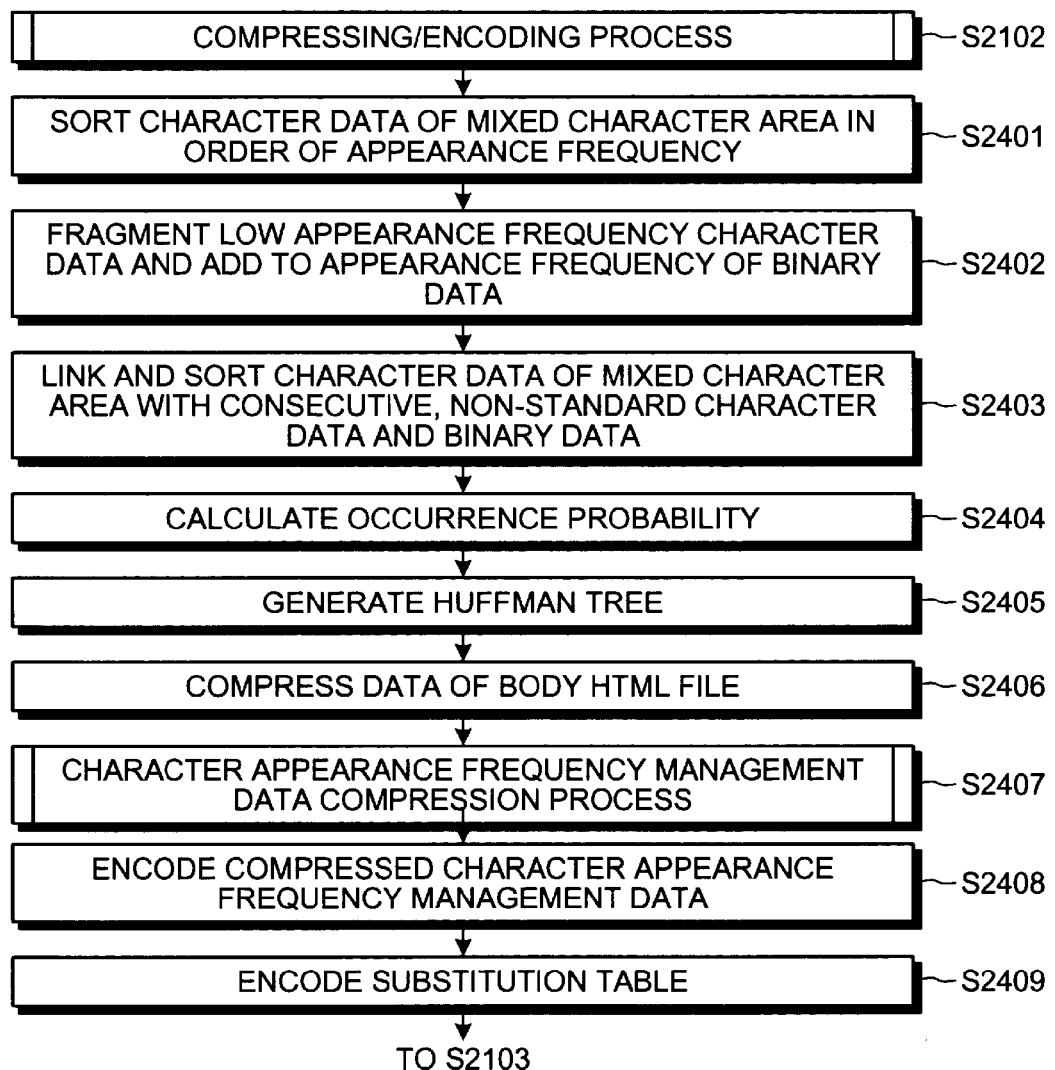

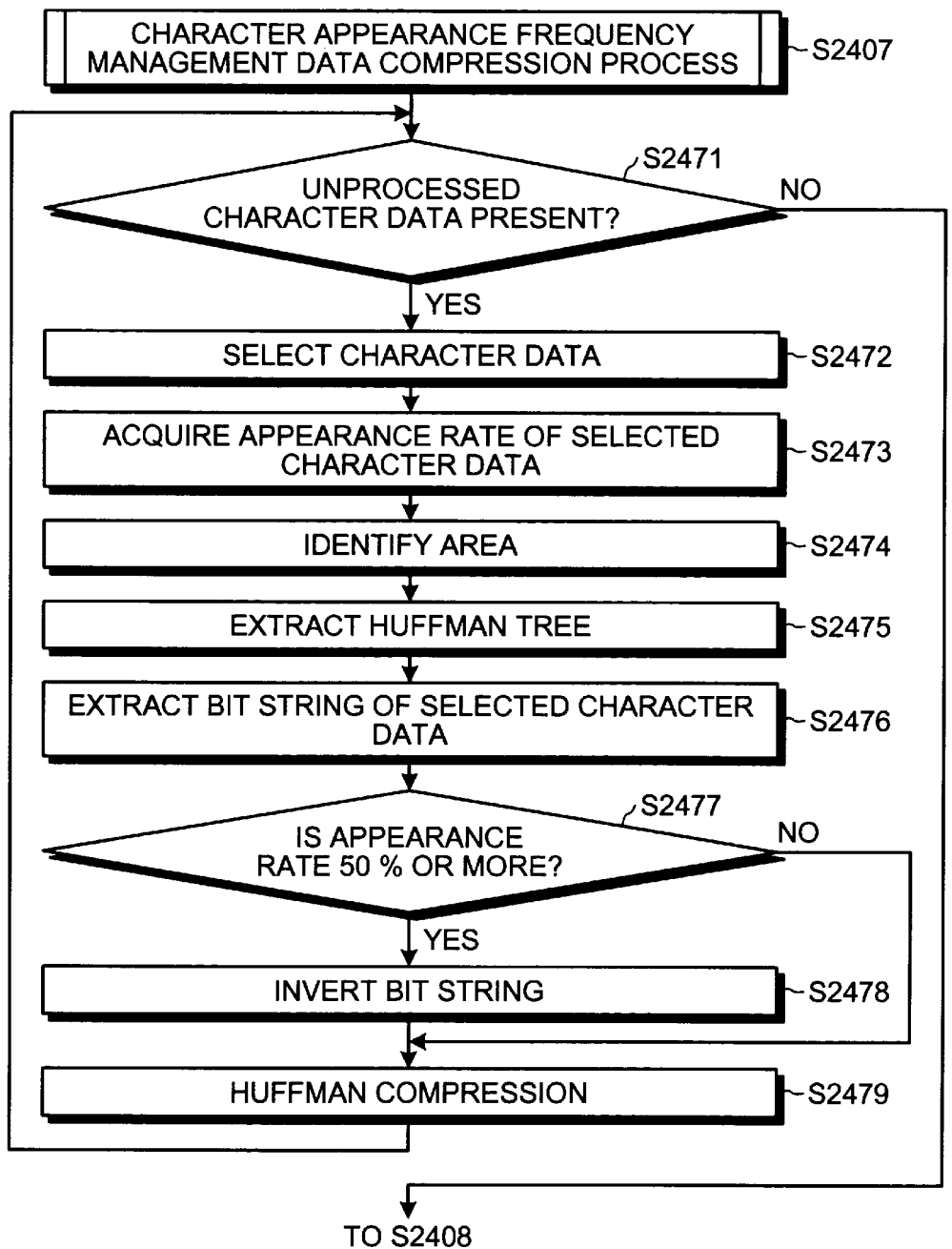

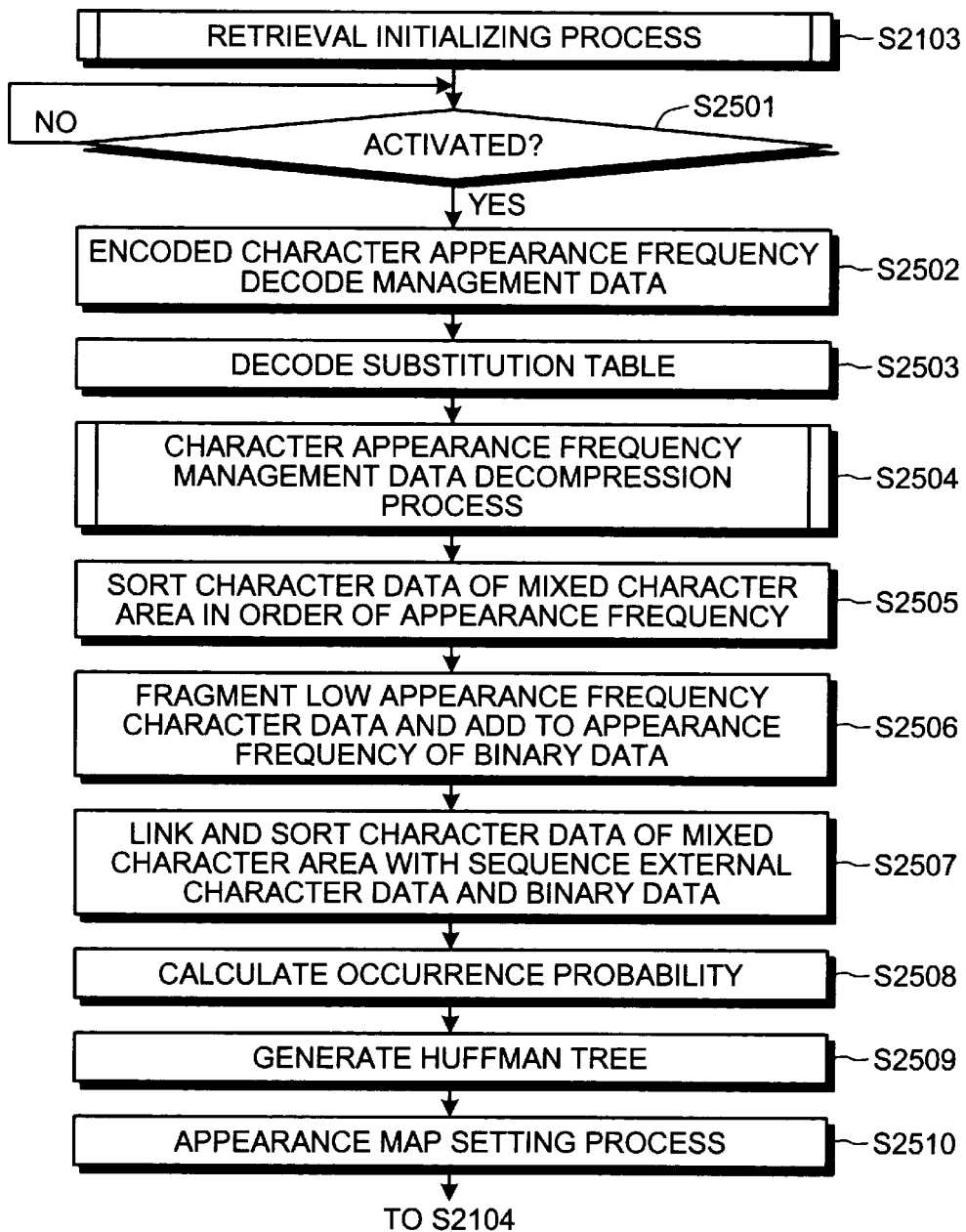

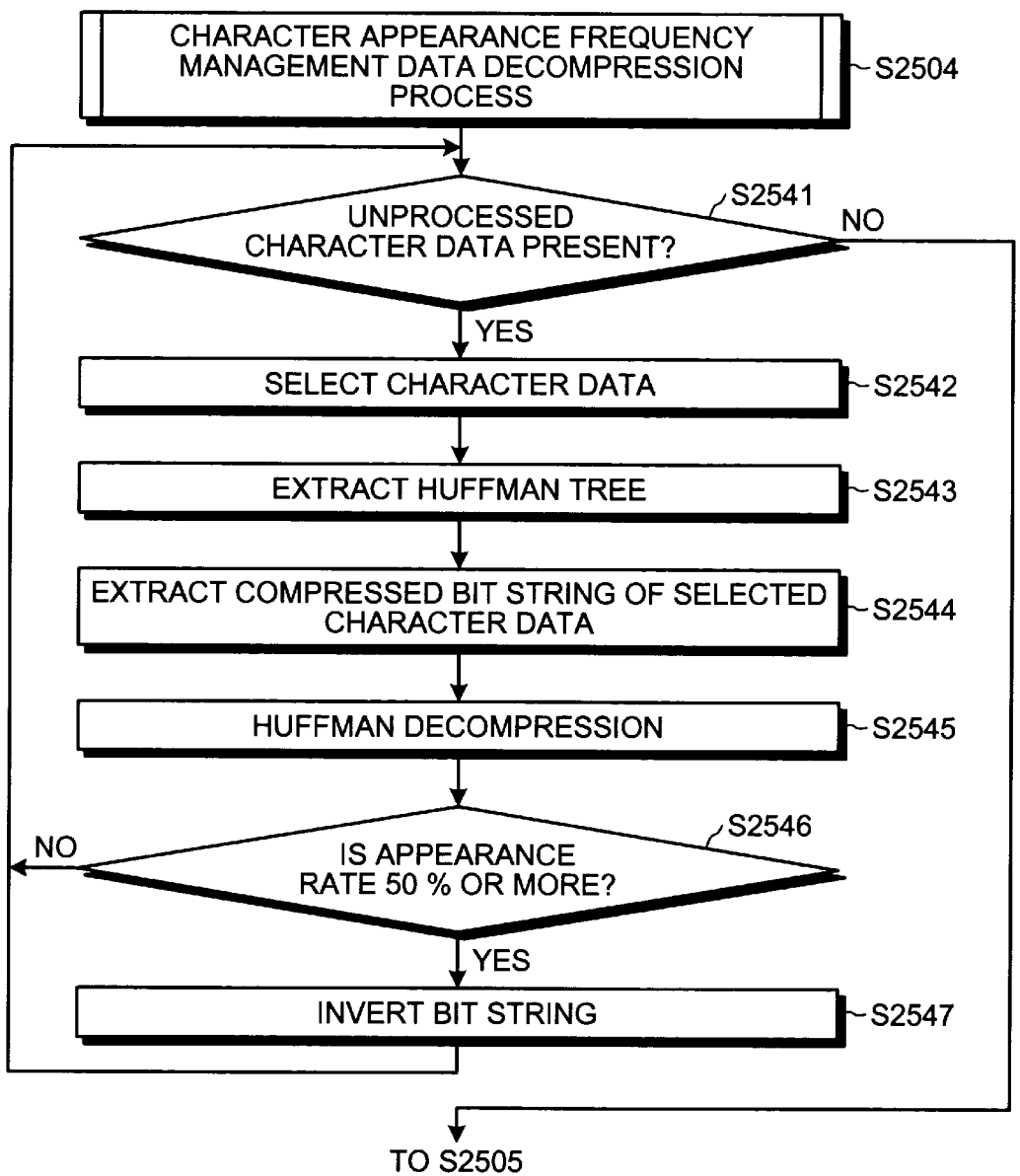

FIG.27

| SECOND EMBODIMENT | A(A') | B(B') | C(C') | | D(D') | | E(E') | | |
|---|---|---|---|---|---|---|---|---|---|
| FIRST EMBODIMENT | A(A') | B(B') | C(C') | D(D') | E(E') | F(F') | G(G') | H(H') | I(I') |
| APPEARANCE PROBABILITY OF ONE CHARACTER | ~1/4 | ~1/8 | ~1/16 | ~1/32 | ~1/64 | ~1/128 | ~1/256 | ~1/512 | ~1/1024 |
| DISTRIBUTION (%) | 1.7 | 1.8 | 3.2 | 2.8 | 2.1 | 1.9 | 1.6 | 82 | - |
| NUMBER OF LEAVES | NOT COMPRESSED | 16 TYPES | 16 TYPES | 16+1 TYPES | 16 TYPES | 16+2 TYPES | 16+2 TYPES | 16+3 TYPES | 16+3 TYPES |
| 0-BIT LENGTH 1 | - | - | - | 16 | - | 64 | 64 | 256 | 256 |
| 0-BIT LENGTH 2 | - | - | - | - | - | 16 | 16 | 64 | 64 |
| 0-BIT LENGTH 3 | - | - | - | - | - | - | - | 16 | 16 |

FIG.29A

<AREA B>

| TYPE OF DECOMPRESSION CODE | QUANTITY | APPEARANCE RATE | CORRECTION | COMPRESSED CODE LENGTH | RELATIONSHIP WITH BRANCH |
|---|---|---|---|---|---|
| 4 ZEROS "0000" | 1 | 0.53 | 0.5 | 1 | ALLOCATE 8 BRANCHES CORRESPONDING TO 50 % OF 16 BRANCHES |
| 1 ONES "0001"..."1000" | 4 | 0.084 | 0.0625 | 4 | ALLOCATE ONE OF 16 BRANCHES TO 4 TYPES |
| 2 ONES "0000"..."0000" | 6 | 0.015 | 0.015625 | 6 | ALLOCATED TO LOWER STAGE |
| 3 ONES "0111"..."1110" | 4 | 0.0061 | 0.003906 | 8 | ALLOCATED TO LOWER STAGE |
| 4 ONES "1111" | 1 | 0.0043 | 0.003906 | 8 | ALLOCATED TO LOWER STAGE |

| DECOM-PRESSION CODE | COMPRES-SED CODE LENGTH | COMPRESSED CODE | LEAF NUMBER |
|---|---|---|---|
| "0000" | 1 | "0" | 0 ~ 7 |
| "0001" | 4 | "1100" | A |
| "0010" | 4 | "1101" | B |
| "0011" | 6 | "111000" | E0 ~ E3 |
| "0100" | 4 | "1110" | C |
| "0101" | 6 | "111001" | E4 ~ E7 |
| "0110" | 6 | "111010" | E8 ~ EB |
| "0111" | 8 | "11111000" | F8 |
| "1000" | 4 | "1111" | D |
| "1001" | 6 | "111011" | EC ~ EF |
| "1010" | 6 | "111100" | F0 ~ F3 |
| "1011" | 8 | "11111001" | F9 |
| "1100" | 6 | "111101" | F4 ~ F7 |
| "1101" | 8 | "11111010" | FA |
| "1110" | 8 | "11111011" | FB |
| "1111" | 8 | "11111100" | FC |

FIG.30A

<AREA C>

| TYPE OF DECOMPRESSION CODE | QUANTITY | APPEARANCE RATE | CORRECTION | COMPRESSED CODE LENGTH | RELATIONSHIP WITH BRANCH |
|---|---|---|---|---|---|
| 4 ZEROS "0000" | 1 | 0.53 | 0.5 | 1 | ALLOCATE 8 BRANCHES CORRESPONDING TO 50 % OF 16 BRANCHES |
| 1 ONES "0001"..."1000" | 4 | 0.084 | 0.0625 | 4 | ALLOCATE ONE OF 16 BRANCHES TO 4 TYPES |
| 2 ONES "0011"..."1100" | 6 | 0.015 | 0.015625 | 6 | ALLOCATED TO LOWER STAGE |
| 3 ONES "0111"..."1110" | 4 | 0.0061 | 0.003906 | 8 | ALLOCATED TO LOWER STAGE |
| 4 ONES "1111" | 1 | 0.0043 | 0.003906 | 8 | ALLOCATED TO LOWER STAGE |
| "0000...0" (16 ZEROS) | 1 | | 0.136719 | 3 | ALLOCATE 2 BRANCHES CORRESPONDING TO 12.5 % OF 16 BRANCHES |

FIG.30C

| DECOM-PRESSION CODE | COMPRES-SED CODE LENGTH | COMPRESSED CODE | LEAF NUMBER |
|---|---|---|---|
| "0000" | 1 | "0" | 0 ~ 7 |
| "0001" | 4 | "1100" | A |
| "0010" | 4 | "1101" | B |
| "0011" | 6 | "111000" | E0 ~ E3 |
| "0100" | 4 | "1110" | C |
| "0101" | 6 | "111001" | E4 ~ E7 |
| "0110" | 6 | "111010" | E8 ~ EB |
| "0111" | 8 | "11111000" | F8 |
| 16 ZEROS | 3 | "100" | 8, 9 |
| "1000" | 4 | "1111" | D |
| "1001" | 6 | "111011" | EC ~ EF |
| "1010" | 6 | "111100" | F0 ~ F3 |
| "1011" | 8 | "11111001" | F9 |
| "1100" | 6 | "111101" | F4 ~ F7 |
| "1101" | 8 | "11111010" | FA |
| "1110" | 8 | "11111011" | FB |
| "1111" | 8 | "11111100" | FC |

<AREA D>

| TYPE OF DECOMPRESSION CODE | QUANTITY | APPEARANCE RATE | CORRECTION | COMPRESSED CODE LENGTH | RELATIONSHIP WITH BRANCH |
|---|---|---|---|---|---|
| 4 ZEROS "0000" | 1 | 0.977925 | 0.5 | 1 | ALLOCATE 8 BRANCHES CORRESPONDING TO 50 % OF 16 BRANCHES |
| 1 ONES "0001"..."1000" | 4 | 0.021 | 0.015625 | 4 | ALLOCATE ONE OF 16 BRANCHES TO 4 TYPES |
| 2 ONES "0011"..."1100" | 6 | 0.00375 | 0.003906 | 6 | ALLOCATED TO LOWER STAGE |
| 3 ONES "0111"..."1110" | 4 | 0.001525 | 0.003906 | 8 | ALLOCATED TO LOWER STAGE |
| 4 ONES "1111" | 1 | 0.001075 | 0.003906 | 8 | ALLOCATED TO LOWER STAGE |
| 16 ZEROS "0000····0" | 1 | | 0.25 | 2 | ALLOCATE 4 BRANCHES CORRESPONDING TO 25 % OF 16 BRANCHES |
| 64 ZEROS "0000····0" | 1 | | 0.144531 | 3 | ALLOCATE 2 BRANCHES CORRESPONDING TO 12.5 % OF 16 BRANCHES |

| DECOM-PRESSION CODE | COMPRES-SED CODE LENGTH | COMPRESSED CODE | LEAF NUMBER |
|---|---|---|---|
| "0000" | 1 | "0" | 0 ~ 7 |
| "0001" | 6 | "111000" | E0 ~ E3 |
| "0010" | 6 | "111001" | E4 ~ E7 |
| "0011" | 8 | "11110000" | F0 |
| "0100" | 6 | "111010" | E8 ~ EB |
| "0101" | 8 | "11110001" | F1 |
| "0110" | 8 | "11110010" | F2 |
| "0111" | 8 | "11110110" | F6 |
| 16 ZEROS | 2 | "10" | 8 ~ B |
| "1000" | 6 | "111011" | EC ~ EF |
| "1001" | 8 | "11110011" | F3 |
| "1010" | 8 | "11110100" | F4 |
| "1011" | 8 | "11110111" | F7 |
| "1100" | 8 | "11110101" | F5 |
| "1101" | 8 | "11111000" | F8 |
| "1110" | 8 | "11111001" | F9 |
| "1111" | 8 | "11111010" | FA |
| 64 ZEROS | 3 | "110" | C, D |

FIG.32A

<AREA E>

| TYPE OF DECOMPRESSION CODE | QUANTITY | APPEARANCE RATE | CORRECTION | COMPRESSED CODE LENGTH | RELATIONSHIP WITH BRANCH |
|---|---|---|---|---|---|
| 4 ZEROS "0000" | 1 | 0.994481 | 0.5 | 1 | ALLOCATE 8 BRANCHES CORRESPONDING TO 50 % OF 16 BRANCHES |
| 1 ONES "0001"..."1000" | 4 | 0.00525 | 0.003906 | 8 | ALLOCATED TO LOWER STAGE |
| 2 ONES "0011"..."1100" | 6 | 0.000938 | 0.003906 | 8 | ALLOCATED TO LOWER STAGE |
| 3 ONES "0111"..."1110" | 4 | 0.00381 | 0.003906 | 8 | ALLOCATED TO LOWER STAGE |
| 4 ONES "1111" | 1 | 0.00269 | 0.003906 | 8 | ALLOCATED TO LOWER STAGE |
| 16 ZEROS "0000...0" | 1 | | 0.25 | 2 | ALLOCATE 4 BRANCHES CORRESPONDING TO 25 % OF 16 BRANCHES |
| 64 ZEROS "0000...0" | 1 | | 0.125 | 3 | ALLOCATE 2 BRANCHES CORRESPONDING TO 12.5 % OF 16 BRANCHES |
| 256 ZEROS "0000...0" | 1 | | 0.066406 | 4 | ALLOCATE 1 BRANCHES CORRESPONDING TO 6.25 % OF 16 BRANCHES |

| DECOM-PRESSION CODE | COMPRES-SED CODE LENGTH | COMPRESSED CODE | LEAF NUMBER |
|---|---|---|---|
| "0000" | 1 | "0" | 0 ~ 7 |
| "0001" | 8 | "11110000" | F0 |
| "0010" | 8 | "11110001" | F1 |
| "0011" | 8 | "11111000" | F4 |
| "0100" | 8 | "11110010" | F2 |
| "0101" | 8 | "11110101" | F5 |
| "0110" | 8 | "11110110" | F6 |
| "0111" | 8 | "11111010" | FA |
| 16 ZEROS | 2 | "10" | 8 ~ B |
| 256 ZEROS | 4 | "1110" | E |
| "1000" | 8 | "11110011" | F3 |
| "1001" | 8 | "11110111" | F7 |
| "1010" | 8 | "11111000" | F8 |
| "1011" | 8 | "11111011" | FB |
| "1100" | 8 | "11111001" | F9 |
| "1101" | 8 | "11111100" | FC |
| "1110" | 8 | "11111101" | FD |
| "1111" | 8 | "11111110" | FE |
| 64 ZEROS | 3 | "110" | C, D |

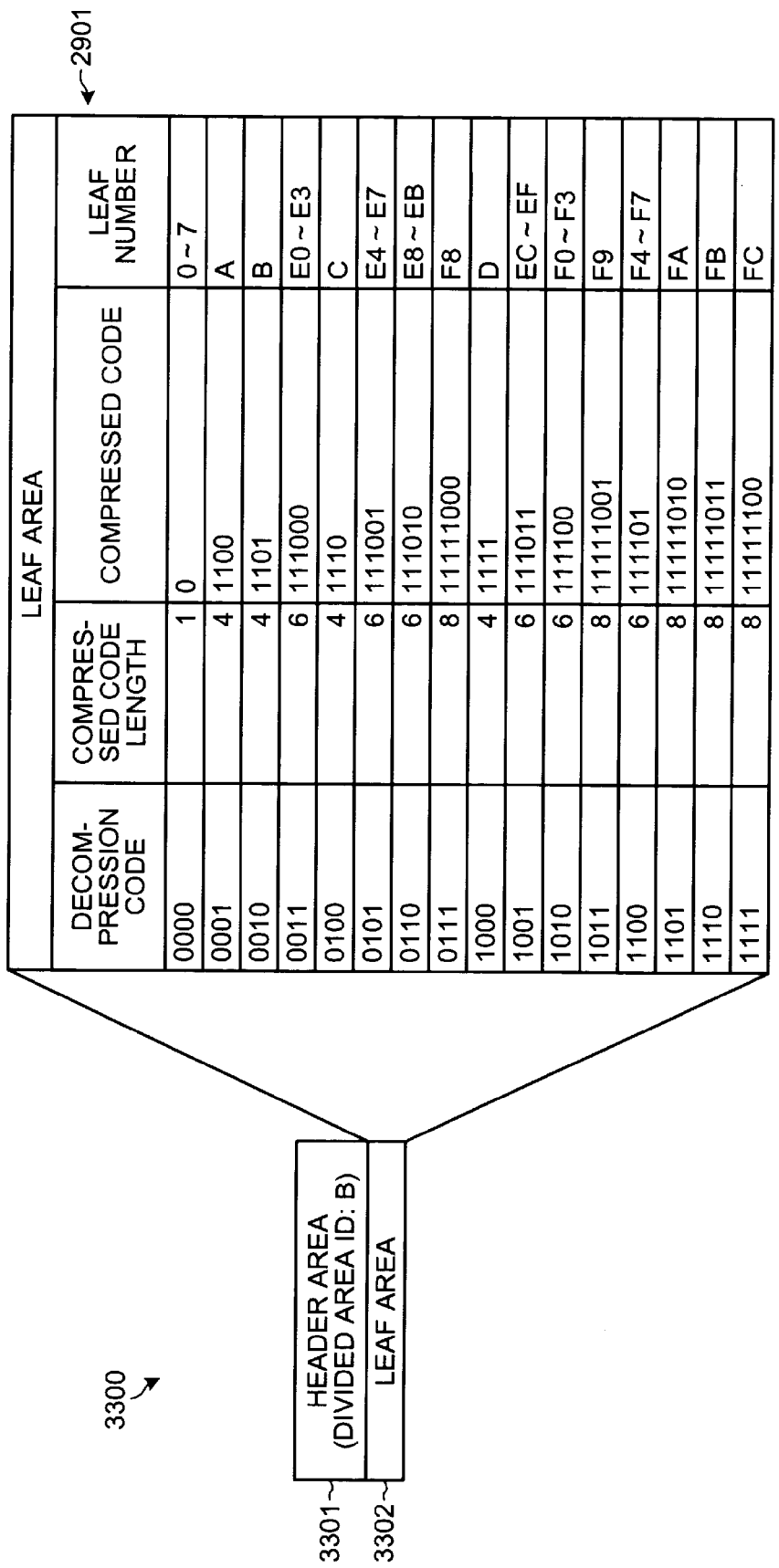

FIG.37A

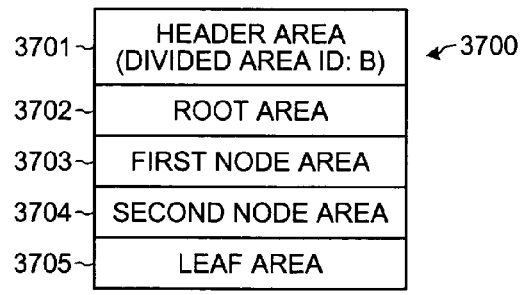

- 3701 — HEADER AREA (DIVIDED AREA ID: B)
- 3700
- 3702 — ROOT AREA
- 3703 — FIRST NODE AREA
- 3704 — SECOND NODE AREA
- 3705 — LEAF AREA

FIG.37B

| ROOT AREA 3702 |||
|---|---|---|
| NODE/LEAF IDENTIFYING FLAG | 0 ||
| NODE SIZE | 16 ||
| LEAF NUMBER | 0 | POINTER TO DECOMPRESSION CODE "0000" |
| | 1 | |
| | 2 | |
| | 3 | |
| | 4 | |
| | 5 | |
| | 6 | |
| | 7 | |
| | 8 | |
| | 9 | |
| | A | POINTER TO DECOMPRESSION CODE "0001" |
| | B | POINTER TO DECOMPRESSION CODE "0010" |
| | C | POINTER TO DECOMPRESSION CODE "0100" |
| | D | POINTER TO DECOMPRESSION CODE "1000" |
| NODE NUMBER | E | POINTER TO NODE N(E) |
| | F | POINTER TO NODE N(F) |

| FIRST NODE AREA(E) | | |
|---|---|---|
| NODE/LEAF IDENTIFYING FLAG | | 0 |
| NODE SIZE | | 16 |
| LEAF NUMBER | E0 | POINTER TO DECOMPRESSION CODE "0011" |
| | E1 | |
| | E2 | |
| | E3 | |
| | E4 | POINTER TO DECOMPRESSION CODE "0101" |
| | E5 | |
| | E6 | |
| | E7 | |
| | E8 | POINTER TO DECOMPRESSION CODE "0110" |
| | E9 | |
| | EA | |
| | EB | |
| | EC | POINTER TO DECOMPRESSION CODE "1001" |
| | ED | |
| | EE | |
| | EF | |

FIG.37D

| SECOND NODE AREA(F) 3704 | | |
|---|---|---|
| NODE/LEAF IDENTIFYING FLAG | | 0 |
| NODE SIZE | | 16 |
| LEAF NUMBER | F0 | POINTER TO DECOMPRESSION CODE "1010" |
| | F1 | |
| | F2 | |
| | F3 | |
| | F4 | POINTER TO DECOMPRESSION CODE "1100" |
| | F5 | |
| | F6 | |
| | F7 | |
| | F8 | POINTER TO DECOMPRESSION CODE "0111" |
| | F9 | POINTER TO DECOMPRESSION CODE "1011" |
| | FA | POINTER TO DECOMPRESSION CODE "1101" |
| | FB | POINTER TO DECOMPRESSION CODE "1110" |
| | FC | POINTER TO DECOMPRESSION CODE "1111" |
| | FD | |
| | FE | |
| | FF | |

LEAF AREA (3705)

| NODE/LEAF IDENTIFYING FLAG | LEAF TYPE FLAG | DECOMPRESSION CODE (LEAF NUMBER) | COMPRESSED CODE LENGTH |
|---|---|---|---|
| 1 | 0 | 0000(0~7) | 1 |
| 1 | 0 | 0001(A) | 4 |
| 1 | 0 | 0010(B) | 4 |
| 1 | 0 | 0011(E0~E3) | 6 |
| 1 | 0 | 0100(C) | 4 |
| 1 | 0 | 0101(E4~E7) | 6 |
| 1 | 0 | 0110(E8~EB) | 6 |
| 1 | 0 | 0111(F8) | 8 |
| 1 | 0 | 1000(D) | 4 |
| 1 | 0 | 1001(EC~EF) | 6 |
| 1 | 0 | 1010(F0~F3) | 6 |
| 1 | 0 | 1011(F9) | 8 |
| 1 | 0 | 1100(F4~F7) | 6 |
| 1 | 0 | 1101(FA) | 8 |
| 1 | 0 | 1110(FB) | 8 |
| 1 | 0 | 1111(FC) | 8 |

- 3801 — HEADER AREA (DIVIDED AREA ID: C) ← 3800
- 3802 — ROOT AREA
- 3803 — FIRST NODE AREA
- 3804 — SECOND NODE AREA
- 3805 — FIRST LEAF AREA
- 3806 — SECOND LEAF AREA

FIG.38B

| ROOT AREA | | | 3802 |
|---|---|---|---|
| NODE/LEAF IDENTIFYING FLAG | | 0 | |
| NODE SIZE | | 16 | |
| LEAF NUMBER | 0 | POINTER TO DECOMPRESSION CODE "0000" | |
| | 1 | | |
| | 2 | | |
| | 3 | | |
| | 4 | | |
| | 5 | | |
| | 6 | | |
| | 7 | | |
| | 8 | POINTER TO DECOMPRESSION CODE "0000···00" (16 ZEROS) | |
| | 9 | | |
| | A | POINTER TO DECOMPRESSION CODE "0001" | |
| | B | POINTER TO DECOMPRESSION CODE "0010" | |
| | C | POINTER TO DECOMPRESSION CODE "0100" | |
| | D | POINTER TO DECOMPRESSION CODE "1000" | |
| NODE NUMBER | E | POINTER TO NODE N(E) | |
| | F | POINTER TO NODE N(F) | |

| FIRST NODE AREA(E) | | |
|---|---|---|
| NODE/LEAF IDENTIFYING FLAG | | 0 |
| NODE SIZE | | 16 |
| LEAF NUMBER | E0 | POINTER TO DECOMPRESSION CODE "0011" |
| | E1 | |
| | E2 | |
| | E3 | |
| | E4 | POINTER TO DECOMPRESSION CODE "0101" |
| | E5 | |
| | E6 | |
| | E7 | |
| | E8 | POINTER TO DECOMPRESSION CODE "0110" |
| | E9 | |
| | EA | |
| | EB | |
| | EC | POINTER TO DECOMPRESSION CODE "1001" |
| | ED | |
| | EE | |
| | EF | |

FIG.38D

| SECOND NODE AREA(F) 3804 | | |
|---|---|---|
| NODE/LEAF IDENTIFYING FLAG | | 0 |
| NODE SIZE | | 16 |
| LEAF NUMBER | F0 | POINTER TO DECOMPRESSION CODE "1010" |
| | F1 | |
| | F2 | |
| | F3 | |
| | F4 | POINTER TO DECOMPRESSION CODE "1100" |
| | F5 | |
| | F6 | |
| | F7 | |
| | F8 | POINTER TO DECOMPRESSION CODE "0111" |
| | F9 | POINTER TO DECOMPRESSION CODE "1011" |
| | FA | POINTER TO DECOMPRESSION CODE "1101" |
| | FB | POINTER TO DECOMPRESSION CODE "1110" |
| | FC | POINTER TO DECOMPRESSION CODE "1111" |
| | FD | |
| | FE | |
| | FF | |

FIG.38E

FIRST LEAF AREA — 3805

| NODE/LEAF IDENTIFYING FLAG | LEAF TYPE FLAG | DECOMPRESSION CODE (LEAF NUMBER) | COMPRESSED CODE LENGTH |
|---|---|---|---|
| 1 | 0 | 0000(0 ~ 7) | 1 |
| 1 | 0 | 0001(A) | 4 |
| 1 | 0 | 0010(B) | 4 |
| 1 | 0 | 0011(E0 ~ E3) | 6 |
| 1 | 0 | 0100(C) | 4 |
| 1 | 0 | 0101(E4 ~ E7) | 6 |
| 1 | 0 | 0110(E8 ~ EB) | 6 |
| 1 | 0 | 0111(F8) | 8 |
| 1 | 0 | 1000(D) | 4 |
| 1 | 0 | 1001(EC ~ EF) | 6 |
| 1 | 0 | 1010(F0 ~ F3) | 6 |
| 1 | 0 | 1011(F9) | 8 |
| 1 | 0 | 1100(F4 ~ F7) | 6 |
| 1 | 0 | 1101(FA) | 8 |
| 1 | 0 | 1110(FB) | 8 |
| 1 | 0 | 1111(FC) | 8 |

FIG.38F

SECOND LEAF AREA (1 TYPE) — 3806

| NODE/LEAF IDENTIFYING FLAG | LEAF TYPE FLAG | DECOMPRESSION CODE (LEAF NUMBER) | COMPRESSED CODE LENGTH |
|---|---|---|---|
| 1 | 1 | 0000···0[16 ZEROS](8, 9) | 3 |

| | | |
|---|---|---|
| 3901 | HEADER AREA (DIVIDED AREA ID: D) | ←3900 |
| 3902 | ROOT AREA | |
| 3903 | FIRST NODE AREA | |
| 3904 | SECOND NODE AREA | |
| 3905 | FIRST LEAF AREA | |
| 3906 | SECOND LEAF AREA | |

3902

| ROOT AREA | | |
|---|---|---|
| NODE/LEAF IDENTIFYING FLAG | 0 | |
| NODE SIZE | 0100 | |
| LEAF NUMBER | 0 | POINTER TO DECOMPRESSION CODE "0000" |
| | 1 | |
| | 2 | |
| | 3 | |
| | 4 | |
| | 5 | |
| | 6 | |
| | 7 | |
| | 8 | POINTER TO DECOMPRESSION CODE "0000···00" (16 ZEROS) |
| | 9 | |
| | A | |
| | B | |
| | C | POINTER TO DECOMPRESSION CODE "0000···00" (64 ZEROS) |
| | D | |
| NODE NUMBER | E | POINTER TO NODE N(E) |
| | F | POINTER TO NODE N(F) |

FIG.39C

| FIRST NODE AREA(E) | | | 3903 |
|---|---|---|---|
| NODE/LEAF IDENTIFYING FLAG | | 0 | |
| NODE SIZE | | 0100 | |
| LEAF NUMBER | E0 | POINTER TO DECOMPRESSION CODE "0001" | |
| | E1 | | |
| | E2 | | |
| | E3 | | |
| | E4 | POINTER TO DECOMPRESSION CODE "0010" | |
| | E5 | | |
| | E6 | | |
| | E7 | | |
| | E8 | POINTER TO DECOMPRESSION CODE "0100" | |
| | E9 | | |
| | EA | | |
| | EB | | |
| | EC | POINTER TO DECOMPRESSION CODE "1000" | |
| | ED | | |
| | EE | | |
| | EF | | |

FIG.39D

| SECOND NODE AREA(F) 3904 |||
|---|---|---|
| NODE/LEAF IDENTIFYING FLAG || 0 |
| NODE SIZE || 0100 |
| LEAF NUMBER | F0 | POINTER TO DECOMPRESSION CODE "0011" |
| | F1 | POINTER TO DECOMPRESSION CODE "0101" |
| | F2 | POINTER TO DECOMPRESSION CODE "0110" |
| | F3 | POINTER TO DECOMPRESSION CODE "1001" |
| | F4 | POINTER TO DECOMPRESSION CODE "1010" |
| | F5 | POINTER TO DECOMPRESSION CODE "1100" |
| | F6 | POINTER TO DECOMPRESSION CODE "0111" |
| | F7 | POINTER TO DECOMPRESSION CODE "1011" |
| | F8 | POINTER TO DECOMPRESSION CODE "1101" |
| | F9 | POINTER TO DECOMPRESSION CODE "1110" |
| | FA | POINTER TO DECOMPRESSION CODE "1111" |
| | FB | |
| | FC | |
| | FD | |
| | FE | |
| | FF | |

| FIRST LEAF AREA | | | |
|---|---|---|---|
| NODE/LEAF IDENTIFYING FLAG | LEAF TYPE FLAG | DECOMPRESSION CODE (LEAF NUMBER) | COMPRESSED CODE LENGTH |
| 1 | 0 | 0000(0 ~ 7) | 1 |
| 1 | 0 | 0001(E0 ~ E3) | 6 |
| 1 | 0 | 0010(E4 ~ E7) | 6 |
| 1 | 0 | 0011(F0) | 8 |
| 1 | 0 | 0100(E8 ~ EB) | 6 |
| 1 | 0 | 0101(F1) | 8 |
| 1 | 0 | 0110(F2) | 8 |
| 1 | 0 | 0111(F6) | 8 |
| 1 | 0 | 1000(F8 ~ EB) | 6 |
| 1 | 0 | 1001(F3) | 8 |
| 1 | 0 | 1010(F4) | 8 |
| 1 | 0 | 1011(F7) | 8 |
| 1 | 0 | 1100(F5) | 8 |
| 1 | 0 | 1101(F8) | 8 |
| 1 | 0 | 1110(F9) | 8 |
| 1 | 0 | 1111(FA) | 8 |

| SECOND LEAF AREA (1 TYPE) | | | |
|---|---|---|---|
| NODE/LEAF IDENTIFYING FLAG | LEAF TYPE FLAG | DECOMPRESSION CODE (LEAF NUMBER) | COMPRESSED CODE LENGTH |
| 1 | 1 | 0000···0[16 ZEROS](8 ~ B) | 2 |
| 1 | 1 | 0000···0[64 ZEROS](C, D) | 3 |

| | | |
|---|---|---|
| 4001 | HEADER AREA (DIVIDED AREA ID: E) | ← 4000 |
| 4002 | ROOT AREA | |
| 4003 | FIRST NODE AREA | |
| 4004 | FIRST LEAF AREA | |
| 4005 | SECOND LEAF AREA | |

4002

| ROOT AREA | | |
|---|---|---|
| NODE/LEAF IDENTIFYING FLAG | | 0 |
| NODE SIZE | | 0100 |
| LEAF NUMBER | 0 | POINTER TO DECOMPRESSION CODE "0000" |
| | 1 | |
| | 2 | |
| | 3 | |
| | 4 | |
| | 5 | |
| | 6 | |
| | 7 | |
| | 8 | POINTER TO DECOMPRESSION CODE "0000···00" (16 ZEROS) |
| | 9 | |
| | A | |
| | B | |
| | C | POINTER TO DECOMPRESSION CODE "0000···00" (64 ZEROS) |
| | D | |
| NODE NUMBER | E | POINTER TO DECOMPRESSION CODE "0000···00" (256 ZEROS) |
| | F | POINTER TO NODE N(F) |

FIG.40C

| NODE AREA(F) | | |
|---|---|---|
| NODE/LEAF IDENTIFYING FLAG | | 0 |
| NODE SIZE | | 0100 |
| LEAF NUMBER | F0 | POINTER TO DECOMPRESSION CODE "0001" |
| | F1 | POINTER TO DECOMPRESSION CODE "0010" |
| | F2 | POINTER TO DECOMPRESSION CODE "0100" |
| | F3 | POINTER TO DECOMPRESSION CODE "1000" |
| | F4 | POINTER TO DECOMPRESSION CODE "0011" |
| | F5 | POINTER TO DECOMPRESSION CODE "0101" |
| | F6 | POINTER TO DECOMPRESSION CODE "0110" |
| | F7 | POINTER TO DECOMPRESSION CODE "1001" |
| | F8 | POINTER TO DECOMPRESSION CODE "1010" |
| | F9 | POINTER TO DECOMPRESSION CODE "1100" |
| | FA | POINTER TO DECOMPRESSION CODE "0111" |
| | FB | POINTER TO DECOMPRESSION CODE "1011" |
| | FC | POINTER TO DECOMPRESSION CODE "1101" |
| | FD | POINTER TO DECOMPRESSION CODE "1110" |
| | FE | POINTER TO DECOMPRESSION CODE "1111" |
| | FF | |

FIRST LEAF AREA (4004)

| NODE/LEAF IDENTIFYING FLAG | LEAF TYPE FLAG | DECOMPRESSION CODE (LEAF NUMBER) | COMPRESSED CODE LENGTH |
|---|---|---|---|
| 1 | 0 | 0000(0~7) | 1 |
| 1 | 0 | 0001(F0) | 8 |
| 1 | 0 | 0010(F1) | 8 |
| 1 | 0 | 0011(F4) | 8 |
| 1 | 0 | 0100(F2) | 8 |
| 1 | 0 | 0101(F5) | 8 |
| 1 | 0 | 0110(F6) | 8 |
| 1 | 0 | 0111(FA) | 8 |
| 1 | 0 | 1000(F3) | 8 |
| 1 | 0 | 1001(F7) | 8 |
| 1 | 0 | 1010(F8) | 8 |
| 1 | 0 | 1011(FB) | 8 |
| 1 | 0 | 1100(F9) | 8 |
| 1 | 0 | 1101(FC) | 8 |
| 1 | 0 | 1110(FD) | 8 |
| 1 | 0 | 1111(FE) | 8 |

FIG.40E

SECOND LEAF AREA (3 TYPES) (4005)

| NODE/LEAF IDENTIFYING FLAG | LEAF TYPE FLAG | DECOMPRESSION CODE (LEAF NUMBER) | COMPRESSED CODE LENGTH |
|---|---|---|---|
| 1 | 1 | 0000···0[16 ZEROS](8~B) | 2 |
| 1 | 1 | 0000···0[64 ZEROS](C, D) | 3 |
| 1 | 1 | 0000···0[256 ZEROS](E) | 4 |

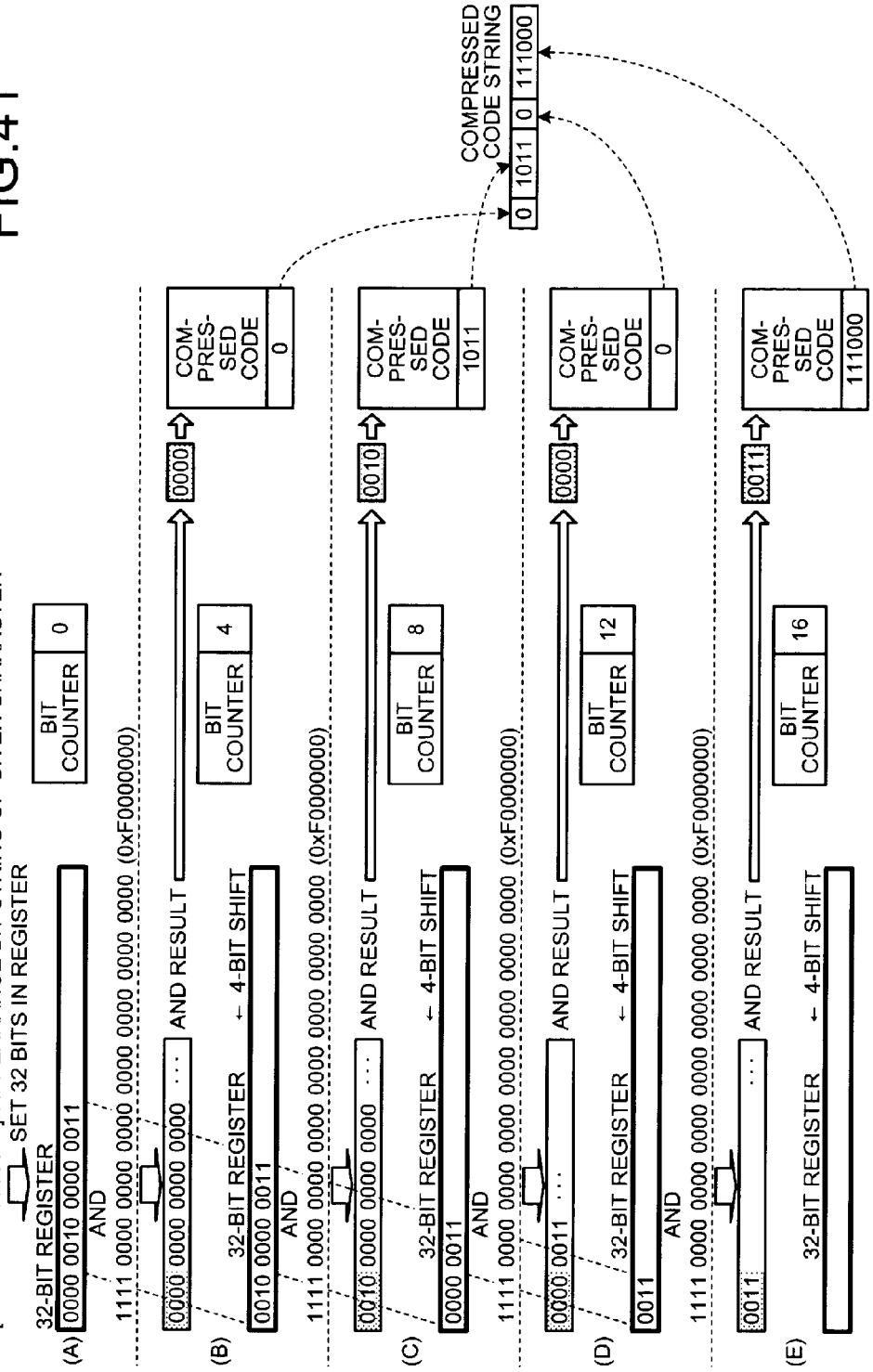

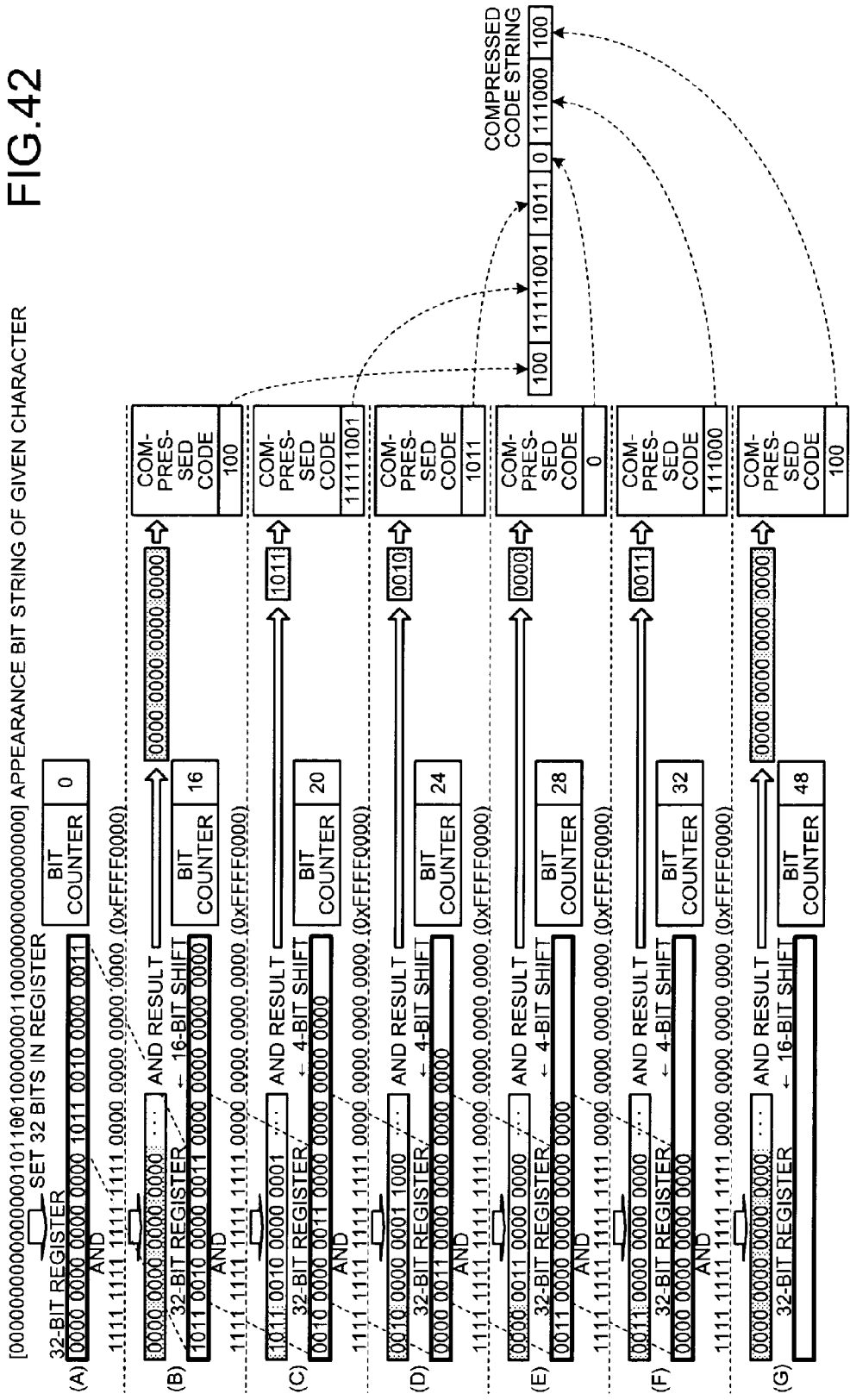

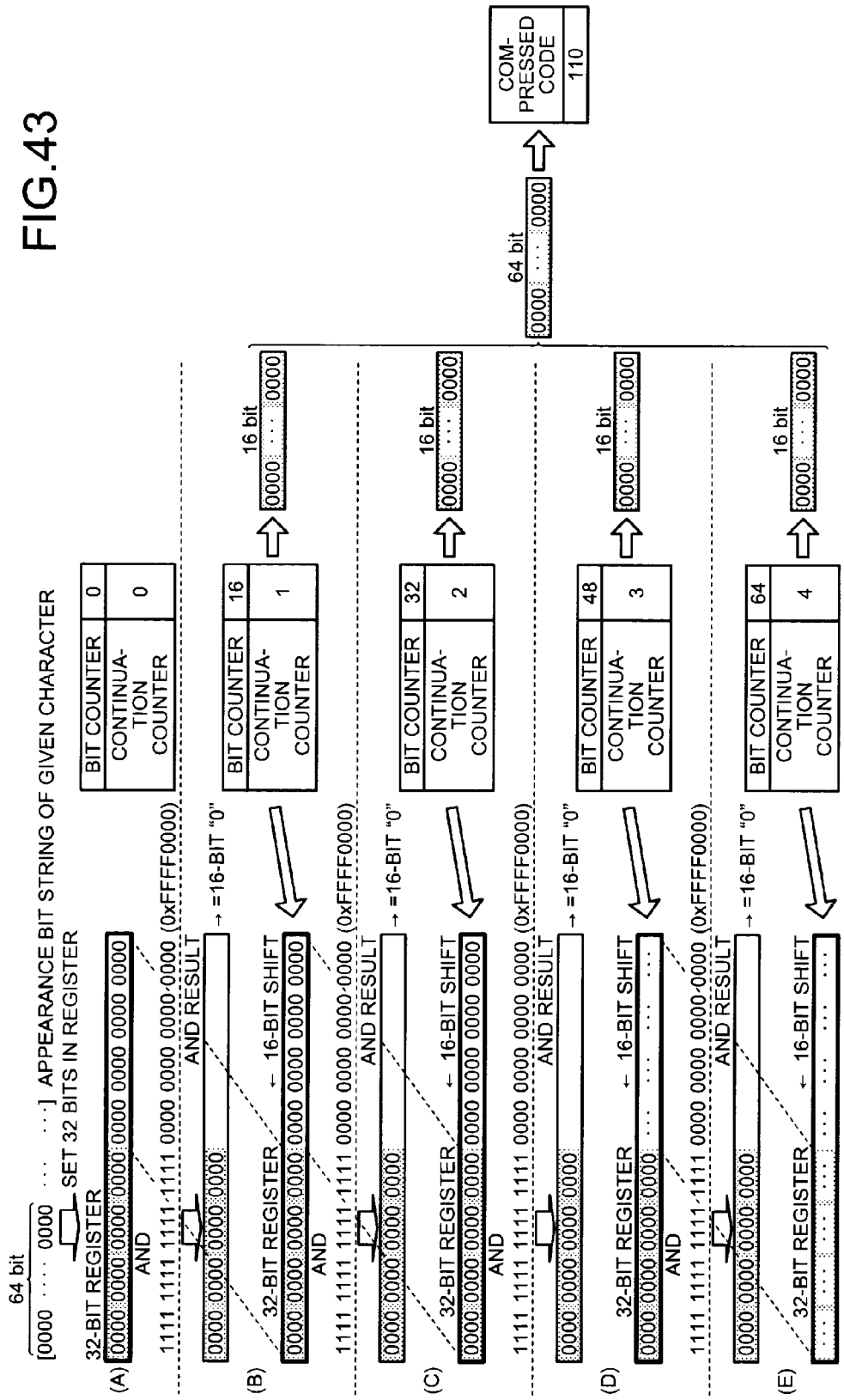

FIG.56

| BIT ADDRESS Abi | MASK PATTERN | | | | | | | |
|---|---|---|---|---|---|---|---|---|
| 0 | 1111 | 0000 | 0000 | 0000 | 0000 | 0000 | 0000 | 0000 (0xF0000000) |
| 1 | 0111 | 1000 | 0000 | 0000 | 0000 | 0000 | 0000 | 0000 (0x78000000) |
| 2 | 0011 | 1100 | 0000 | 0000 | 0000 | 0000 | 0000 | 0000 (0x3C000000) |
| 3 | 0001 | 1110 | 0000 | 0000 | 0000 | 0000 | 0000 | 0000 (0x1E000000) |
| 4 | 0000 | 1111 | 0000 | 0000 | 0000 | 0000 | 0000 | 0000 (0x0F000000) |
| 5 | 0000 | 0111 | 1000 | 0000 | 0000 | 0000 | 0000 | 0000 (0x07800000) |
| 6 | 0000 | 0011 | 1100 | 0000 | 0000 | 0000 | 0000 | 0000 (0x03C00000) |
| 7 | 0000 | 0001 | 1110 | 0000 | 0000 | 0000 | 0000 | 0000 (0x01E00000) |

5600

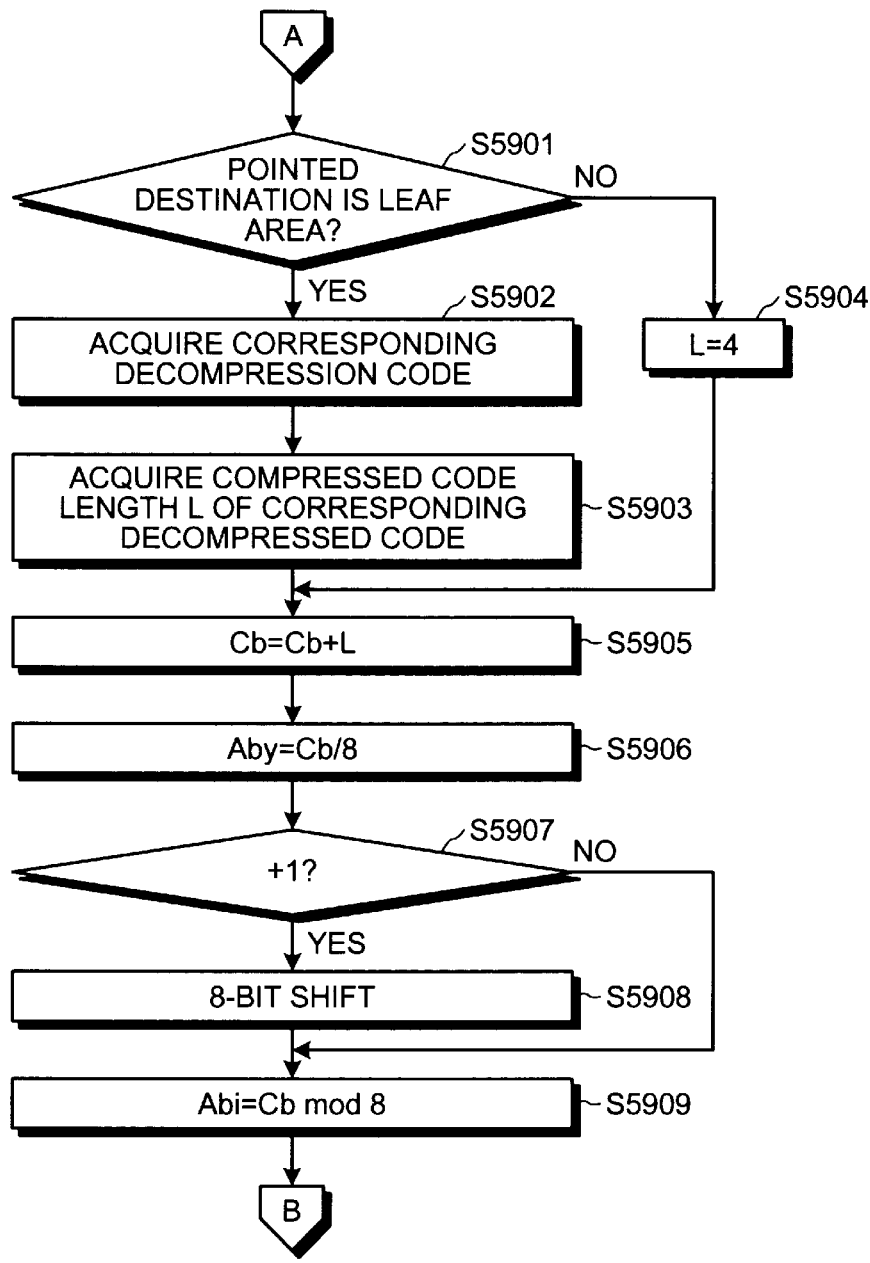

COMPUTER PRODUCT, INFORMATION RETRIEVAL METHOD, AND INFORMATION RETRIEVAL APPARATUS

This application is a Continuation of International Application No. PCT/JP2008/059585, filed May 23, 2008.

FIELD

The embodiments discussed herein are related to a computer product, an information retrieval method, and an information retrieval apparatus.

BACKGROUND

Conventionally, content such as a dictionary is made up of a single file described by 16-bit code character data in accordance with JIS-X4081. This dictionary content may be encrypted and retrieved as recited in International Publication Pamphlet No. 2006/123448, for example.

International Publication Pamphlet No. 2006/123448 recites that the retrieval may be performed with the dictionary content in a compressed state by using an appearance map configured by a bit string indicating, for each of character data, the presence/absence of character data in a file to be searched. This appearance map is data for performing a full-text search of a dictionary or knowledge in a mobile terminal such as a cellular phone and is data belonging to a zero-memory source and having an appearance ratio of 8% and random characteristics for "ON" of each bit.

Data compression of a zero-memory source is explained by Uematsu, Tomohiko, "Introduction to Document Data Compression Algorithm" (3.4 Encoding Based on Blocks and Effect Thereof (pp. 51 to 53)), CQ Publishing Company Ltd., Oct. 15, 1994. Uematsu, "Introduction to Document Data Compression Algorithm" (3.4 Encoding Based on Blocks and Effect Thereof (pp. 51 to 53)), CQ Publishing Company Ltd.; Oct. 15, 1994 explains the data compression of a zero-memory source taking an example of block encoding for every two bits and three bits, and when block length is increased, the compression rate is raised and an ideal compression may be implemented by approaching to information entropy.

However, if block length is increased with respect to the disclosure in International Publication Pamphlet No. 2006/123448, the amount of calculations for generating a Huffman tree exponentially increase. Therefore, if the disclosure of International Publication Pamphlet No. 2006/123448 is directly applied, a problem arises in that compression and decompression is not possible in a resource-saving environment such as a slow PC, a small memory, or a small disk space when a full-text search of a dictionary or knowledge is performed in a mobile terminal such as a cellular phone.

SUMMARY

According to an aspect of an embodiment, a computer-readable recording medium stores therein an information retrieval program that causes a computer to execute a retrieval process in which files to be retrieved are narrowed down by using a bit string for each character in the files to find characters making up a retrieval keyword to retrieve a keyword identical to or related to the retrieval keyword in the files to be retrieved. The bit strings indicate the presence of the characters in the files. The information retrieval program causes the computer to execute extracting, from among the bit strings, a bit string of an arbitrary character; and compressing the extracted bit string, by using a special Huffman tree having leaves of plural types of symbol strings covering patterns represented by a predetermined number of bits and a special symbol string having a number of bits greater than the predetermined number of bits.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is an explanatory diagram of the data structure of section B in FIG. 8;

FIG. 10 is an explanatory diagram of the data structure of section E in FIG. 8;

FIG. 15B is a chart of comparison between compressed block data and original block data before compression;

FIG. 16B is an explanatory diagram of a relationship between the appearance map and the areas depicted in FIG. 16A;

FIG. 16C is a schematic of an area/compression pattern correlation table indicative of the correlation between the areas depicted in FIG. 16A and compression patterns;

FIG. 16D is a chart of 4-bit Huffman compression in the areas A and A';

FIG. 16E is a chart of 4-bit Huffman compression in the areas B and B';

FIG. 16F is a chart of 4-bit Huffman compression in the area C and C';

FIG. 16G is a chart of 4-bit Huffman compression in the area D and D';

FIG. 16H is a chart of 4-bit Huffman compression in the area E and E';

FIG. 16I is a chart of an example of correlation of symbol strings with code words when the 16-bit symbol string depicted in FIG. 16F is added;

FIG. 16J is an explanatory diagram of a comparative example of the 4-bit Huffman compression before and after the addition of a 17th symbol string acting as a leaf;

FIG. 16K is an explanatory diagram of a data structure of bit string compression data;

FIG. 17 is a functional diagram of a retrieval initializing unit depicted in FIG. 2;

FIG. 24A is a flowchart of compressing/encoding processing depicted in FIG. 21;

FIG. 24B is a flowchart of appearance frequency management data compression processing;

FIG. 25A is a flowchart of retrieval initializing processing depicted in FIG. 21;

FIG. 25B is a flowchart of appearance frequency management data decompression process;

FIG. 27 is a chart of the revision of divided areas;

FIG. 29A is a chart of relationships between decompression codes and branches of a Huffman tree in area B;

FIG. 29C is an explanatory diagram of a decompression code/compressed code table indicative of correlation among decompression codes, compressed codes, and leaf numbers in the area-B Huffman tree;

FIG. 30A is a chart of relationship between decompression codes and branches of a special Huffman tree in a area C;

FIG. 30C is an explanatory diagram of a decompression code/compressed code table indicative of correlation among decompression codes, compressed codes, and leaf numbers in the area-C Huffman tree;

FIG. 31A is a chart of relationship between decompression codes and branches of a special Huffman tree in area D;

FIG. 31C is an explanatory diagram of a decompression code/compressed code table indicative of correlation among decompression codes, compressed codes, and leaf numbers in the area-D Huffman tree;

FIG. 32A is a chart of relationship between decompression codes and branches of a special Huffman tree in area E;

FIG. 32C is an explanatory diagram of a decompression code/compressed code table indicative of correlation among decompression codes, compressed codes, and leaf numbers in the area-E Huffman tree;

FIG. 33 is an explanatory diagram of a structure for compression of the area-B Huffman tree;

FIG. 37A is an explanatory diagram of a structure for decompression of the area-B Huffman tree;

FIG. 37B is an explanatory diagram of storage contents of a root area of an area-B decompression structure;

FIG. 37C is an explanatory diagram of storage contents of a first node area of the area-B decompression structure;

FIG. 37D is an explanatory diagram of storage contents of a second node area of the area-B decompression structure;

FIG. 38B is an explanatory diagram of storage contents of a root area of the area-C decompression structure;

FIG. 38C is an explanatory diagram of storage contents of a first node area of the area-C decompression structure;

FIG. 38D is an explanatory diagram of storage contents of a second node area of the area-C decompression structure;

FIG. 38E is an explanatory diagram of storage contents of a first leaf area of the area-C decompression structure;

FIG. 38F is an explanatory diagram of storage contents of a second leaf area of the area-C decompression structure;

FIG. 39C is an explanatory diagram of storage contents of a first node area of the area-D decompression structure;

FIG. 39D is an explanatory diagram of storage contents of a second node area of the area-D decompression structure;

FIG. 39E is an explanatory diagram of storage contents of a first leaf area of the area-D decompression structure;

FIG. 39F is an explanatory diagram of storage contents of a second leaf area of the area-D decompression structure;

FIG. 40C is an explanatory diagram of storage contents of a node area of the area-E decompression structure;

FIG. 40D is an explanatory diagram of storage contents of a first leaf area of the area-E decompression structure;

FIG. 40E is an explanatory diagram of storage contents of a second leaf area of the area-E decompression structure;

FIG. 41 is an explanatory diagram of an example of compression of an appearance bit string related to character data of the area B;

FIG. 42 is an explanatory diagram of an example of compression of an appearance bit string related to character data of the area C;

FIG. 43 is an explanatory diagram of an example of compression of an appearance bit string related to character data of the area D;

FIG. 56 is an explanatory diagram of a mask pattern table;

FIGS. 58 and 59 are flowcharts of decompression process procedures for the appearance map in the second embodiment.

DESCRIPTION OF EMBODIMENTS

Preferred embodiments of the present invention will be explained with reference to the accompanying drawings.

Figure 1:
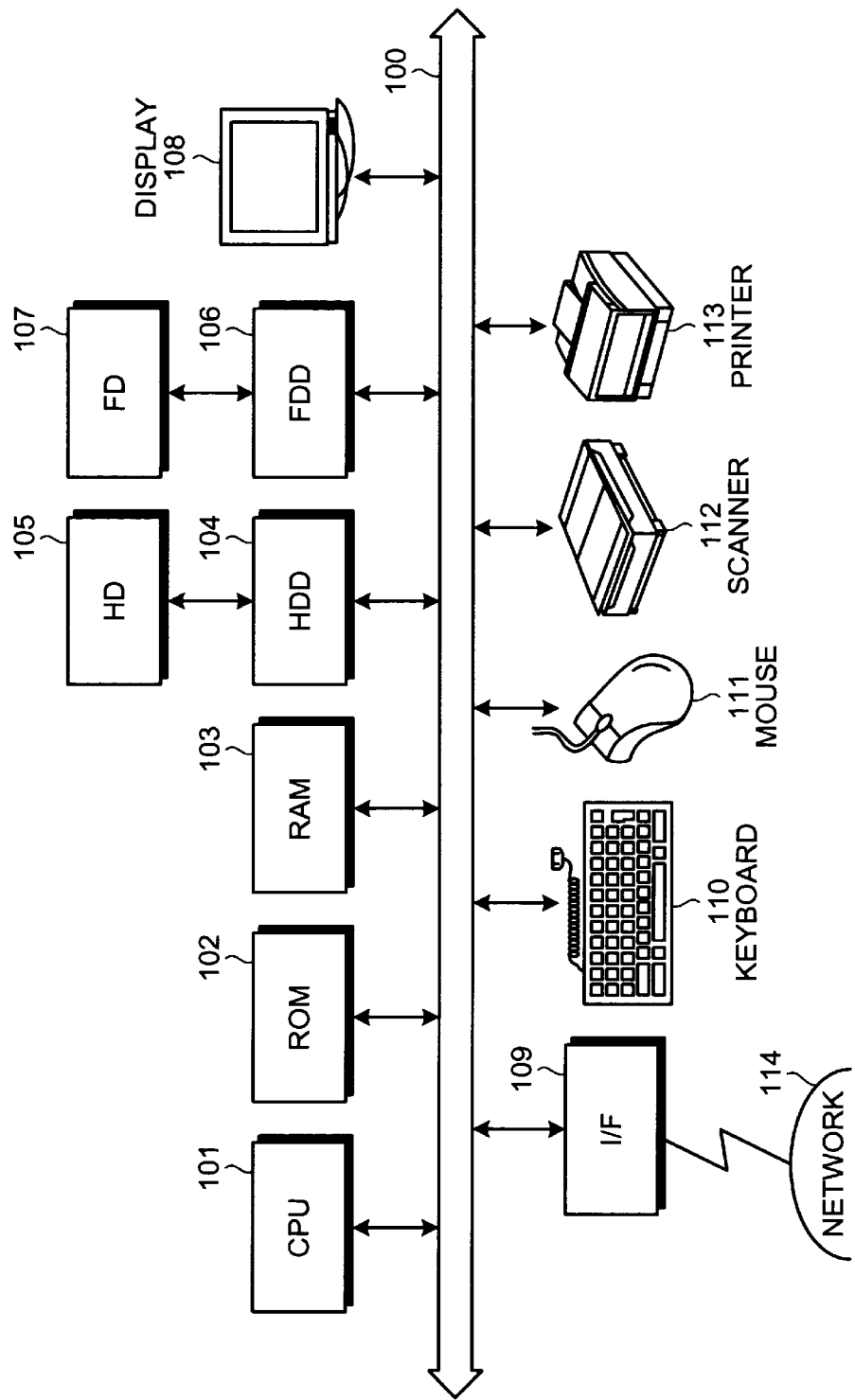
FIG. 1 is a block diagram of an information retrieval apparatus according to an embodiment.

FIG. 1 is a block diagram of an information retrieval apparatus according to an embodiment.

As depicted in FIG. 1, an information retrieval apparatus includes a central processing unit (CPU) 101, a read-only memory (ROM) 102, a random access memory (RAM) 103, a hard disk drive (HDD) 104, a hard disk (HD) 105, a flexible disk drive (FDD) 106, a flexible disk (FD) 107, a display 108, an interface (I/F) 109, a keyboard 110, a mouse 111, a scanner 112, and a printer 113, connected to one another by way of a bus 100.

The CPU 101 governs overall control of the information retrieval apparatus. The ROM 102 stores therein programs such as a boot program. The RAM 103 is used as a work area of the CPU 101. The HDD 104, under the control of the CPU 101, controls the reading and writing of data with respect to the HD 105. The HD 105 stores therein the data written under control of the HDD 104.

The FDD 106, under the control of the CPU 101, controls the reading and writing of data with respect to the FD 107. The FD 107 stores therein the data written under control of the FDD 106, the data being read by the information retrieval apparatus.

In addition to the FD 107, a compact disc-read-only memory (CD-ROM) (compact disc-recordable (CD-R), compact disc-rewritable (CD-RW)), magneto optical disk (MO), digital versatile disk (DVD), a memory card, etc. may be adopted as a removable recording medium. The display 108 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 108.

The I/F 109 is connected to a network 114 such as the Internet through a communication line and is connected to other apparatuses through the network 114. The I/F 109 administers an internal interface with the network 114 and controls the input/output of data from/to external apparatuses. For example, a modem or a LAN adaptor may be employed as the I/F 109.

The keyboard 110 includes, for example, keys for inputting letters, numerals, and various instructions and performs the input of data. Alternatively, a touch panel-type input pad or numeric keypad, etc. may be adopted. The mouse 111 performs the movement of the cursor, selection of a region, or movement and size change of windows. A track ball or a joy stick may be adopted provided each respectively has a function similar to a pointing device.

The scanner 112 optically reads an image and takes in the image data into the information retrieval apparatus. The scanner 112 may have an optical character recognition (OCR) function as well. The printer 113 prints image data and text data. The printer 113 may be, for example, a laser printer or an ink jet printer.

Figure 2:
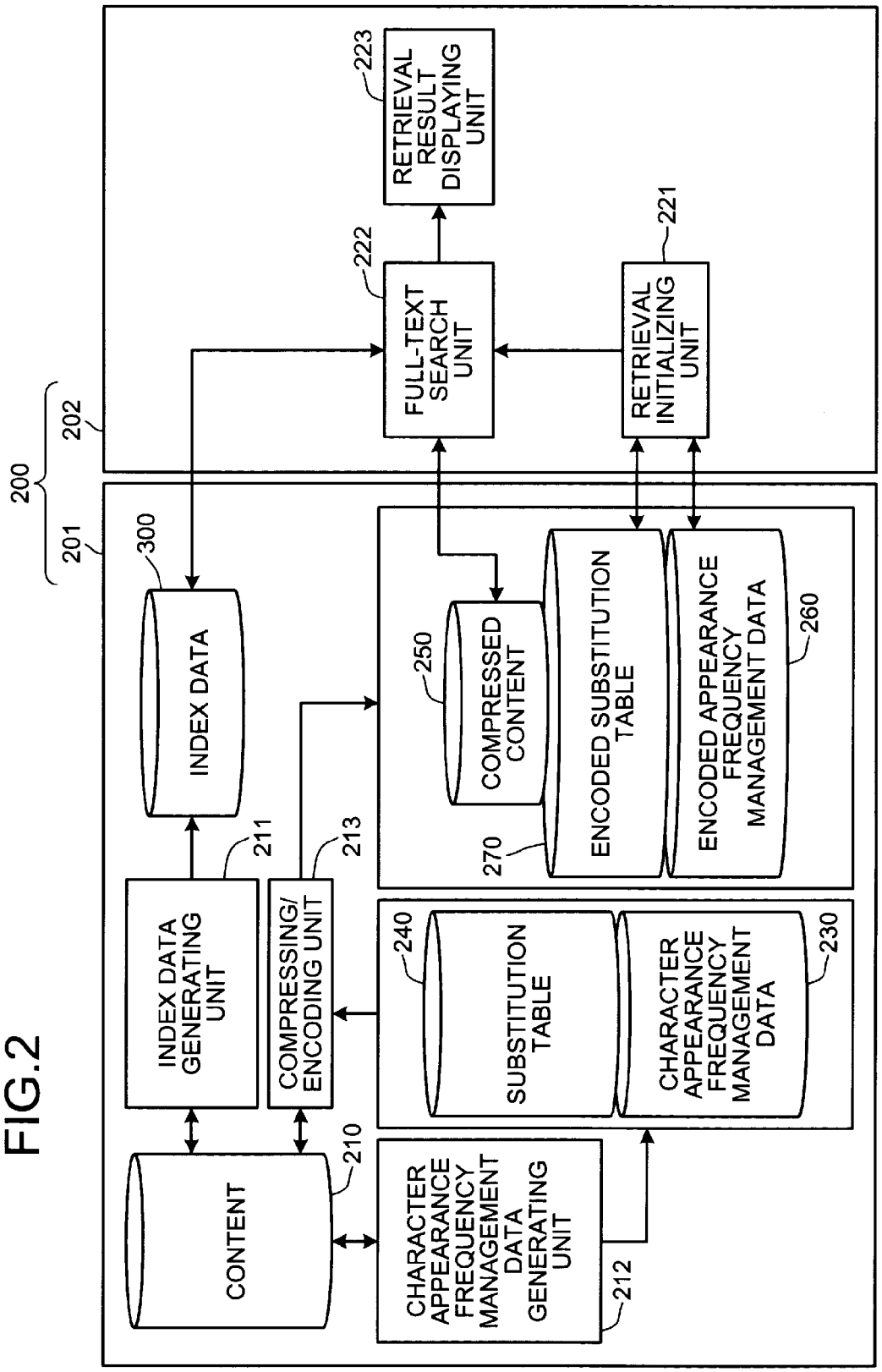
FIG. 2 is a functional diagram of an information retrieval apparatus according to a first embodiment.

FIG. 2 is a functional diagram of an information retrieval apparatus according to a first embodiment. As depicted in FIG. 2, an information retrieval apparatus 200 includes an editing unit 201 and a retrieval processing unit 202.

The editing unit 201 includes content 210, an index data generating unit 211, an appearance frequency management data generating unit 212, and a compressing/encoding unit 213. The content 210 is electronic data to be searched and may be a dictionary content such as a Japanese dictionary, an English-Japanese dictionary, a Japanese-English dictionary, and a glossary.

The content 210 is made up of files to be retrieved. If the content 210 is dictionary content, the files to be retrieved are, for example, body HyperText Markup Language (HTML) files described with character data of a variety of types of bit code such as 8-bit code, 16-bit code, or 32-bit code.

The character data includes the character data of 8-bit (American Standard Code for Information Interchange (ASCII)) alphanumeric characters, katakana characters, and symbols; the character data of 16-bit (JIS) alphanumeric characters, katakana characters and symbols; and the character data of 16-bit (JIS) kana characters and kanji characters. Character data of phonograms and kanji characters mainly consisting of 8-bit code such as alphanumeric characters, kana characters, and katakana characters is herein referred to as "standard character data".

The character data includes non-standard character data and consecutive-character data in addition to the standard character data. The consecutive-character data is character data consisting of two or more character strings. For example, in the case of consecutive-character data of two 16-bit kana characters, the consecutive-character data consists of 32-bit code character data. Binary data such as an address pointer is included in the "character data" for convenience although the data is non-character data. "Character data" hereinafter includes the binary data if not otherwise specified.

The index data generating unit 211 generates index data 300 related to character strings such as words and terms described in the content 210, i.e., the files to be retrieved. The appearance frequency management data generating unit 212 generates appearance frequency management data 230 related to the appearance frequencies of the character data described in the files to be retrieved. The appearance frequency management data generating unit 212 generates a substitution table 240 for substituting consecutive-character data described in the files to be retrieved, with non-standard character data.

The compressing/encoding unit 213 compresses the content 210 to generate compressed content 250. The compressing/encoding unit 213 also compresses/encrypts the appearance frequency management data 230 to generate encrypted compressed appearance frequency management data 260. The compressing/encoding unit 213 also encrypts the substitution table 240 to generate an encrypted substitution table 270.

The retrieval processing unit 202 includes a retrieval initializing unit 221, a full-text search unit 222, and a retrieval result displaying unit 223. The retrieval initializing unit 221 decodes the encrypted compressed appearance frequency management data 260, which is compressed information, and the encrypted substitution table 270 to execute initialization of the retrieval by the full-text search unit 222.

The full-text search unit 222 receives input of a retrieval keyword and uses the appearance frequency management data 230, the substitution table 240, and the index data 300 to execute the full-text search of the compressed content 250 to generate a retrieval candidate list. The retrieval result displaying unit 223 decompresses and displays, as a retrieval result, a retrieval candidate selected by a user, from among the retrieval candidates obtained by the full-text search unit 222.

For example, a recording medium such as the ROM 102, the RAM 103, and the HD 105 depicted in FIG. 1 implements functions of the content 210, the index data 300, the appearance frequency management data 230, the substitution table 240, the compressed content 250, the encrypted compressed appearance frequency management data 260, and the encrypted substitution table 270. A function of the editing unit 201 (including the internal functional configuration) is implemented by the CPU 101 executing the program recorded on the recording medium such as the ROM 102, the RAM 103, and the HD 105 depicted in FIG. 1, for example.

Figure 3:
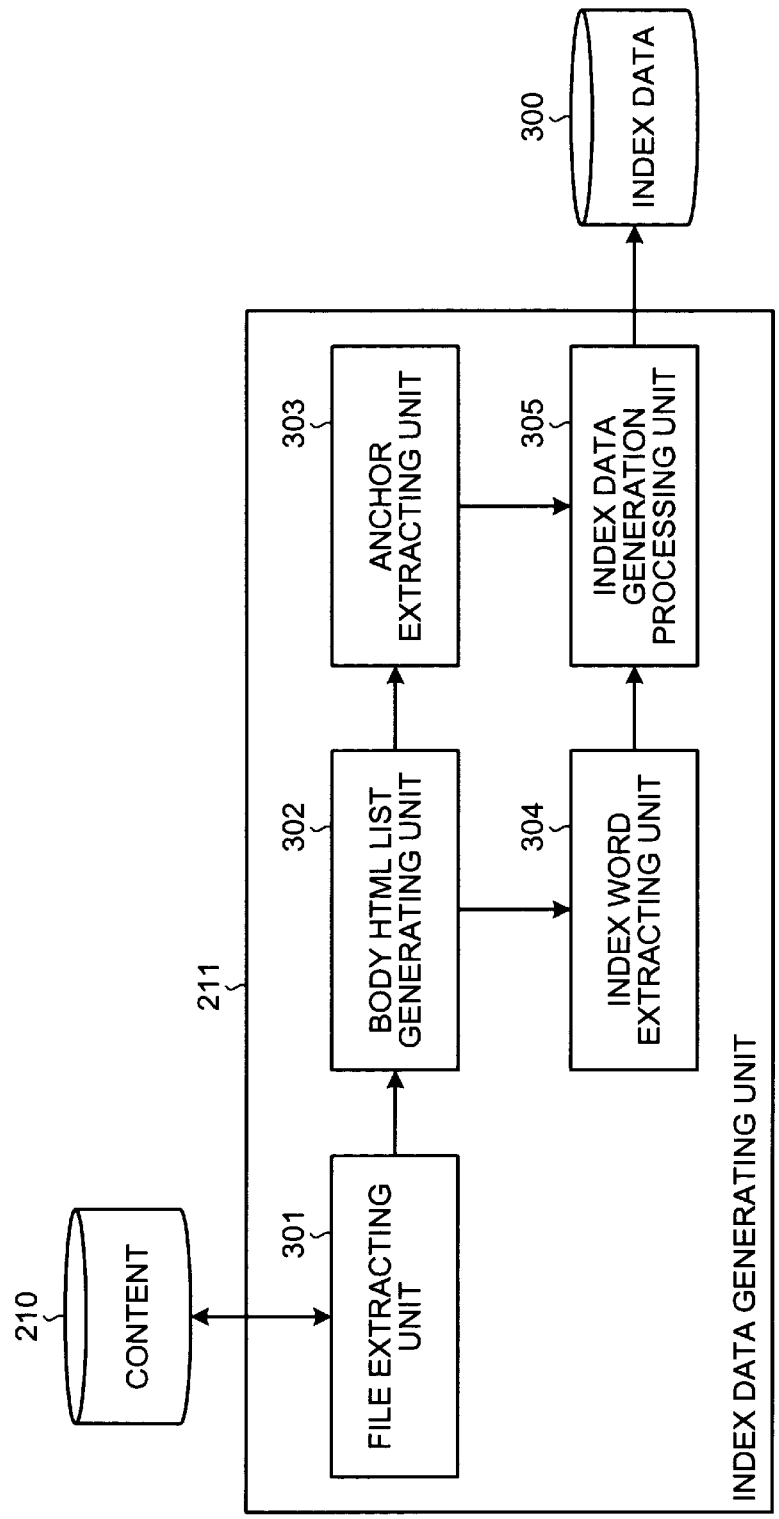
FIG. 3 is a block diagram of a functional configuration of an index data generating unit.

FIG. 3 is a block diagram of a functional configuration of the index data generating unit 211. As depicted in FIG. 3, the index data generating unit 211 includes an index data generating unit 211, a file extracting unit 301, a body HTML list generating unit 302, an anchor extracting unit 303, an index word extracting unit 304, an index data generation processing unit 305.

The file extracting unit 301 extracts main-body HTML files, i.e., the files to be retrieved, from the content 210. The body HTML list generating unit 302 generates a body HTML list consisting of data items from the main-body HTML files extracted by the file extracting unit 301. The anchor extracting unit 303 extracts anchors from the data items of the body HTML list generated by the body HTML list generating unit 302.

The index word extracting unit 304 extracts index words from the data items of the body HTML list generated by the body HTML list generating unit 302. The index data generation processing unit 305 correlates the anchors of the data items extracted by the anchor extracting unit 303 with the index words of the data items extracted by the index word extracting unit 304 to generate the index data 300 used for the full-text search.

Figure 4:
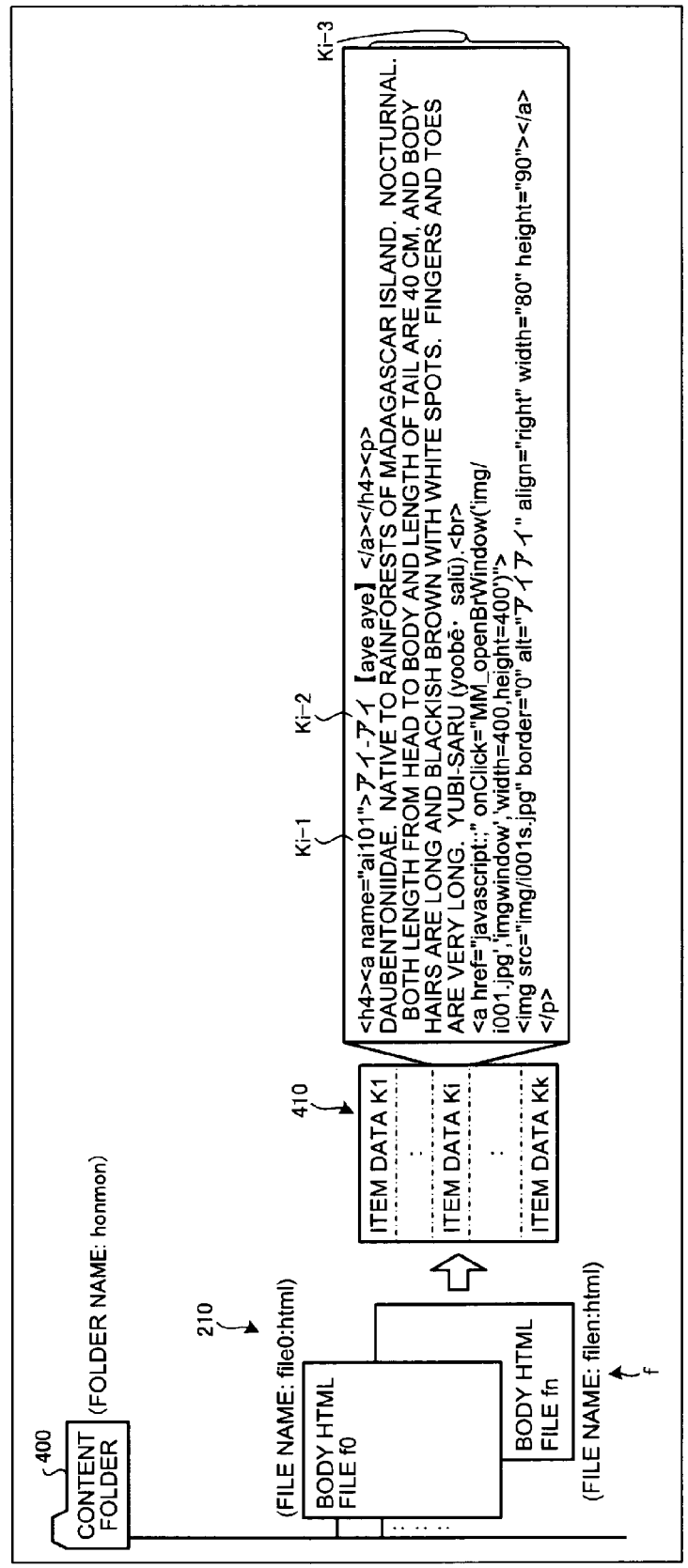
FIG. 4 is an explanatory diagram of an example of a body HTML list.
Figure 5:
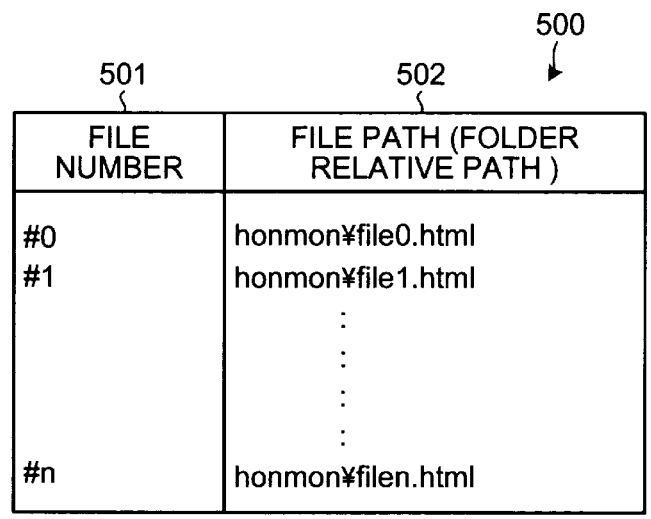
FIG. 5 is an explanatory diagram of file configuration data of the body HTML list.
Figure 6:
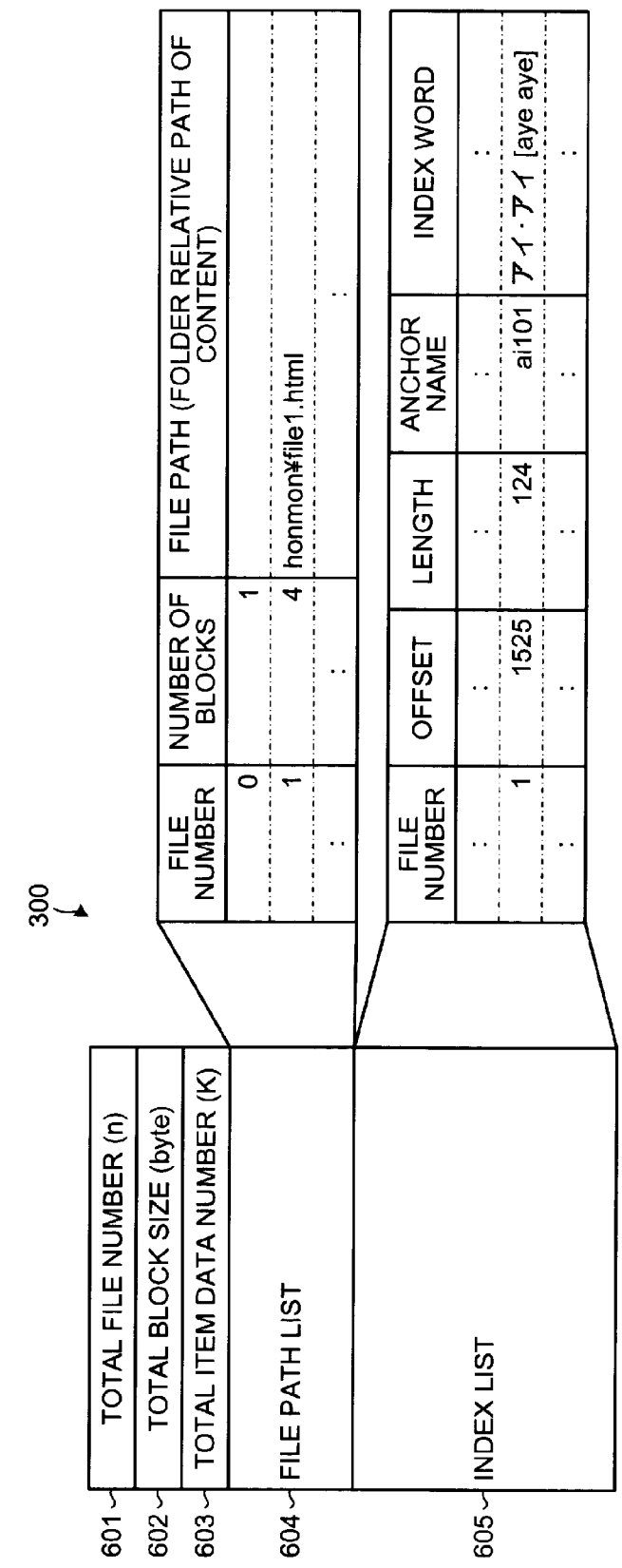
FIG. 6 is an explanatory diagram of index data.

The data generated by the index data generating unit 211 will be described in detail. FIG. 4 is an explanatory diagram of an example of the body HTML list; FIG. 5 is an explanatory diagram of file configuration data 500 of the body HTML list; and FIG. 6 is an explanatory diagram of the index data 300.

As depicted in FIG. 4, a content folder 400 (folder name: honmon) stores therein main-body HTML files f from a first main-body HTML file f0 (file name: file0.html) to a last main-body HTML file fn (file name: filen.html) as the content 210.

The main-body HTML files f0 to fn include descriptions of data items including anchors, index words, and explanation texts. The anchors are extracted by the anchor extracting unit 303 and the index words are extracted by the index word extracting unit 304.

The body HTML list generating unit 302 extracts the data items described in the main-body HTML files f0 to fn and combines the data items K1 to Kk to generate a body HTML list 410. In the body HTML list 410, an arbitrary data item Ki is a data item described in any one of the main-body HTML files. In the data item Ki, an anchor Ki-1 is "ai101"; an index word Ki-2 is "アイアイ [aye-aye]"; and a code Ki-3 is an explanation text.

As depicted in FIG. 5, the file configuration data 500 are data correlating the file numbers (reference numeral 501) of the main-body HTML files f0 to fn with the file paths (code 502) of the main-body HTML files f0 to fn depicted in FIG. 4. The file numbers correspond to numeric characters appended to a main-body HTML file f and, for example, in the case of the main-body HTML file f0, "#0" corresponds to the file number. Since the folder name of the content folder 400 is "honmon" and the file name of the main-body HTML file f0 is "file0.html", the file path of the main-body HTML file f0 of the file number #0 is "honmon\file0.html".

As depicted in FIG. 6, the index data 300 include total file number information (n+1) 601 of the main-body HTML files, total block size information 602 of the main-body HTML files f0 to fn, total data item number information (K) 603 of the body HTML list 410, a file path list 604 of the main-body HTML files f0 to fn, and an index list 605.

The file path list 604 is a list including descriptions of a file number, the number of blocks, and a file path for each of the main-body HTML files f0 to fn. The index list 605 is a list including descriptions of a file number, an offset value, a length, an anchor (name), and an index word for each of the main-body HTML files f0 to fn.

Figure 7:
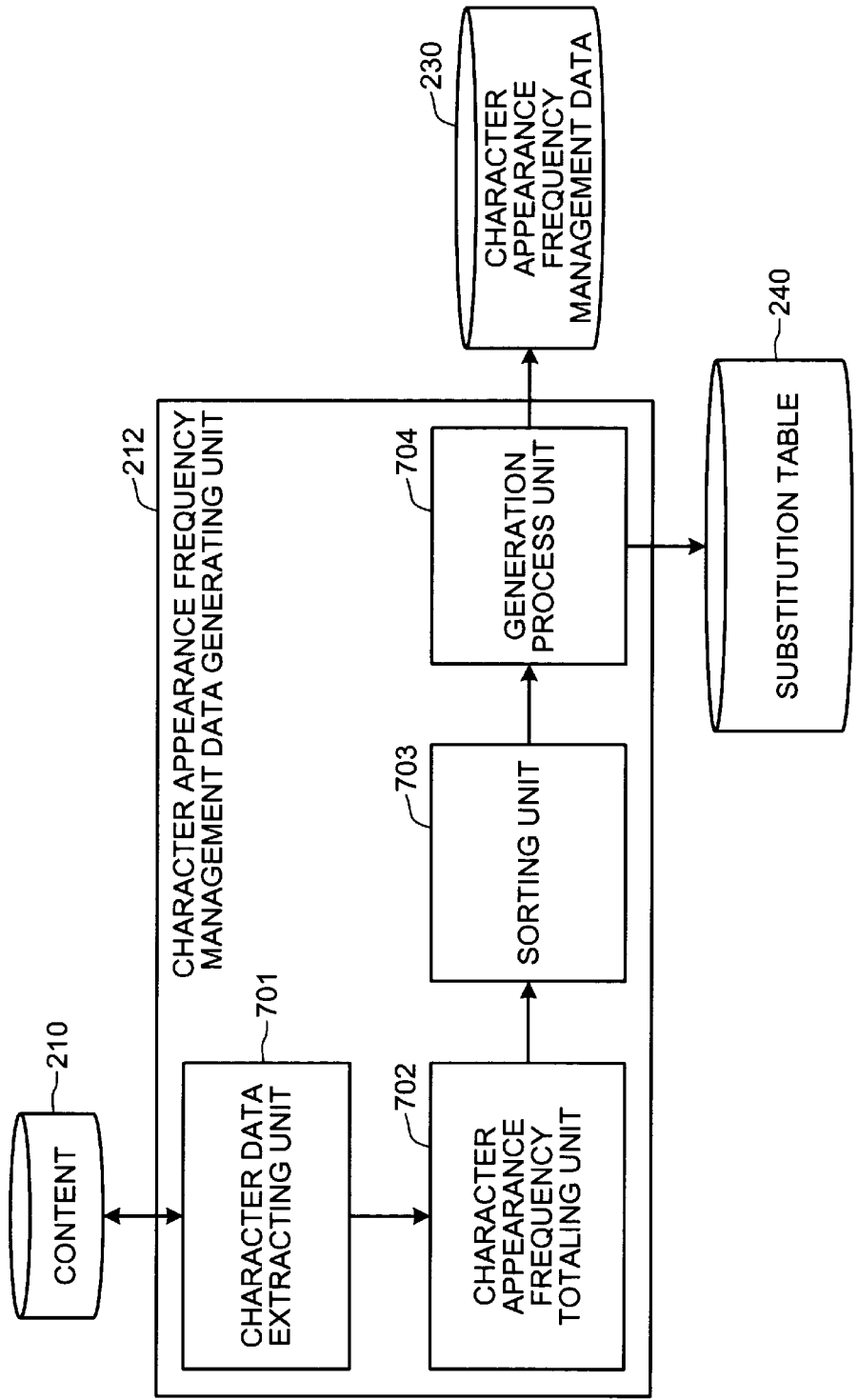
FIG. 7 is a functional diagram of an appearance frequency management data generating unit.

FIG. 7 is a functional diagram of the appearance frequency management data generating unit 212 depicted in FIG. 2. As depicted in FIG. 7, the appearance frequency management data generating unit 212 includes a character data extracting unit 701, a character appearance frequency totaling unit 702, a sorting unit 703, and a generation process unit 704.

The character data extracting unit 701 extracts character data sequentially from the main-body HTML files. The character appearance frequency totaling unit 702 totals the respective frequencies at which the character data extracted by the character data extracting unit 701 appears in the main-body HTML files fi, and detects the presence/absence of the character data in each of the main-body HTML files f0 to fn.

The sorting unit 703 sorts the character data according to appearance frequency. The generating process unit 704 generates the appearance frequency management data 230, using the appearance frequencies of the sorted character data and appearance maps indicative of the result of presence/absence detection for each of character data. The generating process unit 704 also generates the substitution table 640. A process of generating the appearance frequency management data 230 and the substitution table 640 by the appearance frequency management data generating unit 212 will be described in detail.

Figure 8:
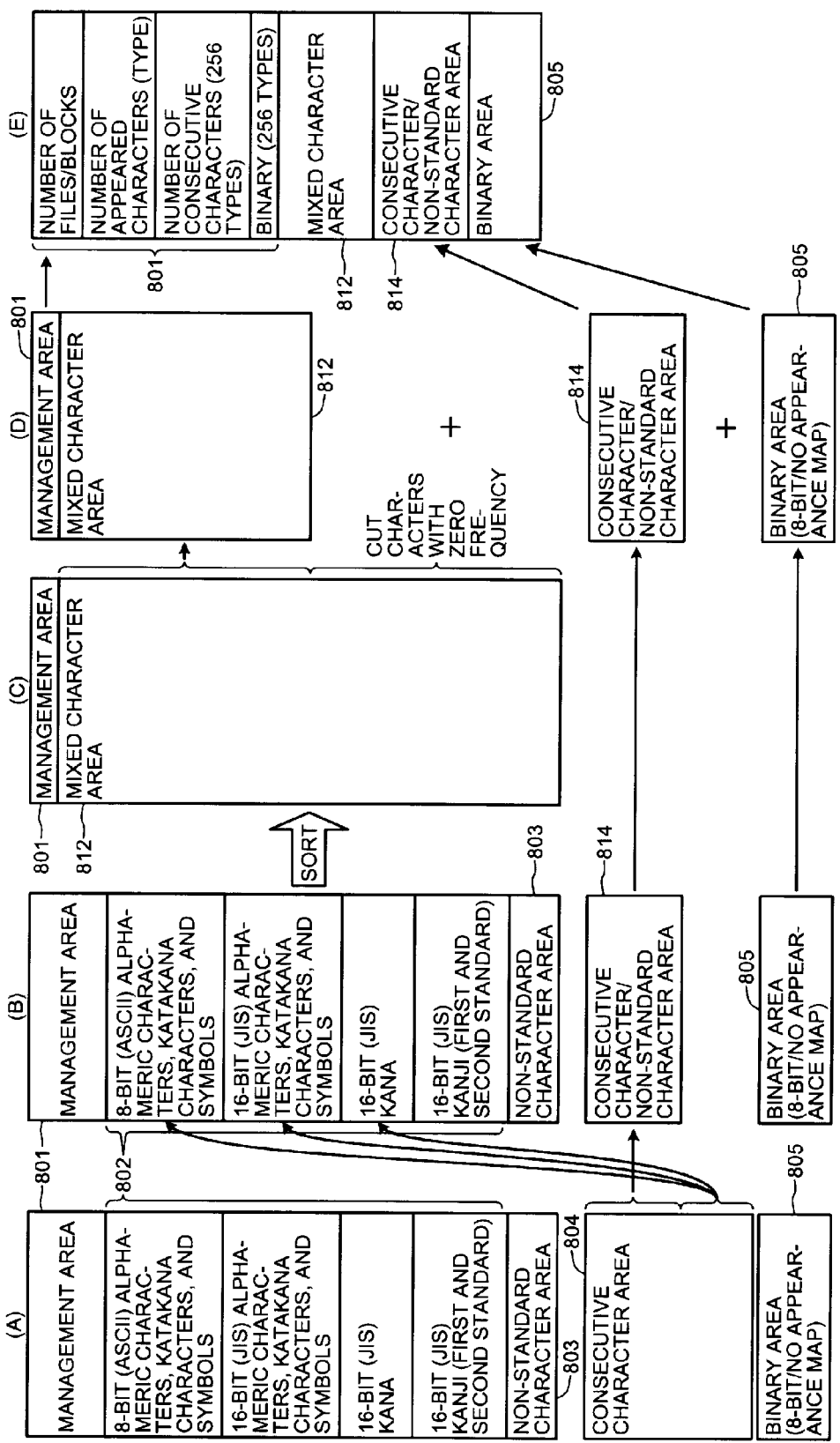
FIG. 8 is a schematic of the process of generating the appearance frequency management data.

FIG. 8 is a schematic of the process of generating the appearance frequency management data 230. Section A in FIG. 8 depicts a data configuration of the appearance frequency management data 230 that results when the character appearance frequency totaling unit 702 totals character data. Section B in FIG. 8 depicts a data configuration of the appearance frequency management data 230 that results after consecutive characters/non-standard character substitution processing. Section C in FIG. 8 depicts a data configuration of the appearance frequency management data 230 that results after mixture data including standard character data and non-standard character data are sorted. Section D in FIG. 8 depicts a data configuration of the appearance frequency management data 230 that results after mixture data with a low appearance frequency is cut out. Section E in FIG. 8 depicts a data configuration of the appearance frequency management data 230 generated ultimately.

In section A of FIG. 8, reference numeral 801 denotes a management area of the appearance frequency management data 230. Reference numeral 802 denotes a standard character area in which the appearance frequency, the number of appearance files, the appearance rank, and an appearance map of standard character data such as 8-bit (ASCII) alphanumeric characters, katakana characters and symbols, 16-bit (JIS) kana and kanji characters are stored.

Reference numeral 803 denotes a non-standard character area in which the appearance frequency, the number of appearance files, the appearance rank, and an appearance map of non-standard character data are stored. Reference numeral 804 denotes a consecutive character area in which the appearance frequency, the number of appearance files, the appearance rank, and an appearance map of consecutive character data are stored. Reference numeral 805 denotes a binary area in which the appearance frequency, the number of appearance files, and the appearance rank of 8-bit binary data are stored.

In the data configuration depicted in section A of FIG. 8, consecutive character data in the consecutive characters area 804 are sorted in the order of appearance frequency. Consecutive character data having a given appearance frequency or higher are substituted with non-standard character data that do not coincide with existing non-standard character data (hereinafter, "consecutive characters/non-standard character data"). In this manner, consecutive character data consisting of a string of characters with a high appearance frequency are replaced with non-standard character data, which is single character data; thereby reducing data volume and thus improving compression efficiency. Consecutive character data having an appearance frequency lower than the given appearance frequency are consecutive character data that do not appear frequently. Such consecutive character data is, therefore, fragmented into single character data, which are allocated to corresponding areas. As a result, the data configuration of the appearance frequency management data 230 depicted in section A of FIG. 8 becomes the data configuration depicted in section (B) resulting after the consecutive characters/non-standard character substitution processing.

The data structure of section B in FIG. 8 will be described further. FIG. 9 is an explanatory diagram of the data structure of section B in FIG. 8. As depicted in FIG. 9, the data structure of section B FIG. 8 has a character data area 900, an appearance frequency area 901, an appearance file count area 902, an appearance order area 903, and an appearance map 904, which store a character data appearance frequency, an appearance file count, an appearance order, and presence flag, respectively. The appearance map 904 uses 16 bits as one segment.

For example, the presence flag of the main-body HTML file f0 having the file number "#0" is located at the left end and the flag of the main-body HTML file f1 having the file number "#1" and the presence flag of the main-body HTML file f1 having the file number "#2" are set. The presence flag of the main-body HTML file fn having the file number "#n" is located at the right end.

In the data configuration depicted in section B of FIG. 8, standard character data in the standard character area 802 and non-standard character data in the non-standard character area 803 are mixed, and are sorted in descending order of appearance frequency, resulting in the data configuration depicted in section C. In the data configuration depicted in section C, consecutive characters/non-standard character data in the consecutive characters/non-standard character area 814 and binary data in the binary area 805 of section B are not subject to sorting.

In the data configuration depicted in section C, data having a low appearance frequency, such as data of zero appearance, is cut out from a mixture area 812 in which standard character data and non-standard character data are present together. Cutting out low appearance frequency data results in the data configuration depicted in section D. In the data configuration depicted in section D, the management area 801 and the mixture area 812, the consecutive characters/non-standard character area 814, and the binary area 805 are combined together to ultimately generate the appearance frequency management data 230 having the data configuration depicted in section E. In the appearance frequency management data 230, the management area 801 stores therein the number of files/blocks, the number of types of character data that appear (number of appeared character data (type)), the number of consecutive characters/non-standard character data (number of consecutive characters (256 types)), and the number of binary data (256 types).

FIG. 10 is an explanatory diagram of the data structure of section E in FIG. 8. As depicted in FIG. 10, the appearance frequency management data 230 correlates the appearance frequency area 901 with the appearance map 904 for each character data excluding binary data. The character data are sorted in descending order of the appearance frequency. As described later, in FIG. 10, the character data in the character data area 900 and the appearance frequencies in the appearance frequency area 901 are encrypted by exclusive OR (XOR) using a predetermined master key.

In the appearance map 904 of the appearance frequency management data, the main-body HTML file f0 with the file number "#0" at the left end of the appearance map 904 has "1" for both the presence flag of character data "月" and the presence flag of character data "日" and the AND (logical product) thereof is "1". Therefore, the main-body HTML file f0 includes the character data "月" and "日" and, if "月" and "日" are included in the input keywords, the main-body HTML file f0 is to be retrieved.

On the other hand, the main-body HTML file f1 having the file number "#1" has "1" for the presence flag of character data "月" and "0" for the presence flag of character data "日", and the AND (logical product) thereof is "0". Therefore, although the character data "月" is included, the character data "日" is not included in the main-body HTML file f1 and, if "月" and "日" are included in the input keywords, the main-body HTML file f0 is not to be retrieved.

Figure 11:
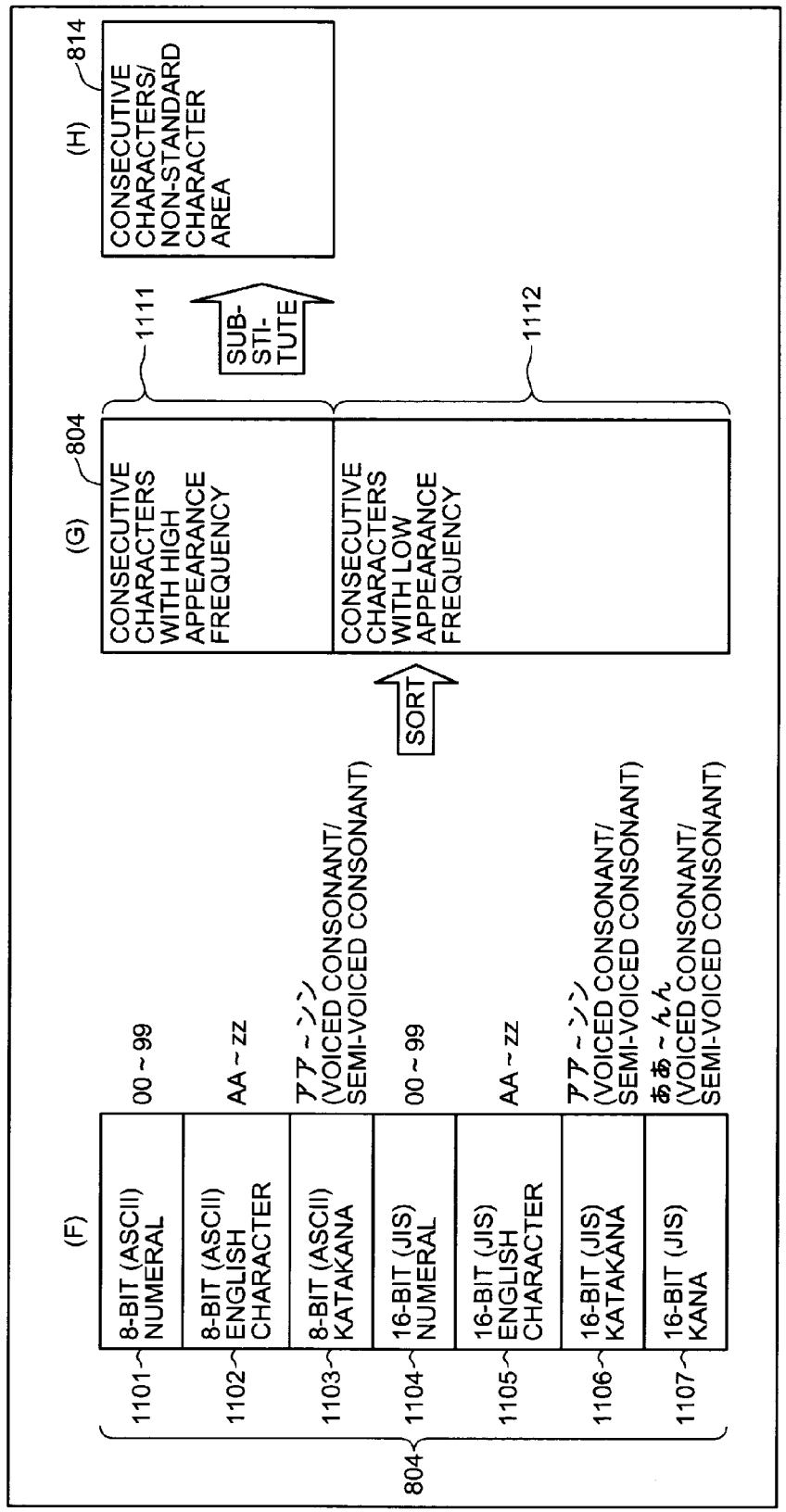
FIG. 11 is a schematic of consecutive characters/non-standard character substitution processing.

FIG. 11 is a schematic of consecutive characters/non-standard character substitution processing. In FIG. 11, section F depicts a data configuration of the consecutive characters area 804 of the appearance frequency management data 230 that results when consecutive character data is totaled by the character appearance frequency totaling unit 702. Section G depicts a data configuration of the consecutive characters area 804 that results after consecutive character data is sorted. Section H depicts a data configuration that results after the substitution processing.

In the data configuration depicted in section F, the consecutive characters area 804 includes areas 1101 to 1107. The area 1101 stores therein information concerning numerical string data ("00" to "99") in the 8-bit character-encoding scheme (ASCII) format; the information including the numerical string data, the appearance frequency, the number of appearance files, the appearance rank, and an appearance map.

The area 1102 stores therein information concerning English character string data ("AA" to "zz") in the 8-bit character-encoding scheme (ASCII) format; the information including the English character string data, the appearance frequency, the number of appearance files, the appearance rank, and an appearance map. The area 1103 stores therein information concerning katakana string data ("ァア" to "ンン", voiced consonant, semi-voiced consonant) in the 8-bit character-encoding scheme (ASCII) format; the information including the katakana string data, the appearance frequency, the number of appearance files, the appearance rank, and an appearance map.

The area 1104 stores therein information concerning numerical string data ("00" to "99") in the 16-bit character-encoding scheme (JIS) format; the information including the numerical string data, the appearance frequency, the number of appearance files, the appearance rank, and an appearance map. The area 1105 stores therein information concerning English character string data ("AA" to "zz") in the 16-bit character-encoding scheme (JIS) format; the information including the English character string data, the appearance frequency, the number of appearance files, the appearance rank, and an appearance map.

The area 1106 stores therein information concerning katakana string data ("ァア" to "ンン", voiced consonant, semi-voiced consonant) in the 16-bit character-encoding scheme (JIS) format; the information including the katakana string data, the appearance frequency, the number of appearance files, the appearance rank, and an appearance map. The area 1107 stores therein information concerning kana string data ("ぁあ" to "んん", voiced consonant, semi-voiced consonant) in the 16-bit character-encoding scheme (JIS) format; the information including the kana string data, the appearance frequency, the number of appearance files, the appearance rank, and an appearance map.

The data configuration depicted in section G is the result of sorting consecutive character data making up the data configuration depicted in section F in descending order of appearance frequency. In the data configuration depicted in section G, an area 1111 has information concerning consecutive character data having a high appearance frequency, which is to be substituted with non-standard data. An area 912, on the other hand, has information concerning consecutive character data having an appearance frequency that is lower than the given appearance frequency (low appearance frequency consecutive character data). This low appearance frequency consecutive character data is fragmented into single character data. Hence, the appearance frequency and the appearance map 904 of character data are revised.

Figure 12:
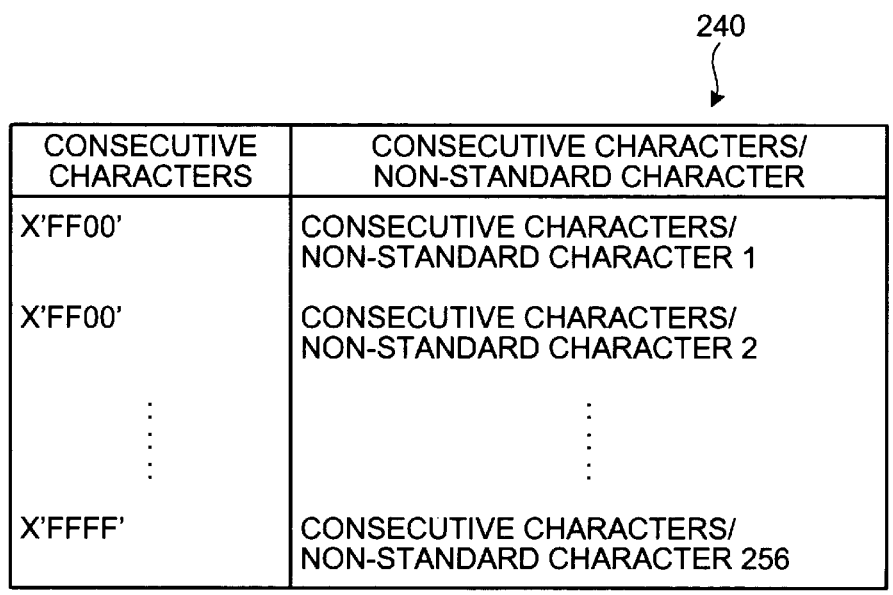
FIG. 12 is a diagram of a substitution table generated ultimately.

The data configuration depicted in section H is the result of substituting the high appearance frequency consecutive character data in the data configuration depicted in section G with non-standard character data. The consecutive characters/non-standard character area 814 stores therein information concerning consecutive characters/non-standard character data resulting from the substitution; the information including the consecutive characters/non-standard character data, the appearance frequency, the number of appearance files, the appearance rank, and an appearance map. FIG. 12 is a diagram of the substitution table 240 generated ultimately. The substitution table 240 is generated by correlating the consecutive character data in the area 911 of the data configuration depicted in section G of FIG. 9 and the consecutive characters/non-standard character data in the area 814 of the data configuration depicted in section H of FIG. 9.

Figure 13:
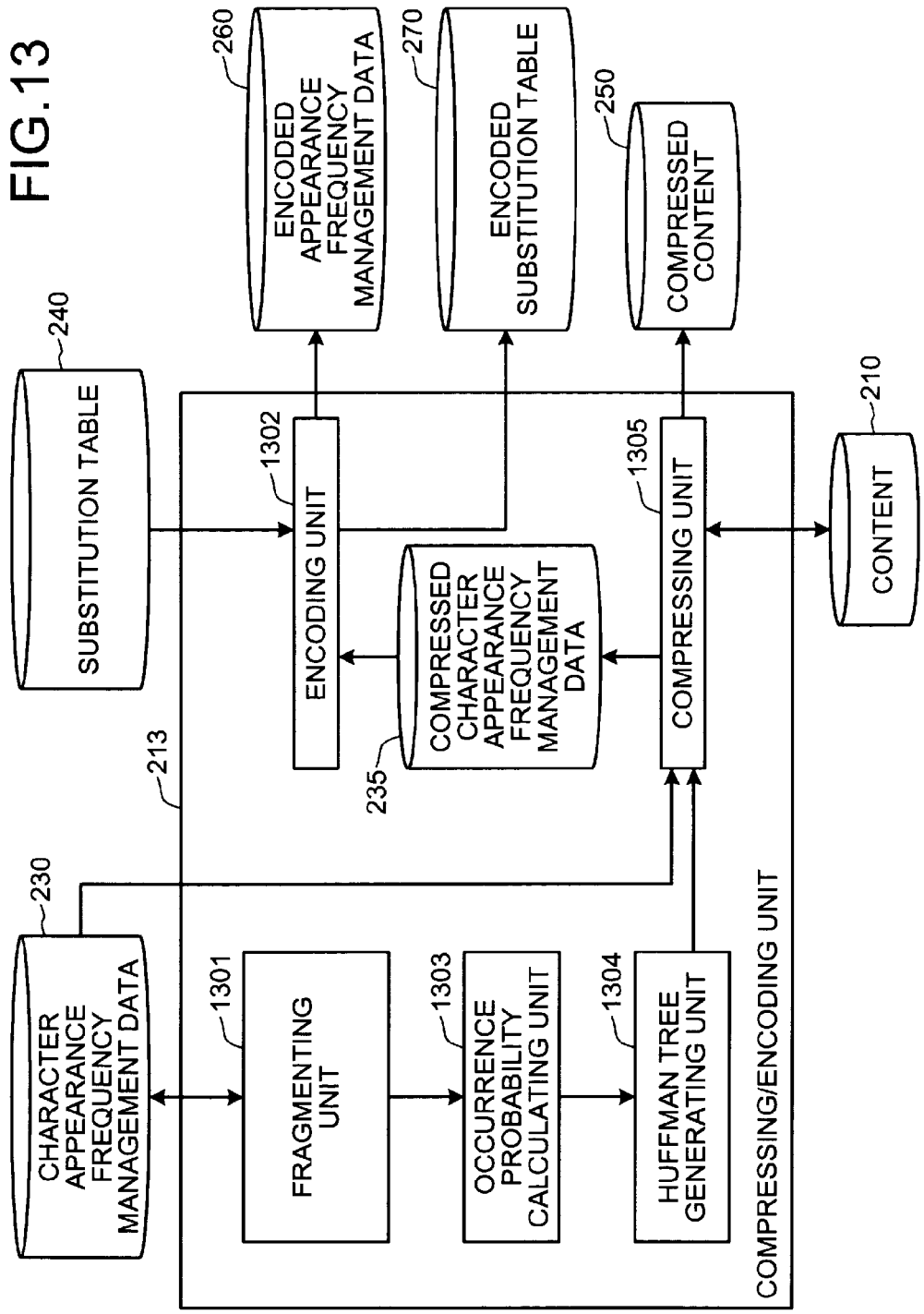
FIG. 13 is a block diagram of a functional configuration of a compressing/encoding unit depicted in FIG. 2.

FIG. 13 is a block diagram of a functional configuration of the compressing/encoding unit 213 depicted in FIG. 2. As depicted in FIG. 13, the compressing/encoding unit 213 includes a fragmenting unit 1301, an encoding unit 1302, an occurrence probability calculating unit 1303, a Huffman tree generating unit 1304, and a compressing unit 1305.

The fragmenting unit 1301 sorts the character data in the character area of the appearance frequency management data 230 generated by the appearance frequency management data generating unit 212 in descending order of the appearance frequency. The fragmenting unit 1301 fragments, into 8-bit codes, residual character data having a lower appearance frequency equal to or lower than a predetermined appearance frequency and stores the data into a binary area storing binary data that are the same 8-bit codes.

The encoding unit 1103, through XOR processing using a master key, encodes compressed appearance frequency management data 235 compressed by the compressing unit 1305, to generate the encoded appearance frequency management data 260. The substitution table 240 may also be encoded through XOR processing, using a master key, to generate the encoded substitution table 270.

The occurrence probability calculating unit 1303 sorts standard character data, consecutive characters/non-standard character data, and binary data in the appearance frequency management data 235 resulting from data fragmenting by the fragmenting unit 1301, in descending order of appearance frequency to calculate the occurrence probabilities of the data. The Huffman tree generating unit 1304 generates a Huffman tree from the occurrence probabilities calculated by the occurrence probability calculating unit 1303.

The file compressing unit 1305 compresses the content 210 using the Huffman tree generated by the Huffman tree generating unit 1304 to generate the compressed content 250. For example, the file compressing unit 1305 compresses the content 210 by assigning, in descending order of appearance frequency, i.e., in descending order of occurrence probability, shorter bits to character data written in the main-body HTML files f0 to fn. A compressed main-body HTML file in the compressed content 250 will be referred to as a "compressed file".

Figure 14:
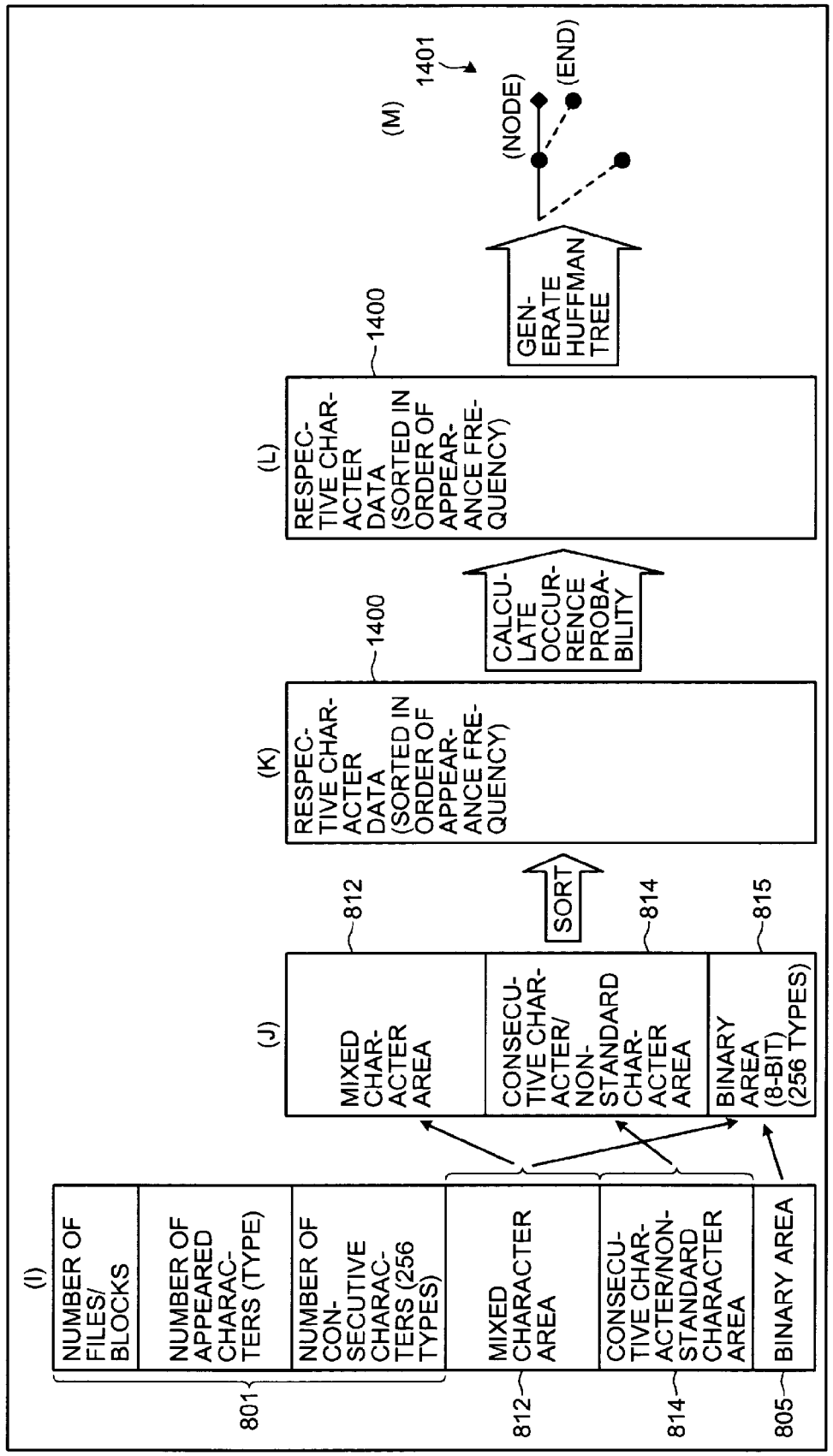
FIG. 14 is a diagram of a Huffman tree generating process by the compressing/encoding unit.

FIG. 14 is a diagram of a Huffman tree generating process by the compressing/encoding unit 213. Low appearance frequency character data in the appearance frequency management data 230 depicted in section I of FIG. 14, is fragmented by the fragmenting unit 1301, and the fragmented character data is stored in the binary area 815 storing binary data (data configuration (J) of FIG. 14).

Subsequently, in the data configuration (J), all of the character data in the mixture area 812, the consecutive characters/non-standard character area 814, and the binary area 815 are sorted in descending order of appearance frequency (data configuration (K) of FIG. 14). In an area 1400 of the data configuration of (K), the occurrence probability of each of character data is calculated using the appearance frequency as a Huffman compression parameter (data configuration (L) of FIG. 14). Finally, with the data configuration (L), a Huffman tree 1401 is generated from the occurrence probability of each of character data (data configuration (M) of FIG. 14).

Figure 15A:
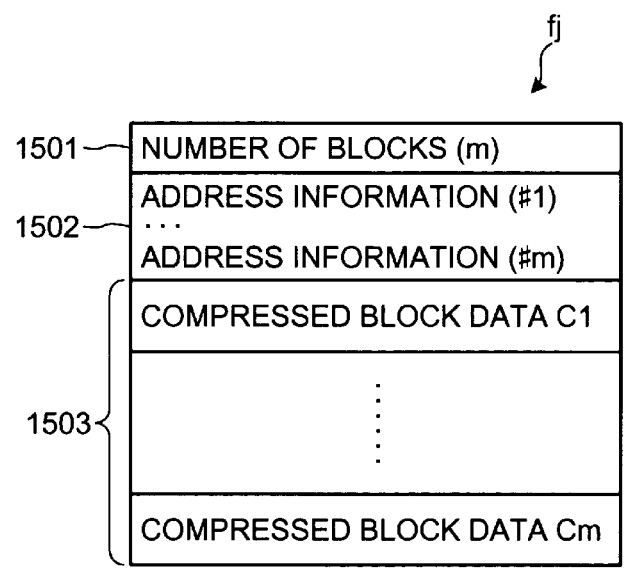
FIG. 15A is an explanatory diagram of the data structure of compressed content compressed by a compressing unit.

FIG. 15A is an explanatory diagram of the data structure of the compressed content 250 compressed by the compressing unit 1305. FIG. 15A will be described with respect to an arbitrary main-body HTML file fj. The main-body HTML file fj is made up of an area 1501 storing block count information (m), an area 1502 storing address information (#1 to #m) of the m blocks, and an area 1503 storing compressed block data C1 to Cm of the blocks.

FIG. 15B is a chart of comparison between the compressed block data C1 to Cm and original block data before compression. FIG. 15B indicates that the lengths of the compressed block data C1 to Cm are compressed to lengths of approximately half the lengths of the original block data.

Another function of the compressing unit 1305 depicted in FIG. 13 will be described. In this embodiment, the compressing unit 1305 compresses not only the content 210 but also the appearance frequency management data 230 to generate compressed appearance frequency management data 235. For example, the appearance map 904 in the appearance frequency management data 230 is compressed. The generated compressed appearance frequency management data 235 is encrypted by the encoding unit 1302 as described above.

Figure 16A:
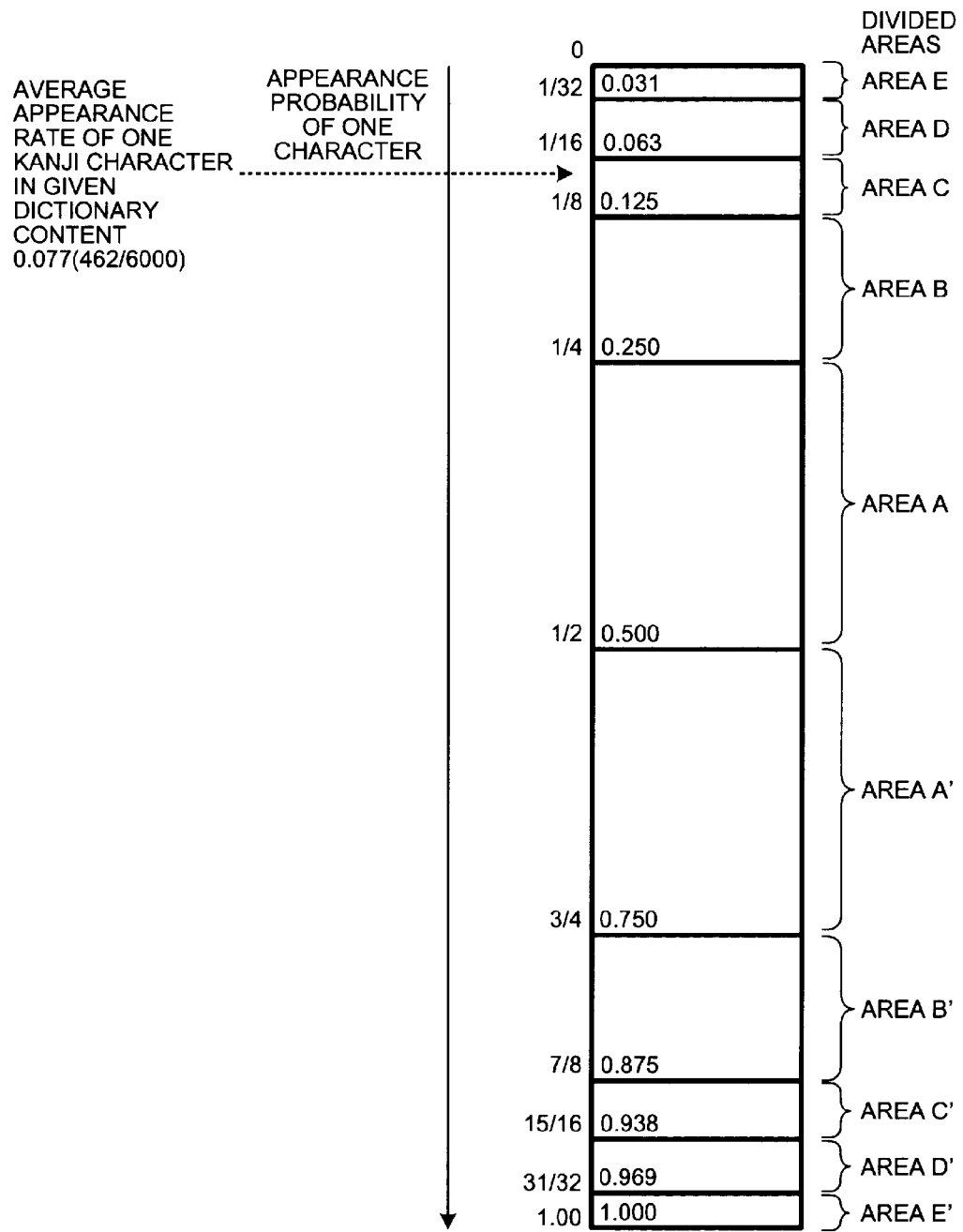
FIG. 16A is an explanatory diagram of appearance probabilities for character data in one file to be retrieved.

FIG. 16A is an explanatory diagram of the appearance probabilities of character data in one file to be retrieved. In FIG. 16A, the vertical axis indicates the appearance probabilities of character data in one file to be retrieved, where an appearance probability of 0% is located at the top and the appearance probability of 100% is located at the bottom. The range of the appearance probabilities from 0 to 100% is logarithmically divided. Divided areas partitioning the ranges of the appearance probabilities are formed by repeatedly dividing, in a vertical direction, an area into two such that probabilities are equalized.

Assuming that r denotes the appearance rate, the division forms an area E of $0 \leq r < 1/32$, an area D of $1/32 \leq r < 1/16$, an area C of $1/16 \leq r < 1/8$, an area B of $1/8 \leq r < 1/4$, an area A of $1/4 \leq r < 1/2$, an area A' of $1/2 \leq r < 3/4$, an area B' of $3/4 \leq r < 7/8$, an area C' of $7/8 \leq r < 15/16$, an area D' of $15/16 \leq r < 31/32$, and an area E' of $31/32 \leq r \leq 1$.

The areas having identical reference characters (alphabetical letter) have identical appearance rates. The area widths and the appearance probabilities are vertically symmetrical when an appearance probability of 50% is set as the boundary. For example, the appearance rates of both the area A and the area A' are 1/4. Since it is known that an average appearance rate of one character of a certain dictionary content is 0.077, the appearance rate belongs to the area C.

FIG. 16B is an explanatory diagram of a relationship between the appearance map 904 and the areas depicted in FIG. 16A. As depicted in FIG. 16B, the appearance rate r of FIG. 16A is calculated for each character data and correlated with the areas depicted in FIG. 16A. The appearance rate r is data indicative of an estimate of, among the files to be retrieved f0 to fn, the number of files to be retrieved in which the target character data appears and is the number of the files to be retrieved in which at least one target character data appears divided by the number of the files to be retrieved (n+1). If multiple character data appears in a given file to be retrieved, this is counted as one file. Since the area corresponding to character data varies depending on the appearance rate r, the appearance rate r acts as a compression parameter.

FIG. 16C is a schematic of an area/compression pattern correlation table indicative of the correlation between the areas depicted in FIG. 16A and compression patterns. In FIG. 16C, a compression pattern represents a type of a Huffman tree used for the compression of a bit string of character data in the appearance map 904. For example, the areas A and A' are not compressed and use no Huffman tree. The areas B and B' use a compression pattern of a 16-type Huffman tree for the compression to 16 types of code words as in the case of the normal 4-bit Huffman compression. A Huffman tree such as this 16-type Huffman tree applied to the normal Huffman compression is referred to as a "normal Huffman tree".

The areas C and C' use a compression pattern of a 16+1 (16-bit) type Huffman tree formed by adding a 16-bit special symbol string to a 16-type Huffman tree. The areas D and D' use a compression pattern of a 16+1 (32-bit) type Huffman tree formed by adding a 32-bit special symbol string to a 16-type Huffman tree. The areas E and E' use a compression pattern of a 16+1 (64-bit) type Huffman tree formed by adding a 64-bit special symbol string to a 16-type Huffman tree. These special symbol strings are sequence symbol strings (NULL symbol strings) of bit values meaning that no character data appears ("0" in this example).

The Huffman trees having 16, 32, 64, . . . -bit special symbol strings added as leaves as in the 16+1 (16, 32, 64, . . . -bit) Huffman trees are referred to as "special Huffman trees" for differentiation from the "normal Huffman trees".

The character data appearing at the appearance frequencies of the areas A' to E' are subjected to the Huffman compression by using the Huffman trees used in the areas A to E after the bit strings in the appearance map 904 are inverted.

Since it is not necessary to separately keep the Huffman trees for the areas A' to E' and the Huffman trees used for the areas A to E may directly be used, the reduction of the data amount may be achieved. These Huffman trees are stored in the RAM 103 and the HD 105 depicted in FIG. 1 and may be extracted by referring to the area/compression pattern correlation table.

FIGS. 16D to 16H are charts of the 4-bit Huffman compression in the areas. In the charts, symbol strings to [1111] at the left end represent bit string patterns of four bits among the bit strings in the appearance map and forms leaves of the Huffman trees.

A value of "code length (subtotal)" is a value obtained by multiplying "occurrence probability", "code length", and "numerical quantity". A value of "occurrence probability (subtotal)" is a value obtained by multiplying "occurrence probability (reference)" and "numerical quantity". The "occurrence probability (subtotal)" is allocated to each area in descending order of the "occurrence probability" of the symbol strings.

FIG. 16D is a chart of the 4-bit Huffman compression in the areas A and A'. The "occurrence probability (reference)" is allocated as 0.25 (=1/4), 0.125 (=1/8), 0.03125 (=1/32), 0.00390625 (=1/256), and 0.000976563 (=1/1024) in descending order of the "occurrence probability" of the symbol strings. If the appearance rate r of the object character data corresponds to the areas A and A', the compression is not performed.

FIG. 16E is a chart of the 4-bit Huffman compression in the areas B and B'. The "occurrence probability (reference)" is allocated as 0.5 (=1/2), 0.125 (=1/8), 0.0625 (=1/16), 0.015625 (=1/64), 0.00390625 (=1/256), and 0.000976562 (=1/1024) in descending order of the "occurrence probability" of the symbol strings.

If the appearance rate r of the object character data corresponds to the area C and C', the symbol strings to [1111] included in the bit string of the character data are compressed to corresponding code words by the 16-type Huffman tree based on the "occurrence probability (subtotal)".

FIG. 16F is a chart of the 4-bit Huffman compression in the area C and C'. In this chart, 16-bit symbol string "0000 . . . 0000" is included along with the 4-bit symbol strings to [1111]. The "occurrence probability (reference)" is allocated as 0.25 (=1/4), 0.25 (=1/4), 0.125 (=1/8), 0.0625 (=1/16), 0.00012207 (=1/8192), 0.000976563 (=1/1024), and 0.00012207 (=1/8192) in descending order of the "occurrence probability" of the symbol strings.

If the appearance rate r of the object character data corresponds to the area C and C', the symbol strings to [1111] and "0000 . . . 0000" included in the bit string of the character data are compressed to corresponding code words by the 16+1 (16-bit)-type Huffman tree based on the "occurrence probability (subtotal)".

FIG. 16G is a chart of the 4-bit Huffman compression in the area D and D'. In this chart, 32-bit symbol string "0000 . . . 0000" is included along with the 4-bit symbol strings to [1111]. The "occurrence probability (reference)" is allocated as 0.25 (=1/4), 0.25 (=1/4), 0.125 (=1/8), 0.0625 (=1/16), 0.00012207 (=1/8192), 0.000976563 (=1/1024), and 0.00012207 (=1/8192) in descending order of the "occurrence probability" of the symbol strings.

If the appearance rate r of the object character data corresponds to the area D and D', the symbol strings to [1111] and "0000 . . . 0000" included in the bit string of the character data are compressed to corresponding code words by the 16+1 (32-bit)-type Huffman tree based on the "occurrence probability (subtotal)".

FIG. 16H is a chart of the 4-bit Huffman compression in the area E and E'. In this chart, 64-bit symbol string "0000 . . . 0000" is included along with the 4-bit symbol strings to [1111]. The "occurrence probability (reference)" is allocated as 0.25 (=1/4), 0.25 (=1/4), 0.125 (=1/8), 0.0625 (=1/16), 0.00012207 (=1/8192), 0.000976563 (=1/1024), and 0.00012207 (=1/8192) in descending order of the "occurrence probability" of the symbol strings.

If the appearance rate r of the object character data corresponds to the area E and E', the symbol strings to [1111] and "0000 . . . 0000" included in the bit string of the character data are compressed to corresponding code words by the 16+1 (64-bit)-type Huffman tree based on the "occurrence probability (subtotal)".

FIG. 16I is a chart of an example of correlation of symbol strings with code words when the 16-bit symbol string depicted in FIG. 16F is added. In FIG. 16I, since the 16-bit symbol string newly added as a leaf has the highest occurrence probability, a code word "00" with a code length of two bits is allocated thereto. This code length is corrected to shorten the code length.

FIG. 16J is an explanatory diagram of a comparative example of the 4-bit Huffman compression before and after the addition of a 17th symbol string acting as a leaf. In FIG. 16J, the upper and lower charts are charts of the 4-bit Huffman compression when the appearance rate of the character data is 10%, for example. The upper chart represents the compression before the addition of the 12-bit symbol string [000000000000] and the lower chart represents the compression after the addition of the 17th 12-bit symbol string [000000000000].

In the lower chart, if the 17th 12-bit symbol string is added, a target of the occurrence probability of the symbol string is set to exceed 1/4. This leads to correction of the occurrence probability of the symbol string having the highest occurrence probability before the addition.

Although two bits are allocated to the code length of the 17th 12-bit symbol string, the code length is corrected such that the code length of the code word is shortened. In this case, the code length of the 17th 12-bit symbol string is corrected from 2 bits to 0.66667 bits (=2 bits×4 bits/12 bits).

Comparing the average code lengths of the upper and lower charts, since the average code length in the upper chart is 0.51355 and the average code length in the lower chart is 0.460384089, the addition of the 17th 12-bit symbol string improves the compression rate by 10%.

FIG. 16K is an explanatory diagram of a data structure of bit string compression data. The bit string compression data 1600 includes an address 1601, a compression pattern 1602, an area flag 1603, a compressed bit string 1604, and padding 1605.

The address 1601 is a pointer pointing to the character data of the compression source bit string of the bit string compression data 1600. The compression pattern 1602 is information identifying the Huffman tree used for the Huffman compression. The area flag 1603 is a flag identifying whether the appearance rate of the character data of the compression source bit string of the bit string compression data 1600 falls within the range of the areas A to E or within the range of the areas A' to E'.

The compressed bit string 1604 is a bit string formed by compressing the compression source bit string using the Huffman tree identified by the compression pattern. The padding 1605 is added as needed to achieve a variable length of the bit string compression data 1600.

Although the 4-bit Huffman compression has been described with reference to FIGS. 16A to 16K, this is applicable to Huffman compression in other systems, such as 2-bit, 3-bit, 8-bit, and 16-bit systems.

FIG. 17 is a functional diagram of the retrieval initializing unit 221 depicted in FIG. 2. As depicted in FIG. 17, the retrieval initializing unit 221 includes a decoding unit 1701, a fragmenting unit 1702, an occurrence probability calculating unit 1703, a Huffman tree generating unit 1704, an appearance map setting unit 1705, and a decompressing unit 1706.

The decoding unit 1701 decodes the encoded appearance frequency management data 260. For example, the decoding unit 1701 executes a decoding process through exclusive-OR (XOR) using the encoding master key of FIG. 13. In the same manner, the decoding unit 1701 also decodes the encoded substitution table 270 into the original substitution table 240. The fragmenting unit 1702, the occurrence probability calculating unit 1703, and the Huffman tree generating unit 1704 execute processes identical to those executed by the fragmenting unit 1301, the occurrence probability calculating unit 1303, and the Huffman tree generating unit 1304 depicted in FIG. 13 to generate a Huffman tree 1710.

The decompressing unit 1706 decompresses the compressed appearance frequency management data 235 decoded by the decoding unit 1701. Specifically, the bit string compression data 1600 of the character data is read to identify the address 1601, the compression pattern 1602, and the area flag 1603. The compressed bit string 1604 is decompressed using the Huffman tree used at the time of compression. As a result, the appearance frequency management data 230 is decompressed.

The appearance map setting unit 1705 reads the appearance map 904 of the decoded appearance frequency management data 2300, and expands the read contents on a memory to link the contents to a row/cell (kuten) code correspondence table. The row/cell (kuten) code is character code for two-byte characters established by Japanese Industrial Standards (JIS). The row/cell correspondence table is the table in which the address of each row and cell is stored.

Figure 18:
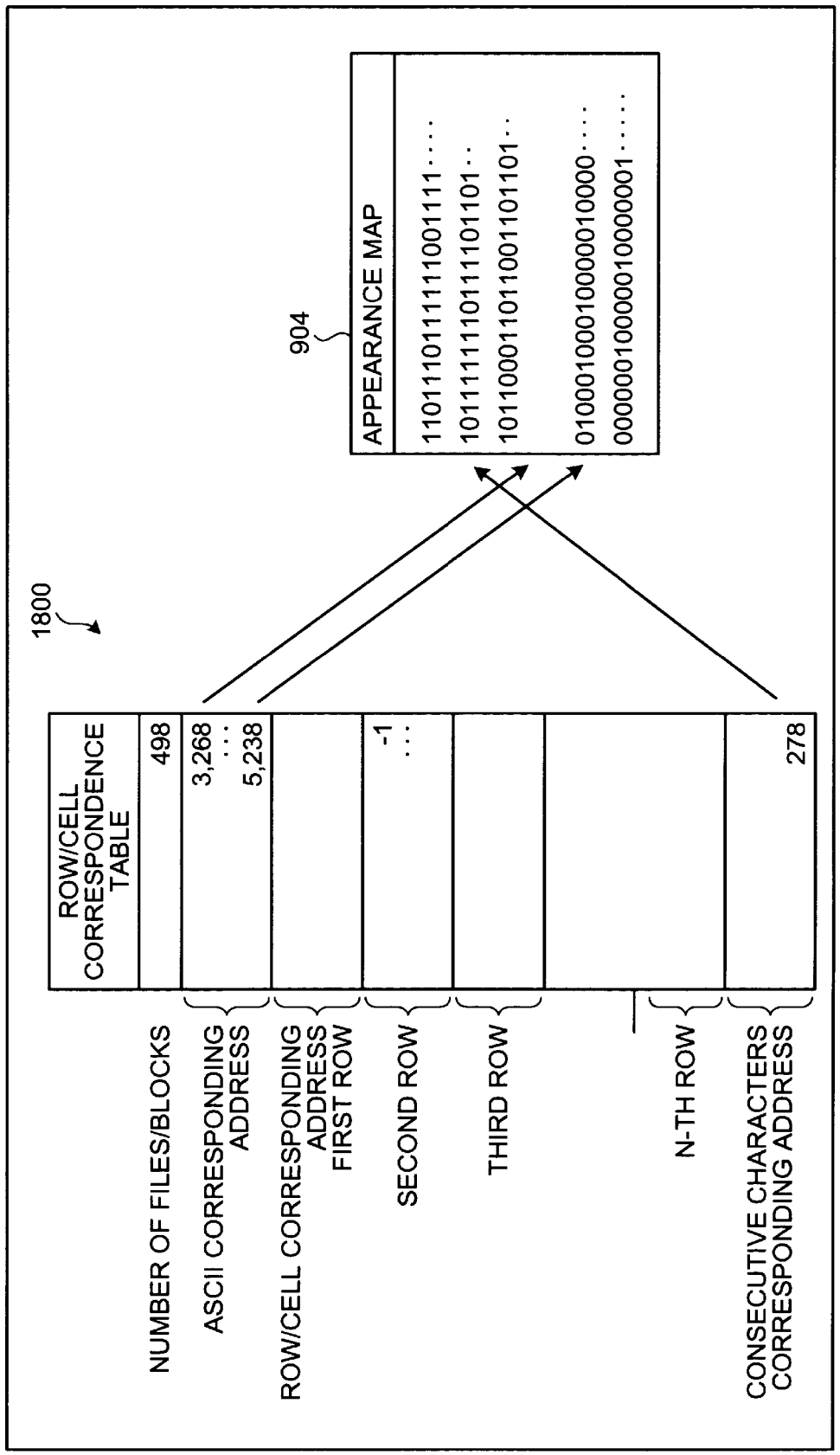
FIG. 18 is an explanatory diagram of the correlation between a row/cell correlation table and the appearance map.

FIG. 18 is an explanatory diagram of the correlation between a row/cell correlation table and the appearance map. By using a row/cell correlation table 1800 to correlate the character data of the appearance frequency management data 230 with row/cell codes, flags indicative of the presence/absence of character data corresponding to row/cell codes may be called up from the appearance map 904.

Figure 19:
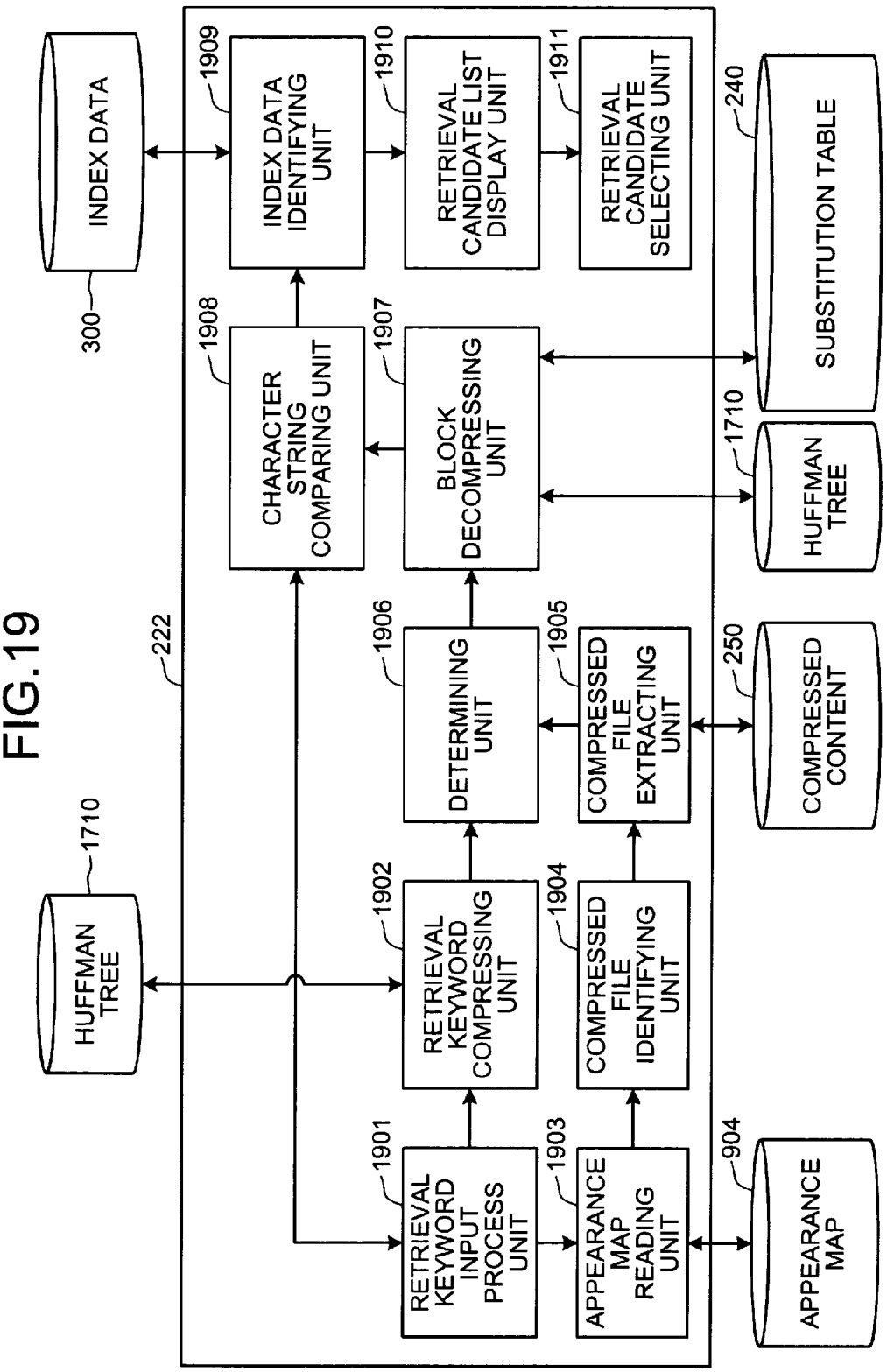
FIG. 19 is a functional diagram of a full text search unit in the retrieval executing unit.

FIG. 19 is a functional diagram of the full text search unit 222 in the retrieval executing unit 622. As depicted in FIG. 19, the full text search unit 222 includes a retrieval keyword input process unit 1901, a retrieval keyword compressing unit 1902, an appearance map reading unit 1903, a compressed file identifying unit 1904, a compressed XML file extracting unit 1905, a determining unit 1906, a block decompressing unit 1907, a character string comparing unit 1908, an index data identifying unit 1909, a retrieval candidate list display unit 1910, and a retrieval candidate selecting unit 1911.

The retrieval keyword input process unit 1901 receives input of a retrieval keyword from a user. When multiple retrieval keywords are received, the retrieval keyword input process unit 1901 connects respective character strings of the retrieval keywords. When consecutive characters of a retrieval keyword is equivalent to given consecutive characters, the retrieval keyword input process unit 1901 replaces the consecutive characters with a non-standard character using the substitution table 240, and then fragments the retrieval keyword into single characters.

The retrieval keyword compressing unit 1902 compresses the retrieval keyword input through the retrieval keyword input process unit 1901, using the Huffman tree 1710 generated by the Huffman tree generating unit 1704 of the retrieval initializing unit 221. Using the appearance map 904 set by the appearance map setting unit 1705, the appearance map reading unit 1903, for each character of the retrieval keyword, reads a string of bits indicative of the presence/absence of the character in the HTML files f0 to fn. Because each character data on the appearance maps 904 are linked to row/cell codes through the row/cell corresponding table, the appearance map reading unit 1903 is able to read a string of bits for each character data of the retrieval keyword matching the row/cell code.

The compressed file identifying unit 1904 calculates the logical product of bit strings respectively corresponding to the HTML files f0 to fn read from the appearance map 904 to identify a compressed file in which all of the character data of the retrieval keyword are present, thus narrowing down compressed files. An example of a narrowing down process will be described.

TABLE 1

| RETRIEVAL KEYWORD | file numbers of main-body HTML files | | | |
|---|---|---|---|---|
| "増殖細胞" | #0 | #1 | #2 | #3 |
| PRESENCE FLAG STRING FOR"増" | 1 | 1 | 0 | 0 |
| PRESENCE FLAG STRING FOR"殖" | 0 | 1 | 1 | 0 |

TABLE 1-continued

| RETRIEVAL KEYWORD | file numbers of main-body HTML files | | | |
|---|---|---|---|---|
| "増殖細胞" | #0 | #1 | #2 | #3 |
| PRESENCE FLAG STRING FOR"細" | 0 | 1 | 1 | 0 |
| PRESENCE FLAG STRING FOR"胞" | 0 | 1 | 0 | 0 |
| NARROWING RESULT | 0 | 1 | 0 | 0 |

In Table 1 above, the retrieval keyword is "増殖細胞" and the number of the main-body HTML files f included in the content 210 is four, i.e., the file numbers #0 to #3. In Table 1, for example, the presence flag string of the character "増" is [1100]. This presence flag string indicates that the character "増" is included in the main-body HTML files f0 and f1 having the file numbers #0 and #1 and that the character "増" is not included in the main-body HTML files f2 and f3 having the file numbers #2 and #3.

In Table 1, the narrowing result indicates a logical product (AND) result of the presence flags for each file number. Since the main-body HTML file f1 of the file number #1 alone has the flag "1" indicative of the presence in the narrowing result, it is known that all the characters "増", "殖", "細", and "胞" making up the retrieval keyword exist only in the main-body HTML file f1 of the file number #1 and that not all the characters exist in the main-body HTML files f0, f2, and f3 having other file numbers (#0, #2, and #3). Therefore, the file to be opened as a retrieval subject is identified as the main-body HTML file f1 of the file number #1 and unnecessary file opening/closing processes may be prevented to improve the retrieval speed.

The compressed file extracting unit 1905 extracts, from among the main-body HTML files compressed in the compressed content 250, the main-body HTML file identified by the compressed file identifying unit 1904. In the example of the table above, the compressed main-body HTML file f1 of the file number #1 (hereinafter, "compressed main-body HTML file") is extracted.

The determining unit 1906 determines whether the compressed main-body HTML file extracted by the compressed file extracting unit 1905 includes the retrieval keyword (hereinafter, "compressed keyword") compressed by the retrieval keyword compressing unit 1902. For example, the determination is made for each of the compressed block data in the compressed main-body HTML file.

If this determination result indicates no matching, it is known that the compressed main-body HTML file does not include the retrieval keyword. On the other hand, if the determination result indicates matching, it is known that the compressed main-body HTML file includes the retrieval keyword. For example, in the above table, it is known that the main-body HTML file of the file number #1 includes a character string that is the retrieval keyword "増殖細胞".

The block decompressing unit 1907 decompresses the compressed block data of the compressed main-body HTML file determined to be a match by the determining unit 1906. The determining unit 1906 and the block decompressing unit 1907 enable the determination to be made while the main-body HTML file is in compressed state and non-matching compressed main-body HTML files are excluded from among candidates, enabling decompression of only the matching compressed main-body HTML file. If sequence non-standard character data is included in the main-body HTML file decompressed by the block decompressing unit 1907, the sequence non-standard character data is converted to original consecutive character data by using the substitution table 240 decoded by the decoding unit 1701.

The character string comparing unit 1908 compares character strings in the block data decompressed by the block decompressing unit 1907 with the retrieval keyword input through the retrieval keyword input processing unit 1901. If a data item exists for a character string matched with the retrieval keyword, the file number and the anchor name of the data item are recorded to identify the index data 300. Hereinafter, the identified index data 300 is referred to as the "identified index data 300".

The retrieval candidate list displaying unit 1910 edits the index data 300 from the file number and the anchor of the data items in the identified index data 300 to display, on the display 108, a retrieval candidate list of the index words. The retrieval candidate selecting unit 1911 receives input of a retrieval candidate selected, from the retrieval candidate list, by the user.

Figure 20:
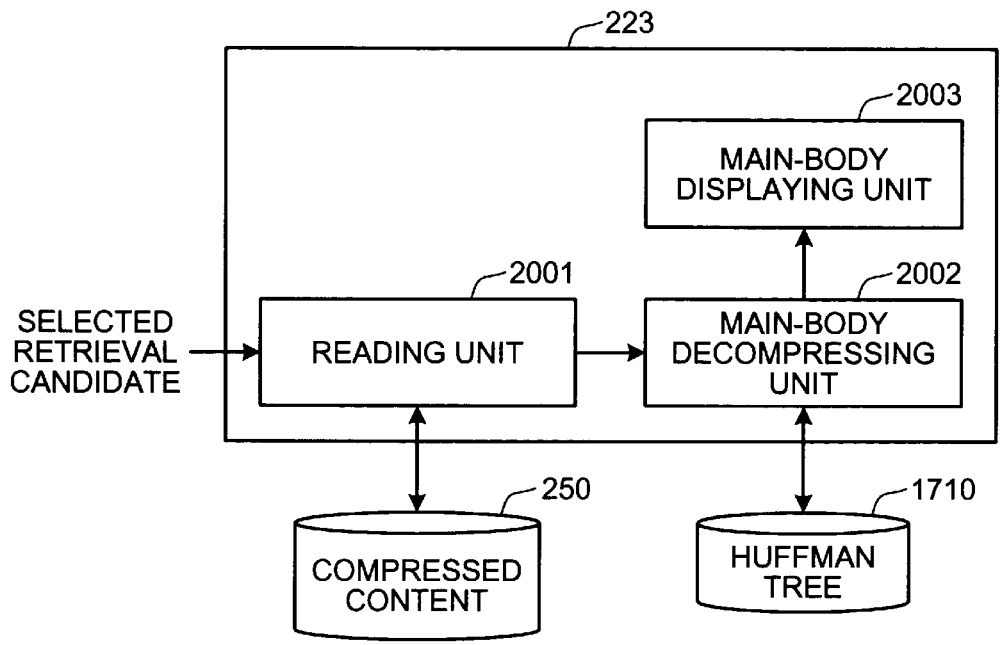
FIG. 20 is a functional diagram of a retrieval result display unit depicted in FIG. 2.

FIG. 20 is a functional diagram of the retrieval result display unit 223 depicted in FIG. 2. As depicted in FIG. 20, the retrieval result display unit 223 includes a reading unit 2001, a main-body decompressing unit 2002, and a main-body display unit 2003.

The reading unit 2001 reads from the compressed content 250, a item data, which is a retrieval candidate selected via the retrieval candidate selecting unit 2111. The main-body decompressing unit 2002 decompresses, using the Huffman tree 1801, the item data read out by the reading unit 2001. The main-body display unit 2003 displays the item data decompressed by the main-body decompressing unit 2002 as a retrieval result.

Figure 21:
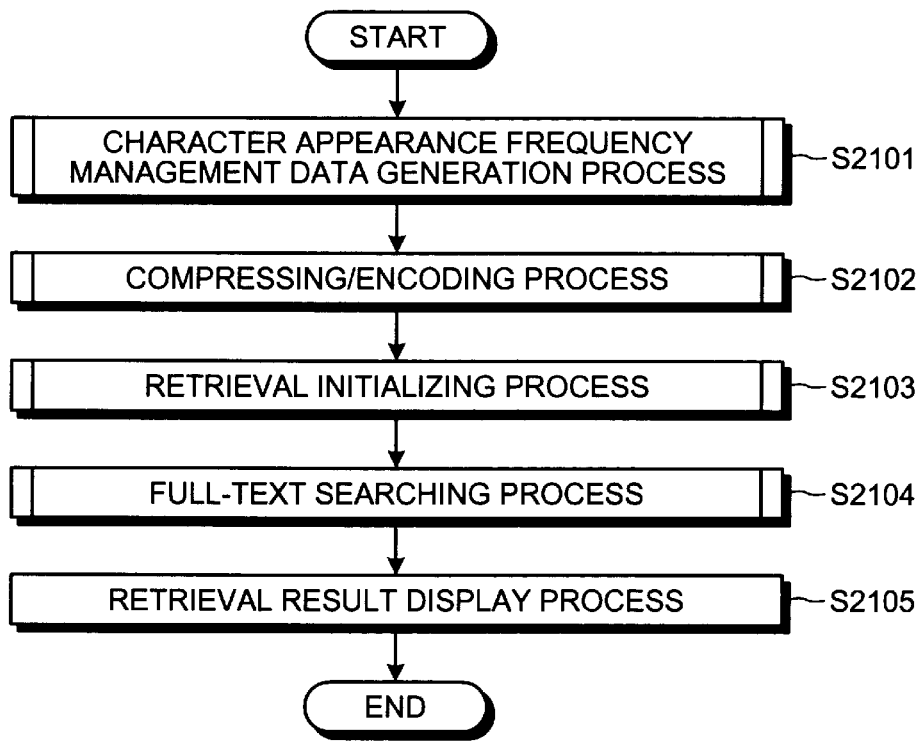
FIG. 21 is a flowchart of an information retrieval process by the information retrieving apparatus according to the first embodiment.

FIG. 21 is a flowchart of an information retrieval process by the information retrieving apparatus according to the first embodiment. As depicted in FIG. 21, the appearance frequency management data generating unit 212 executes an appearance frequency management data generating process (step S2101).

The compressing/encoding unit 213 then executes a compressing/encoding process (step S2102). Subsequently, the retrieval initializing unit 221 executes a retrieval initializing process (step S2103). The retrieval executing unit 622 then executes a retrieval process (step S2104). Finally, the retrieval result display unit 223 executes a retrieval result display process (step S2105). In the retrieval result display process, a retrieval candidate (item data) selected from a retrieval candidate list is read out from the compressed content 250, and is decompressed using the Huffman tree to display the full text of the item data as a retrieval result.

Figure 22:
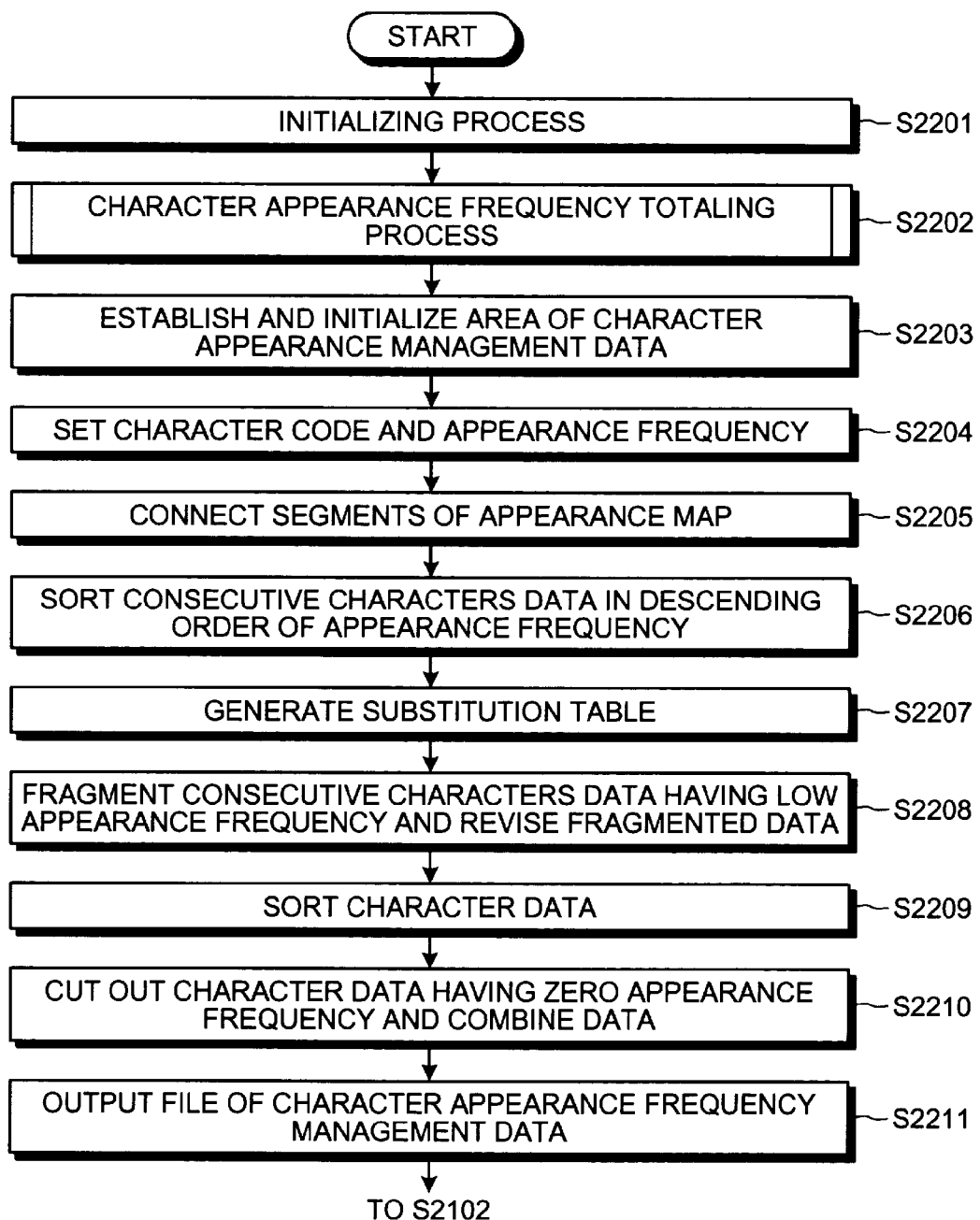
FIG. 22 is a flowchart of an appearance frequency management data generating process depicted in FIG. 21.

FIG. 22 is a flowchart of the appearance frequency management data generating process (step S2101) of FIG. 21. As depicted in FIG. 22, an initializing process is executed (step S2201). For example, a totaling area corresponding to the row/cell code of 8-bit/16-bit character data, consecutive characters data, and binary data is established, and segments, etc., of the appearance frequency and the appearance map are initialized. The code for character data is set, and various counters are initialized.

A character appearance frequency totaling process is then executed (step S2202). A detailed procedure of the character appearance frequency totaling process will be described later. Following the character appearance frequency totaling process, an area for the appearance frequency management data 230 is established and initialized (step S2203), and the character code and appearance frequency of 8-bit/16-bit character data, consecutive characters data, and binary data is set (step S2204).

Respective segments of the appearance map are linked (step S2205), and consecutive characters data in the consecutive characters area are sorted in descending order of appearance frequency to select 256 types of consecutive characters data (step S2206). This reduces the volume of consecutive characters data.

Subsequently, consecutive characters/non-standard character substitution processing is performed, and the substitution table 240 is generated (step S2207). For example, consecutive characters data is substituted with non-standard character data in descending order of appearance frequency to generate consecutive characters/non-standard character data and the substitution table 240.

Consecutive-character data with a low appearance frequency, that is, consecutive-character data not substituted with non-standard character data, is fragmented into single character data, which are allocated to the corresponding areas in a revision process (step S2208). For example, consecutive-character data with a low appearance frequency is divided into phonogramic data, the frequency of which is subject to addition and the appearance map of which is subject to logical OR calculation.

Subsequently, character data is sorted in descending order of appearance frequency (step S2209), and character data having zero frequency is cut out, and then consecutive characters/non-standard character data and binary data are combined together (step S2210). The appearance frequency management data 500 resulting from the joining is output to a file (step S2211), after which the procedure proceeds to step S2102.

Figure 23:
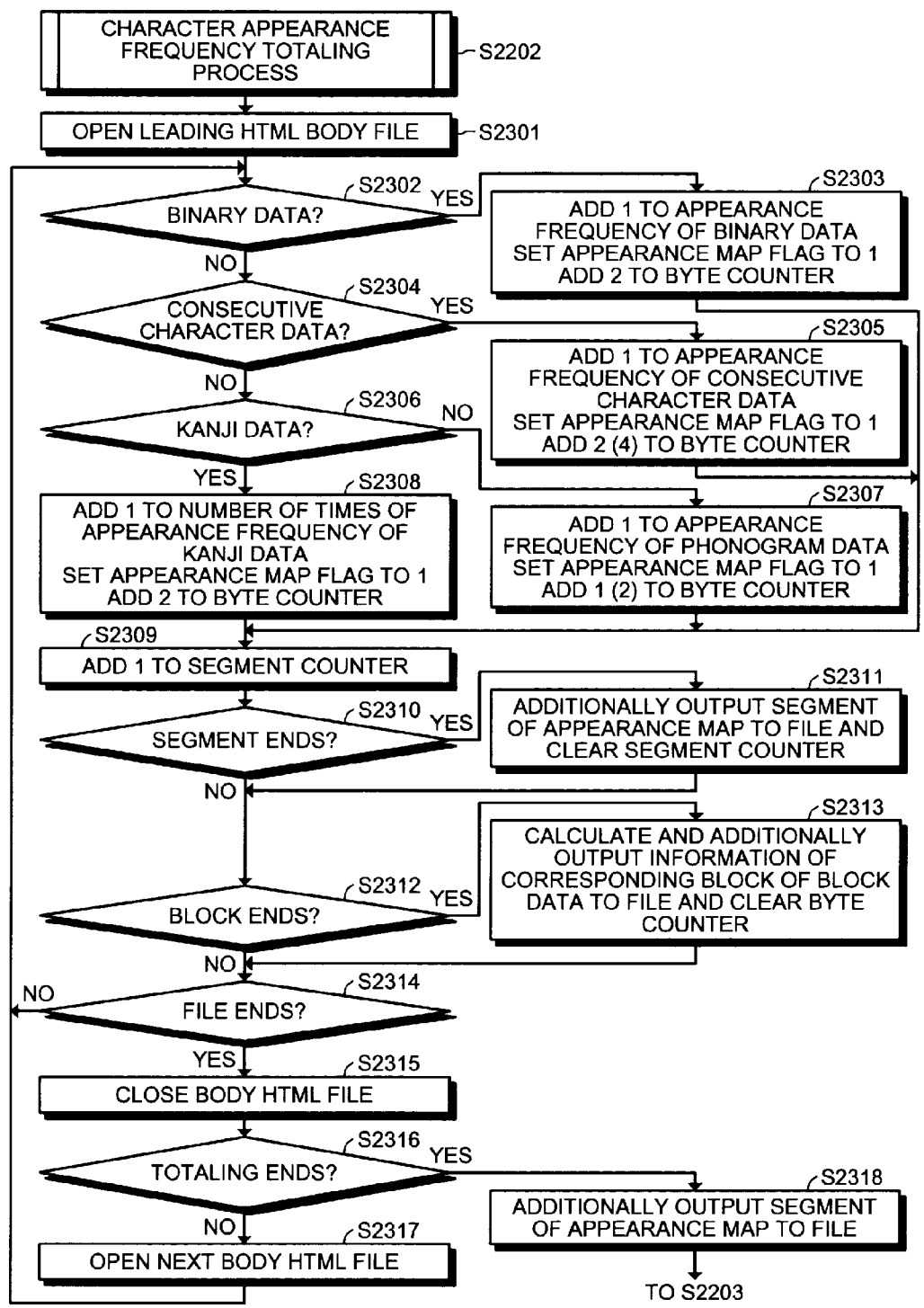
FIG. 23 is a flowchart of a character appearance frequency totaling process.

FIG. 23 is a flowchart of the character appearance frequency totaling process (step S2202). As depicted in FIG. 23, the head main-body HTML file f0 (file #0) is opened first (step S3201).

Data is extracted sequentially from the opened main-body HTML file. If extracted data is binary data (step S3202: YES), one point is added to the appearance frequency of the binary data, and the presence flag on the appearance map of the binary data and corresponding to the opened file is set to "1", and then two points are added to a byte counter adds (step S2303).

If the extracted data is not binary data at step S2302 (step S2302: NO), whether the extracted data is consecutive-character data is determined (step S2304). If the extracted data is consecutive-character data (step S2304: YES), one point is added to the appearance frequency of the consecutive-character data, and the presence flag in the appearance map and corresponding to the consecutive-character data is set to "1", and two (or four) points is added to the byte counter (step S2305).

If the extracted data is not consecutive-character data at step S2304 (step S2304: NO), whether the extracted data is kanji data is determined (step S2306). If the extracted data is not kanji data (step S2306: NO), the extracted data is phonogramic data. Accordingly, one point is added to the appearance frequency of the phonogramic data, and the presence flag in the appearance map and corresponding to the phonogramic data is set to "1", and one (or two) point is added to the byte counter (step S2307).

If the extracted data is kanji data at step S2306 (step S2306: YES), one point is added to the appearance frequency of the kanji data, and the presence flag in the appearance map and corresponding to the kanji data is set to "1", and then two points are added to the byte counter (step S2308), after which the procedure proceeds to step S2311 of FIG. 32B.

One point is added to a segment counter for segments of the appearance map (step S2309), and whether a segment is finished, that is, whether the totaling process with respect to the segments is finished is determined (step S2310). If the totaling process with respect to the segments is finished (step S2310: YES), the segment of the appearance map is output additionally to the file, and the segment counter is reset (step S2311), after which the procedure proceeds to step S2312.

If the totaling process on the segments is not finished (step S2310: NO) or after execution of step S2311, whether a block is finished, e.g., whether the total number of characters reaches 4,000 characters is determined (step S2312).

If the block is finished (step S2312: YES), block information made up of the main-body HTML file number of a main-body HTML file fi having the block data, and the block number, offset, number of characters, and length of the block data is generated, and is output additionally to the file, and the byte counter is reset (step S2313), after which the procedure proceeds to step S2314.

If the block is not finished (step S2312: NO) or after execution of step S2313, whether the file is finished, that is, whether the totaling process with respect to the currently opened main-body HTML file is finished is determined (step S2314). If the totaling process with respect to the currently opened main-body HTML file is not finished (step S2314: NO), the procedure returns to step S2302, at which the next data is extracted, and the type of the extracted data is specified to perform the totaling process (steps S2302 to S2308).

If the totaling process on the currently opened main-body HTML file is finished at step S2314 (step S2314: YES), whether the totaling process comes to an end is determined, and the end of the totaling process leads to closing of the currently opened main-body HTML file (step S2315). Subsequently, whether the totaling process for each of the main-body HTML files has been completed is determined (step S2316).

If the totaling process for each of the main-body HTML files has not been completed (step S2316: NO), a main-body HTML file having the next file number is opened (step S2317). The procedure then returns to step S2302 of FIG. 32A, at which the next data is extracted, and the type of the extracted data is identified to perform the totaling process (steps S2302 to S2308).

If the totaling process for each of the main-body HTML files has been completed as determined at step S2316 (step S2316: YES), the segment of the appearance map is output to the file (step S2318), after which the procedure proceeds to step S2203 to end a series of the processing.

FIG. 24A is a flowchart of the compressing/encoding processing (step S2102) of FIG. 21. As depicted in FIG. 24A, character data in the mixture area 812 are sorted in the order of appearance frequency (step S2401).

Character data with a low appearance frequency is fragmented into 8-bit data, of which the appearance frequency is added to the appearance frequency of the corresponding binary data (step S2402). Character data, consecutive characters/non-standard data, and binary data in the mixture area 812 are linked, and sorted in the order of appearance frequency (step S2403). Subsequently, the occurrence probability is calculated for each of the sorted character data, based on the appearance frequency (step S2404). Based on the calculated occurrence probability, a Huffman tree common to the character data is generated (step S2405).

The main-body HTML files are then compressed (step S2406). For example, the main-body HTML files in the content folder 400 are converted into blocks of, for example, 4000 characters and are compressed by using the Huffman tree.

Compression processing of compressing each of the main-body HTML files is then performed (step S2407). This compression processing will be described later with reference to FIG. 24B.

The compressed appearance frequency management data 235 is encoded (step S2408). For example, an encoding area of the compressed appearance frequency management data 235 (area for character data and appearance frequency) is encoded through exclusive-OR (XOR), using a master key. The substitution table 240 is then encoded (step S2409). For example, an encoding area of the substitution table 240 is encoded through exclusive-OR (XOR), using a master key. Subsequently, the procedure proceeds to the retrieval initializing process (step S2103) to end a series of the processing.

FIG. 24B is a flowchart of the appearance frequency management data compression processing. As depicted in FIG. 24B, first, it is determined whether unprocessed character data exists (step S2471). If unprocessed character data exists (step S2471: YES), arbitrary character data is selected from the unprocessed character data (step S2472). If character data are read from the headmost character data, the unprocessed character data is inevitably the character data next to the processed character data.

An appearance rate of the selected character data is acquired (step S2473). If the appearance rate is preliminarily kept by the appearance frequency management data 230, the appearance rate is retained and if the appearance file count 902 is retained, the appearance rate of the selected character data is calculated by the appearance file count of the selected character data/the total number of files to be retrieved (n+1).

This appearance rate is set as the compression parameter to identify an area including the appearance of the selected character data from the areas A to E and the areas A' to E' (step S2474). When the area is identified, a reference is made to the area/compression pattern correlation table depicted in FIG. 16C to extract the Huffman tree used for the compression (S2475). As a result, the compression pattern of the selected character data is identified.

The bit string of the selected character data is then extracted (step S2476). Specifically, the bit string of the selected character data is sequentially written from the beginning into a register. It is determined whether the appearance rate is 50% or more (step S2477). In the case of 50% or more (step S2477: YES), the appearance rate falls within the range of the areas A' to E' and, therefore, the bit string retained in the register is inverted (step S2478).

On the other hand, in the case of less than 50% (step S2477: NO), the appearance rate falls within the range of the areas A to E and, therefore, the bit string retained in the register is not inverted and the procedure goes to step S2479. The bit string retained in the register is subjected to the Huffman compression using the Huffman tree extracted at step S2475 (step S2479). As a result, the bit string compression data 1600 for the selected character data is generated.

When the Huffman compression of the bit string of the selected character data is completed, the procedure goes back to step S2471. If no unprocessed character data exists at step S2471 (step S2471: NO), the procedure goes to step S2408 depicted in FIG. 24A.

FIG. 25A is a flowchart of the retrieval initializing process (step S2103) of FIG. 21.

As depicted in FIG. 25A, the start of the retrieval initializing process is waited for (step S2501: NO). When the retrieval initializing process starts (step S2501: YES), the encoded compressed appearance frequency management data 660 encoded by the compressing/encoding process is decoded (step S2502). For example, the encoding area of the encoded appearance frequency management data (area for character data and appearance frequency) is decoded through exclusive-OR (XOR), using the master key used in the encoding process.

The encoded substitution table 270 is decoded (step S2503). For example, the encoding area of the encoded substitution table 270 is decoded through exclusive-OR (XOR), using the master key used in the encoding process.

The appearance frequency management data decompression process is executed as a new process of the embodiment (step S2504). The detailed process procedures of the appearance frequency management data decompression process will be described later with reference to FIG. 25B.

Processing identical to the processing at steps S2401 to S2405 in the compressing/encoding process are then carried out. For example, character data is sorted in descending order of appearance frequency (step S2505), and character data having a low appearance frequency are fragmented into 8-bit data, of which the appearance frequency is added to the appearance frequency of binary data corresponding to the 8-bit data (step S2506). Character data, consecutive-character data, and binary data are linked, and sorted in descending order of appearance frequency (step S2507). Subsequently, the occurrence probability of each type of sorted character data is calculated based on the appearance frequency (step S2508). Based on the calculated occurrence probability, a Huffman tree common to 8-bit/16-bit character data is generated (step S2509).

Subsequently, a process of setting the appearance map is carried out (step S2510). For example, an area for the row/cell corresponding table is established, the appearance frequency of each of character data is set to the row/cell corresponding table, the appearance map of the decoded appearance frequency management data 230 is expanded on a memory, and the appearance map is linked to the row/cell corresponding table. Subsequently, the procedure proceeds to the full-text search processing (step S2104) to end a series of the processing.

The detailed process procedures of the above appearance frequency management data decompression process will be described. FIG. 25B is a flowchart of the detailed process procedures of the appearance frequency management data decompression process. In FIG. 25B, first, it is determined whether unprocessed character data exists (step S2541). If unprocessed character data exists (step S2541: YES), arbitrary character data is selected from the unprocessed character data (step S2542). If character data are read from the headmost character data, the unprocessed character data is inevitably the character data next to the processed character data.

By detecting the compression pattern 1602 of the selected character data from the bit string compression data 1600 of the selected character data, a reference is made to the area/compression pattern correlation table depicted in FIG. 16C to extract the Huffman tree used for the decompression (S2543).

The compressed bit string 1604 of the selected character data is then extracted (step S2544). Specifically, the compressed bit string 1604 of the selected character data is sequentially written from the beginning into the register. The compressed bit string 1604 retained in the register is subjected to the Huffman decompressed by using the Huffman tree extracted at step S2543 (step S2545).

It is determined whether the appearance rate of the selected character data is 50% or more (step S2546). Specifically, the determination is made by reference to the area flag 1603. In the case of 50% or more (step S2546: YES), the appearance rate falls within the range of the areas A' to E' and, therefore, the decompressed bit string is inverted (step S2547).

On the other hand, in the case of less than 50% (step S2546: NO), the appearance rate falls within the range of the areas A to E and, therefore, the bit string retained in the register is not inverted. When the Huffman decompression of the compressed bit string 1604 of the selected character data is completed, the procedure goes back to step S2541. If no unprocessed character data exists at step S2541 (step S2541: NO), the procedure goes to step S2505 depicted in FIG. 25A.

Figure 26:
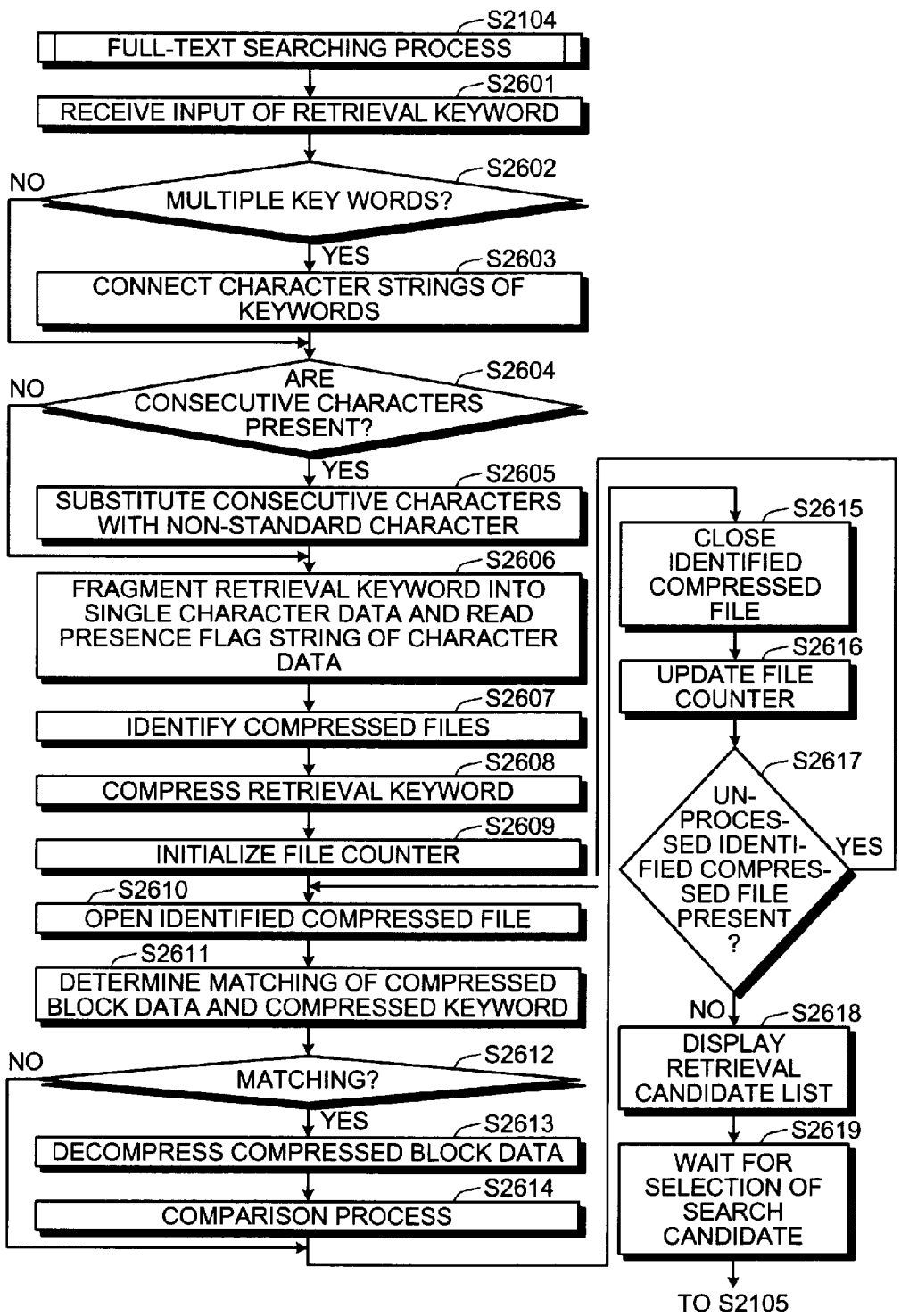
FIG. 26 is a flowchart of full-text search processing depicted in FIG. 21.

FIG. 26 is a flowchart of the full-text search processing (step S2104) of FIG. 21. As depicted in FIG. 26, following the retrieval initializing process (step S2103), input of a retrieval keyword is received (step S2601).

If the retrieval keyword does not include multiple retrieval keywords (step S2602: NO), the process proceeds to step S2604. If the retrieval keyword includes multiple keywords (step S2602: YES), character strings of the keywords are connected (step S2603), and the process proceeds to step S2604.

At step S2604, if consecutive-character data are not included in the retrieval keyword (step S2604: NO), the process proceeds to step S2606. If consecutive-character data are included in the retrieval keyword (step S2604: YES), the consecutive-character data is substituted with non-standard character data consisting of two characters, using the substitution table 240 (step S2605), and the process proceeds to step S2606.

At step S2606, the retrieval keyword is fragmented into single character data, and the presence flag for each character data indicative of the presence/absence of the character with respect to each main-body XTML file is read from the appearance map (step S2606). Subsequently, the logical product of the presence flags indicative of the presence/absence of the character is calculated to identify (i.e., narrow down files to) a compressed main-body XTML file (step S2607). The retrieval keyword is compressed using the Huffman tree generated by the retrieval initializing process at step S2103 (step S2608), and the file counter is initialized (step S2609).

Subsequently, the compressed main-body XTML file identified at step S2607 (hereinafter "identified compressed main-body XTML file") is opened (step S2610). Each compressed block data of the opened identified compressed main-body XTML file is compared with the compressed keyword (step S2611). If the compressed block data have been determined to not match the compressed keyword (step S2612: NO), the procedure proceeds to step S2615.

If the compressed block data are determined to match the keyword (step S2612: YES), the compressed block data determined to match is decompressed using the Huffman tree (step S2613). The decompressed block data is then compared with the retrieval keyword, and the file number and the anchor of item data matching the retrieval keyword are recorded (step S2614), then the process proceeds to step S2615.

Subsequently, the opened identified compressed main-body XTML file is closed (step S2615), and the file counter is updated (step S2616). If the presence of an unprocessed identified compressed main-body XTML file is determined as a result of file counter updating (step S2617: YES), the process proceeds to step S2610, at which the next identified compressed main-body XTML file is opened.

If no unprocessed identified compressed main-body XTML file are determined to be present (step S2617: NO), the retrieval candidate list is displayed (step S2618), and through an input of retrieval candidate selection from a user (step S2619), the process proceeds to the retrieval result display process (step S2105), ending a series of the processing.

According to the first embodiment, even if the content 210 is composed of multiple main-body XTML files, the main-body XTML files can be processed in common in the form of a single piece of compressed information (appearance frequency management data 230).

A large size file that is to be retrieved is blocked according to the number of character data. This allows application of the Huffman compression technique to a file-to-be-retrieved having a mixture of 8-bit code character data, 16-bit code character data, and 32-bit code character data.

Blocking is carried out not according to file size (volume) but according to the number of character data, and when the appearance frequency of each type of character data in a main-body XTML file is summed, the type of the character data (8-bit code, 16-bit code, and 32-bit code) is determined to total the appearance frequency.

Eight-bit code character data having a high appearance frequency, such as English character data in an English-Japanese dictionary, is substituted with 16-bit code character data, such as "0x'FF . . . ", and is subjected to Huffman compression. This distinguishes 8-bit code character data with a high appearance frequency from 8-bit code character data with a low appearance frequency to enable efficient compression.

Non-character data, such as a pointer, takes a random value, and is, therefore, replaced with an 8-bit code data. For reducing the size of the Huffman tree, 16-bit code character data having a low appearance frequency is divided into 8-bit code character data. This enables efficient compression.

According to the first embodiment, the appearance frequency management data 230, from which the Huffman tree for compression is generated, is encoded entirely or partially. Contents or the Huffman tree for compressing the contents is not directly encoded but the original data from which the Huffman tree is generated is encoded. This improves security.

Based on the appearance frequency management data 500, the speed of full text retrieval is increased. Consecutive-character data consisting of two characters with a high appearance frequency included in consecutive phonogramic data is substituted with non-standard character data, and then contents are compressed. This improves the rate of compression.

The consecutive character data enables the reduction of the number of files to be opened/closed and the acceleration of the full-text search through the reduction of the comparison areas of character strings. Since character strings may directly be compared as non-standard character data after decompression in the full-text search, the retrieval speed may be improved.

According to the first embodiment, the compression rate of the files to be retrieved may be improved by sharing the appearance frequency management data (Huffman tree) for the compression process. By decompressing the compressed files to be retrieved on the block-by-block basis, the files may directly be retrieved and displayed while being compressed and the retrieval speed may be improved. The compression may be performed for the file including text data mixed with binary data that is a non-character code such as a pointer.

The Huffman tree may be shortened by cutting the character data having a lower appearance frequency to generate the Huffman tree. Therefore, a memory size used may be reduced and the utilization with mobile portable terminals such as PDA and portable telephones is enabled. Because of the two-path Huffman compression, the compression and decompression at the highest speed are implemented as compared to other modes. The compression rate of the Huffman compression is about 50% and the decompression speed is highest as compared to other compression modes.

Since the generation source of the Huffman tree is encrypted in the encrypting process, the decoding is unnecessary for full-text search and display. Therefore, the security may be improved along with the improvement of the retrieval speed. Since the encrypted area corresponds only to the appearance frequency management data (less than 1% of the total), the process time of the encryption may be shortened and the decoding needs to be performed only once when the Huffman tree is generated. Therefore, the decoding process does not hamper the retrieval speed and the security may be improved along with the improvement of the retrieval speed.

In the full-text retrieval process, the acceleration of the full-text search may be achieved by reducing the number of files to be opened/closed and reducing the comparison areas of character strings. Since the appearance map for the full-text search added for the acceleration of the retrieval speed corresponds to a few percent or less, the appearance map for the full-text search may be generated in a short time corresponding to the file compression time. The compression efficiency and the full-text search speed may be improved even if phonogram data such as alphanumeric characters and kana/katakana characters are mixed.

Since the opening of files to be retrieved not including the retrieval keyword may be skipped because of the appearance frequency management data, the full-text search speed may be accelerated because of the reduction of the opening/closing time and the reduction of the comparison areas of character strings at the time of the full-text search. Specifically, the opening of the files to be retrieved and the comparison of character strings may be constrained by the appearance frequency management data corresponding to a few percent of the body file capacity and the speed may increase a few times (retrieval of two phonograms) to a few hundred times (retrieval of three kanji characters). As the number of characters of the retrieval keyword increases, since the number of files to be retrieved not including the characters of the retrieval keyword increases and the opening of the files may be skipped, the full-text search speed may be accelerated because of the reduction of the opening/closing time and the reduction of the comparison areas of character strings at the time of the full-text search.

The appearance map 904 stored in a mini SD or HD is efficiently compressed by using the special Huffman tree. Since the special Huffman tree has the NULL sequence symbol string having 4-bit boundaries added to the 4-bit normal Huffman tree, the high-speed compression/decompression may be implemented with a slow CPU or a small memory mounted on mobile terminals such as portable telephones.

By using the appearance rate of each character data as the compression parameter, the Huffman tree may be selected depending on the appearance rate. The special Huffman tree having a longer special symbol string may be selected when the appearance rate is lower. On the other hand, the normal Huffman tree may be selected rather than the special Huffman tree when the appearance rate is higher. Therefore, the compression efficiency of the appearance map 904 may be improved.

Wasteful compression processes may be prevented by not compressing the divided areas with poor compression efficiencies without allocating the Huffman trees to achieve the acceleration of the compression speed. The amount of the Huffman trees may be reduced to a half by making the divided areas symmetrical relative to the boundary at the appearance probability of 50%. Therefore, the memory saving may be implemented.

In the first embodiment, by using the appearance rate of each character data as the compression parameter, the Huffman tree is selected depending on the appearance rate. In the second embodiment, the area division corresponding to the appearance rate depicted in FIG. 16A is revised to implement further improvement of the compression rate of the appearance map 904 in the appearance frequency management data 230. In the appearance map 904, a value of the bit representative of the presence of character is "0" in most cases and rarely turns to "1". In the second embodiment, the appearance map 904 including bit strings mainly consisting of zero is efficiently compressed as in the first embodiment.

FIG. 27 is a chart of the revision of the divided areas. The first embodiment includes areas A to I. Since the characters having appearance rates within the area H are the largest number, the access frequency becomes higher. Therefore, if the compression rate is improved for the appearance bit strings of characters within the area H, higher compression may be achieved. Therefore, in the second embodiment, the areas B and C are integrated to form a new area B; the areas D and E are integrated to form a new area C; the areas F and G are integrated to form a new area D; and the areas H and I are integrated to form a new area E. Therefore, the area fields of the appearance map 904 depicted in FIG. 16B are set to the new areas.

In the second embodiment, the area B corresponds to a Huffman tree with 16 types of leaves (normal Huffman tree); the area C corresponds to a special Huffman tree with 16+1 types of leaves (16 successive zeros); the area D corresponds to a special Huffman tree with 16+2 types of leaves (16 successive zeros and 64 successive zeros); and the area E corresponds to a special Huffman tree with 16+3 types of leaves (16 successive zeros, 64 successive zeros, and 256 successive zeros).

Figure 28:
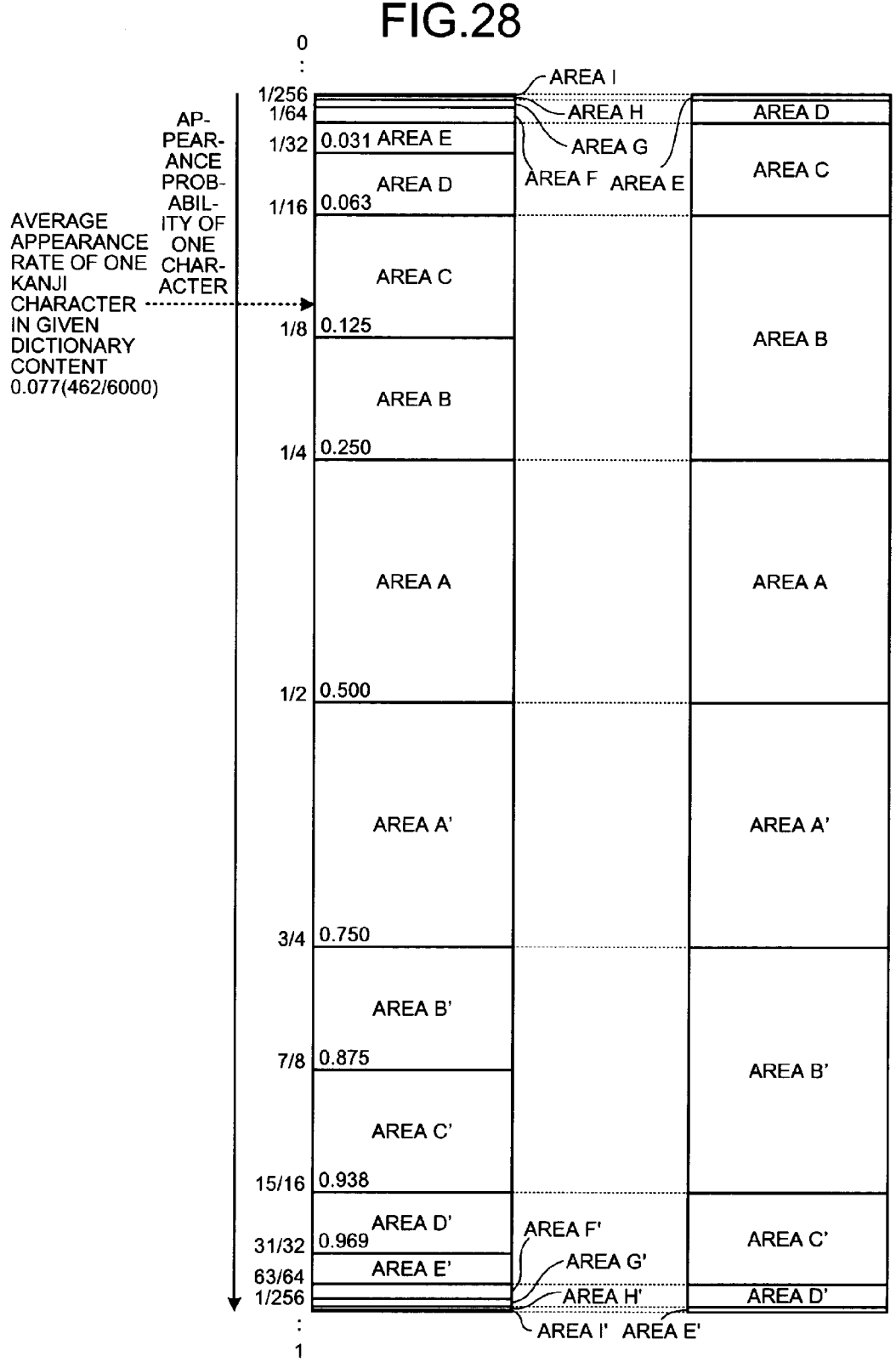
FIG. 28 is an explanatory diagram of appearance probabilities for character data in one file to be retrieved.

FIG. 28 is an explanatory diagram of the appearance probabilities of character data in one file to be retrieved. In FIG. 28, the vertical axis indicates the appearance probabilities of character data in one file to be retrieved, where an appearance probability of 0% is located at the top and the appearance probability of 100% is located at the bottom. The range of the appearance probabilities from 0 to 100% is logarithmically divided. Divided areas partitioning the ranges of the appearance probabilities are formed by repeatedly dividing, in a vertical direction, an area into two such that probabilities are equalized. A divided area indicating appearance probabilities for the first embodiment is depicted on the left and that for the second embodiment is on the right.

From this division, in the second embodiment (left side of FIG. 28), assuming that r denotes the appearance rate, the division forms an area E of $0 \le r < 1/256$, an area D of $1/256 \le r < 1/64$, an area C of $1/64 \le r < 1/16$, an area B of $1/16 \le r < 1/4$, an area A of $1/4 \le r < 1/2$, an area A' of $1/2 \le r < 3/4$, an area B' of $3/4 \le r < 15/16$, an area C' of $15/16 \le r < 63/64$, an area D' of $63/64 \le r < 255/256$, and an area E' of $255/256 \le r \le 1$.

The areas having identical reference characters (alphabetical letter) have the identical appearance rates. The area widths and the appearance probabilities are vertically symmetrical when an appearance probability of 50% is set as the boundary. For example, the appearance rates of both the area A and the area A' are 1/4. Since it is known that an average appearance rate of one character of a certain dictionary content is 0.077, the appearance rate belongs to the area C.

In the areas A' to E' of the second embodiment, zero and one are inverted from those of the areas A to E as is the case with the first embodiment. Although the Huffman trees and the compression/decompression processes thereof will hereinafter be described only for the areas A to E, the descriptions are converted to those for the areas A to E by inverting 0 and 1. When descriptions such as the area A (area A'), . . . , the area E (area E') are hereinafter made in the second embodiment, this indicates the divided areas of the second embodiment if not otherwise specified.

In the second embodiment, instead of 2-branch Huffman trees described in the first embodiment, 2n-branch (n= 2, 3, . . . ) Huffman trees are used. The first embodiment provides the Huffman trees with n=1. The second embodiment will be described by way of example with n=4, i.e., a 16-branch Huffman tree.

The 16-branch Huffman tree has a structure branched from a root to 16 branches, which directly point leaves. Although 16 types of decompression codes acting as leaves exist from "0000" to "1111", the decompression codes are characteristically allocated depending on the appearance rates of the decompression codes rather than simply allocating to each branch. Among 16 branches from the root, two branches point nodes, and each of the two nodes further points 16 leaves through 16 branches. Each of the divided areas will hereinafter be described. First, the area B will be described.

FIG. 29A is a chart of relationship between the decompression codes and the branches of the Huffman tree in the area B. FIG. 29A depicts a quantity, an appearance rate, a correction (corrected appearance rate), a compressed code length, and relationship with branches for each type of the decompression codes. The relationship is set such that the compressed code length becomes shorter when the corrected appearance rate is higher. In this example, since the decompression code "0000" has the corrected appearance rate of 50%, the compressed code length is "1". The relationship with branches is determined depending on the corrected appearance rate. The decompression code "0000" has the corrected appearance rate of 50% and therefore exclusively uses eight branches, which correspond to 50%, among the 16 branches from the root.

Four decompression codes "0001", "0010", "0100", and "1000" including one "1" exclusively use four branches, which correspond to 25%, among the 16 branches from the root. Since the four types of the decompression codes exclusively use four branches, each of the decompression codes exclusively uses one branch.

Six decompression codes "0011", . . . , "1100" including two "1s" exclusively use one branch, which corresponds to 10%, among the 16 branches from the root. The six types of the decompression codes use one branch from the root and therefore point the leaves through nodes. Four decompression codes "0111", . . . , "1110" including three "1s" and Four decompression codes "1111" including four "1s" have further lower appearance rates and therefore point the leaves through a node.

Figure 29B:
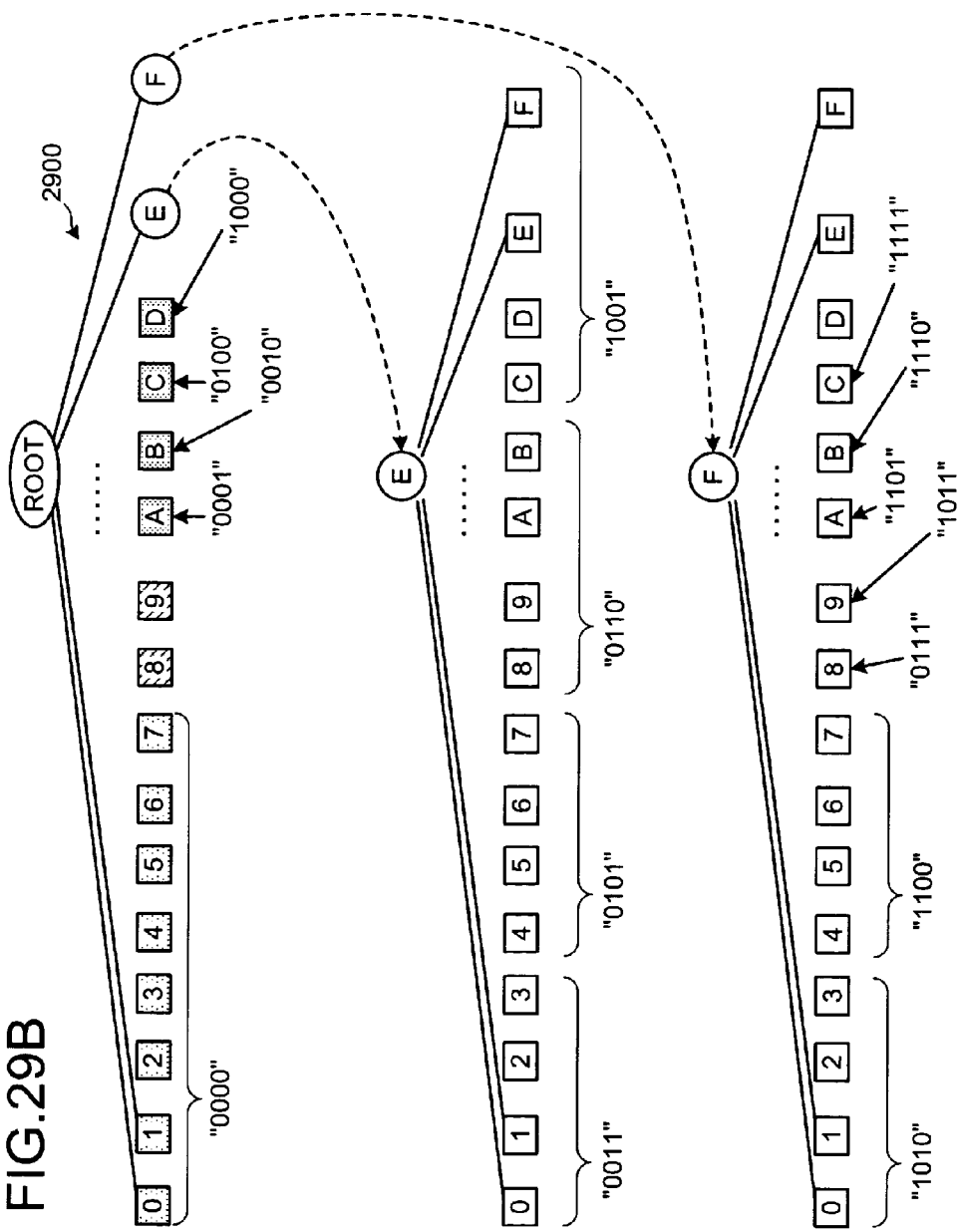
FIG. 29B is an explanatory diagram of the Huffman tree in area B.

FIG. 29B is an explanatory diagram of the Huffman tree in the area B. In FIG. 29B, in an area-B Huffman tree 2900, circular graphics represent nodes (the root or internal nodes) and square graphics represent leaves. The graphic having characters "root" within the circular graphic represents the root. Characters 0 to F (in the hexadecimal form) in the circular graphics and the square graphics are numbers # specific to the leaves/nodes. The leaves will hereinafter be represented by L(#) and the internal nodes (abbreviated as nodes) will be represented by N(#). The leaves and the nodes pointed directly from the root are represented by L(#) and N(#) and the leaves pointed through the nodes are represented by L(##). This also applies to the descriptions of other subsequent figures.

The area-B Huffman tree 2900 allocates the decompression code "0000" to leaves L(0) to L(7) pointed directly from the root. Leaves L(8) and L(9) are vacant areas. The area-B Huffman tree 2900 allocates the decompression code "0001" to a leaf L(A), the decompression code "0010" to a leaf L(B), the decompression code "0100" to a leaf L(C), and the decompression code "1000" to a leaf L(D).

The area-B Huffman tree 2900 allocates the decompression code "0011" to leaves L(E0) to L(E3) pointed from a node N(E), the decompression code "0101" to leaves L(E4) to L(E7), the decompression code "0110" to leaves L(E8) to L(EB), and the decompression code "1001" to leaves L(EC) to L(EF).

The area-B Huffman tree 2900 allocates the decompression code "1010" to leaves L(F0) to L(F3) pointed from a node N(F), the decompression code "1100" to leaves L(F4) to L(F7), the decompression code "0111" to a leaf L(F8), the decompression code "1011" to a leaf L(F9), the decompression code "1101" to a leaf L(FA), the decompression code "1110" to a leaf L(FB), and the decompression code "1111" to a leaf L(FC). Leaves L(FD) to L(FF) are vacant areas.

FIG. 29C is an explanatory diagram of a decompression code/compressed code table indicative of correlation among the decompression codes, the compressed codes, and the leaf numbers in the area-B Huffman tree 2900. In a decompression code/compressed code table 2901, the compressed code of the decompression code "0000" is "0". Since the decompression code "0000" has the highest occurrence probability (see FIG. 29A), the eight leaf numbers 0 to 7 (in the hexadecimal form; 0000 to 0111 in the binary form) are allocated. In the eight leaf numbers, the first symbol "0" is the compressed code "0" and the subsequent symbol strings "001" to "111" are unique symbol strings. Therefore, at the time of decompression, when the compressed code strings "0000" to "0111" are extracted, the compressed code strings "0000" to "0111" are all converted to the decompression code "0000". The lower three digits "001" to "111" of the compressed code strings are to be decompressed again.

A decompression code having a lower appearance probability such as the decompression code "0001" corresponds one-on-one to a leaf number. Only one leaf number is allocated. Therefore, at the time of decompression, when a leaf number corresponding one-on-one to the decompression code is extracted from the compressed code strings, the conversion to the decompression code is performed.

The decompression code/compressed code table 2901 includes the decompression codes (such as "0001" and "0010") having a single leaf number allocated with a compressed code specific to the leaf number and the decompression codes (such as "0000", "0000 ... 0" (16 zeros), and 0011) having plural leaf numbers allocated with a specific compressed code including a symbol common to the plurality of leaf numbers. Since a decompression code having a higher appearance rate is allocated with more leaves of the Huffman tree and with plural leaf numbers such that a compressed code is included at a higher bit, the compression process and the decompression process are more efficiently performed. The area C will then be described.

FIG. 30A is a chart of relationship between the decompression codes and the branches of the special Huffman tree in the area C. The chart of FIG. 30A is a chart formed by adding fields related to a decompression code "0000 ... 0" (16 zeros) to the chart of FIG. 29A. The decompression code "0000 ... 0" (16 zeros) has the corrected appearance rate of about 13% and therefore exclusively uses two branches, which correspond to 12.5%, among the 16 branches from the root.

Figure 30B:
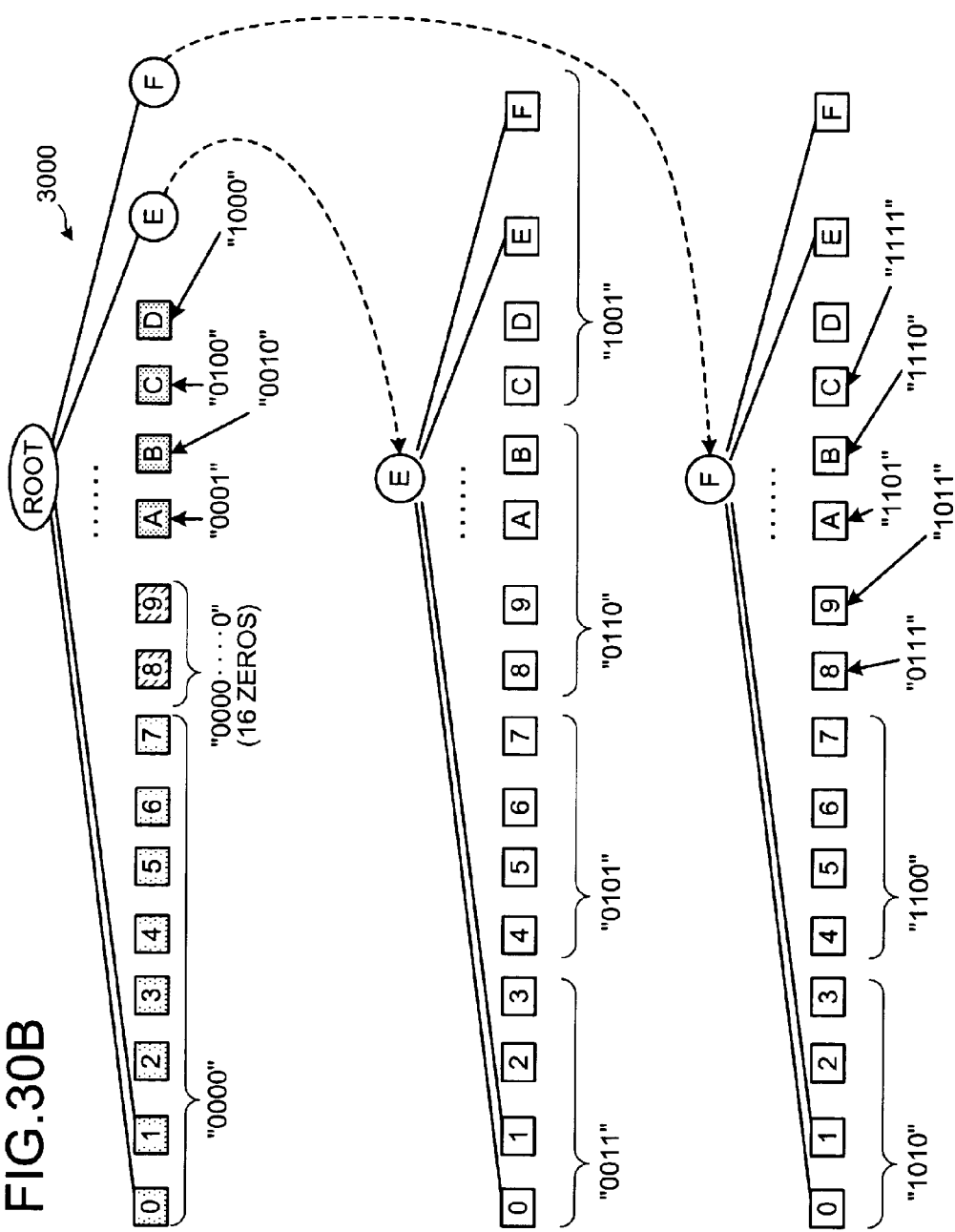
FIG. 30B is an explanatory diagram of a Huffman tree in area C.

FIG. 30B is an explanatory diagram of the Huffman tree in the area C. An area-C Huffman tree 3000 allocates the decompression code "0000 ... 0" (16 zeros) to the leaves L(8) and L(9), which are vacant areas in the area-B Huffman tree 2900.

FIG. 30C is an explanatory diagram of a decompression code/compressed code table indicative of correlation among the decompression codes, the compressed codes, and the leaf numbers in the area-C Huffman tree 3000. In a decompression code/compressed code table 3001, the compressed code of the decompression code "0000" is "0". Since the decompression code "0000" has the highest occurrence probability (see FIG. 30A), the eight leaf numbers 0 to 7 (in the hexadecimal form; 0000 to 0111 in the binary form) are allocated. In the eight leaf numbers, the first symbol "0" is the compressed code "0" and the subsequent symbol strings "001" to "111" are unique symbol strings. Therefore, at the time of decompression, when the compressed code strings "0000" to "0111" are extracted, the compressed code strings "0000" to "0111" are all converted to the decompression code "0000". The lower three digits "001" to "111" of the compressed code strings are to be decompressed again.

Similarly, the compressed code of the decompression code "0000 ... 0" (16 zeros) is "100". Since the decompression code "0000 ... 0" (16 zeros) has a higher occurrence probability (see FIG. 30A), the two leaf numbers 8 and 9 (in the hexadecimal form; 1000 to 1001 in the binary form) are allocated. In the two leaf numbers, the symbol string "100" from the beginning is the compressed code "100" and the subsequent symbols "0" and "1" are unique symbol strings. Therefore, at the time of decompression, when the compressed code string "1000" or "1001" is extracted, both the compressed code strings "1000" and "1001" are converted to the decompression code "0000 ... 0" (16 zeros). The lowest digit "0" or "1" of the compressed code strings is to be decompressed again.

A decompression code having a lower appearance probability such as the decompression code "0001" corresponds one-on-one to a leaf number. Only one leaf number is allocated. Therefore, at the time of decompression, when a leaf number corresponding one-on-one to the decompression code is extracted from the compressed code strings, the conversion to the decompression code is performed.

The decompression code/compressed code table 3001 includes the decompression codes (such as "0001" and "0010") having a single leaf number allocated with a compressed code specific to the leaf number and the decompression codes (such as "0000", "0000 ... 0" (16 zeros), and 0011) having plural leaf numbers allocated with a specific compressed code including a symbol common to the plurality of leaf numbers. Since a decompression code having a higher appearance rate is allocated with more leaves of the Huffman tree and with plural leaf numbers such that a compressed code is included at a higher bit, the compression process and the decompression process are more efficiently performed. The area D will then be described.

FIG. 31A is a chart of relationship between the decompression codes and the branches of the special Huffman tree in the area D. In the area D, a decompression code "0000 ... 0" (64 zeros) is further added as a leaf. Since the appearance rates of the decompression codes in the area D are different from those of the areas B and C, allocated branches and the number thereof are also different.

Figure 31B:
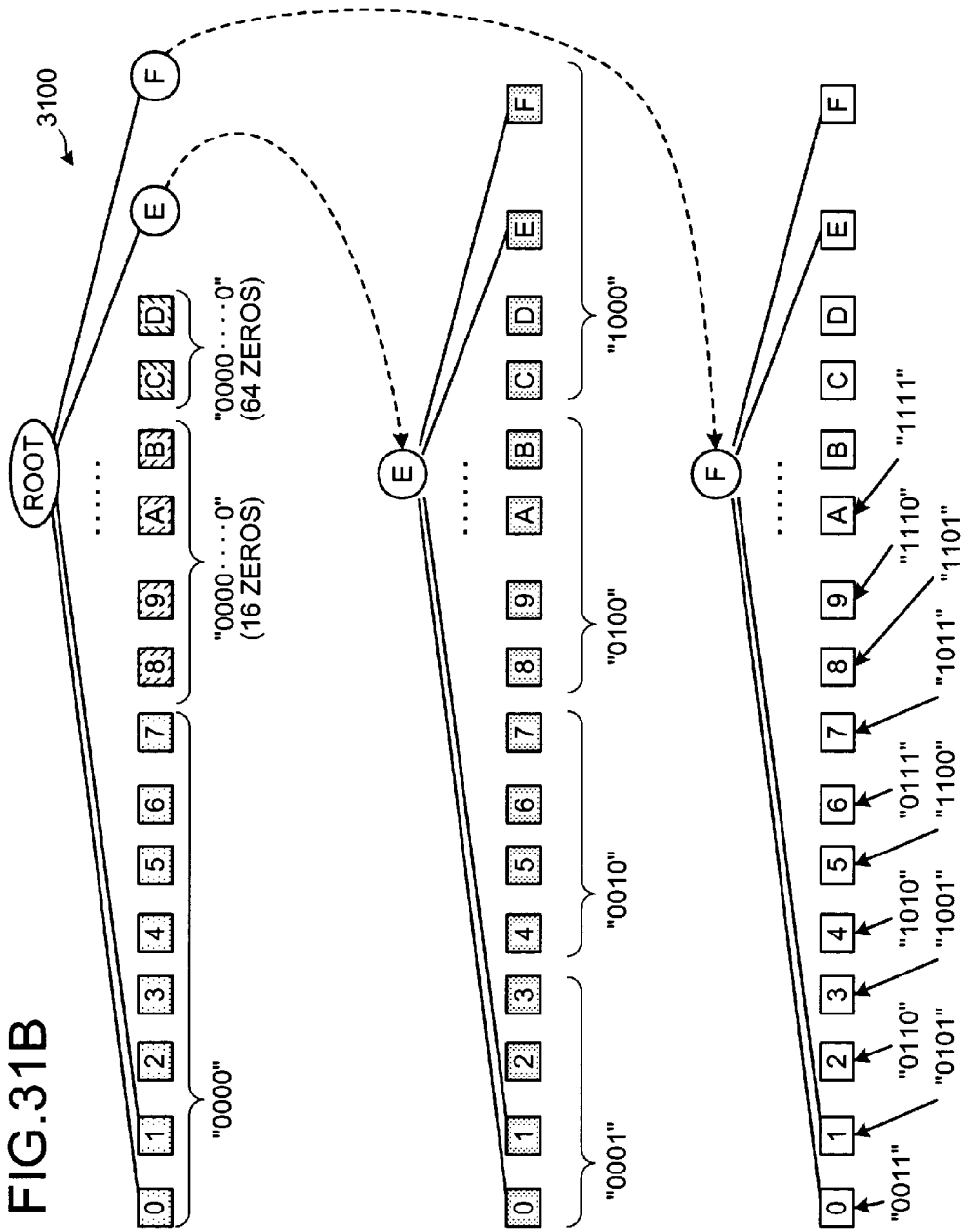
FIG. 31B is an explanatory diagram of a Huffman tree in area D.

FIG. 31B is an explanatory diagram of the Huffman tree in the area D. An area-D Huffman tree 3100 is configured in accordance with the relationship with the branches of FIG. 31A. In the area-D Huffman tree 3100, the decompression code "0000" is allocated to the leaves L(0) to L(7) pointed directly from the root. The decompression code "0000 ... 0"

(16 zeros) is allocated to the leaves L(8) to L(B). The decompression code "0000 . . . 0" (64 zeros) is allocated to the leaves L(C) and L(D).

The area-D Huffman tree 3100 allocates the decompression code "0001" to the leaves L(E0) to L(E3) pointed from the node N(E), the decompression code "0010" to the leaves L(E4) to L(E7), the decompression code "0100" to the leaves L(E8) to L(EB), and the decompression code "1000" to the leaves L(EC) to L(EF).

The area-D Huffman tree 3100 allocates the decompression code "0011" to the leaf L(F0) pointed from the node N(F), the decompression code "0101" to the leaf L(F1), the decompression code "0110" to the leaf L(F2), the decompression code "1001" to the leaf L(F3), the decompression code "1010" to the leaf L(F4), the decompression code "1100" to the leaf L(F5), the decompression code "0111" to the leaf L(F6), the decompression code "1011" to the leaf L(F7), the decompression code "1101" to the leaf L(F8), the decompression code "1110" to the leaf L(F9), and the decompression code "1111" to the leaf L(FA). The leaves L(FB) to L(FF) are vacant areas.

FIG. 31C is an explanatory diagram of a decompression code/compressed code table indicative of correlation among the decompression codes, the compressed codes, and the leaf numbers in the area-D Huffman tree 3100. In a decompression code/compressed code table 3101, the compressed code of the decompression code "0000" is "0". Since the decompression code "0000" has the highest occurrence probability (see FIG. 31A), the eight leaf numbers 0 to 7 (in the hexadecimal form; 0000 to 0111 in the binary form) are allocated. In the eight leaf numbers, the first symbol "0" is the compressed code "0" and the subsequent symbol strings "001" to "111" are unique symbol strings. Therefore, at the time of decompression, when the compressed code strings "0000" to "0111" are extracted, the compressed code strings "0000" to "0111" are all converted to the decompression code "0000". The lower three digits "001" to "111" of the compressed code strings are to be decompressed again.

Similarly, the compressed code of the decompression code "0000 . . . 0" (16 zeros) is "10". Since the decompression code "0000 . . . 0" (16 zeros) has a higher occurrence probability (see FIG. 31A), the four leaf numbers 8 to B (in the hexadecimal form; 1000 to 1011 in the binary form) are allocated. In the four leaf numbers, the symbol string "10" from the beginning is the compressed code "10" and the subsequent symbols "00" and "11" are unique symbol strings. Therefore, at the time of decompression, when the compressed code strings "1000" to "1011" are extracted, the compressed code strings "1000" to "1011" are all converted to the decompression code "0000 . . . 0" (16 zeros). The lower two digits "00" to "11" of the compressed code strings are to be decompressed again.

A decompression code having a lower appearance probability such as the decompression code "0011" corresponds one-on-one to a leaf number. Only one leaf number is allocated. Therefore, at the time of decompression, when a leaf number corresponding one-on-one to the decompression code is extracted from the compressed code strings, the conversion to the decompression code is performed.

The decompression code/compressed code table 3101 includes the decompression codes (such as "0011" and "0101") having a single leaf number allocated with a compressed code specific to the leaf number and the decompression codes (such as "0000", "0000 . . . 0" (16 zeros), "0000 . . . 0" (64 zeros), and 0011) having plural leaf numbers allocated with a specific compressed code including a symbol common to the plurality of leaf numbers. Since a decompression code having a higher appearance rate is allocated with more leaves of the Huffman tree and with plural leaf numbers such that a compressed code is included at a higher bit, the compression process and the decompression process are more efficiently performed. The area E will then be described.

FIG. 32A is a chart of relationship between the decompression codes and the branches of the special Huffman tree in the area E. In the area E, a decompression code "0000 . . . 0" (256 zeros) is further added as a leaf. Since the appearance rates of the decompression codes in the area E are different from those of the areas B to D, allocated branches and the number thereof are also different.

Figure 32B:
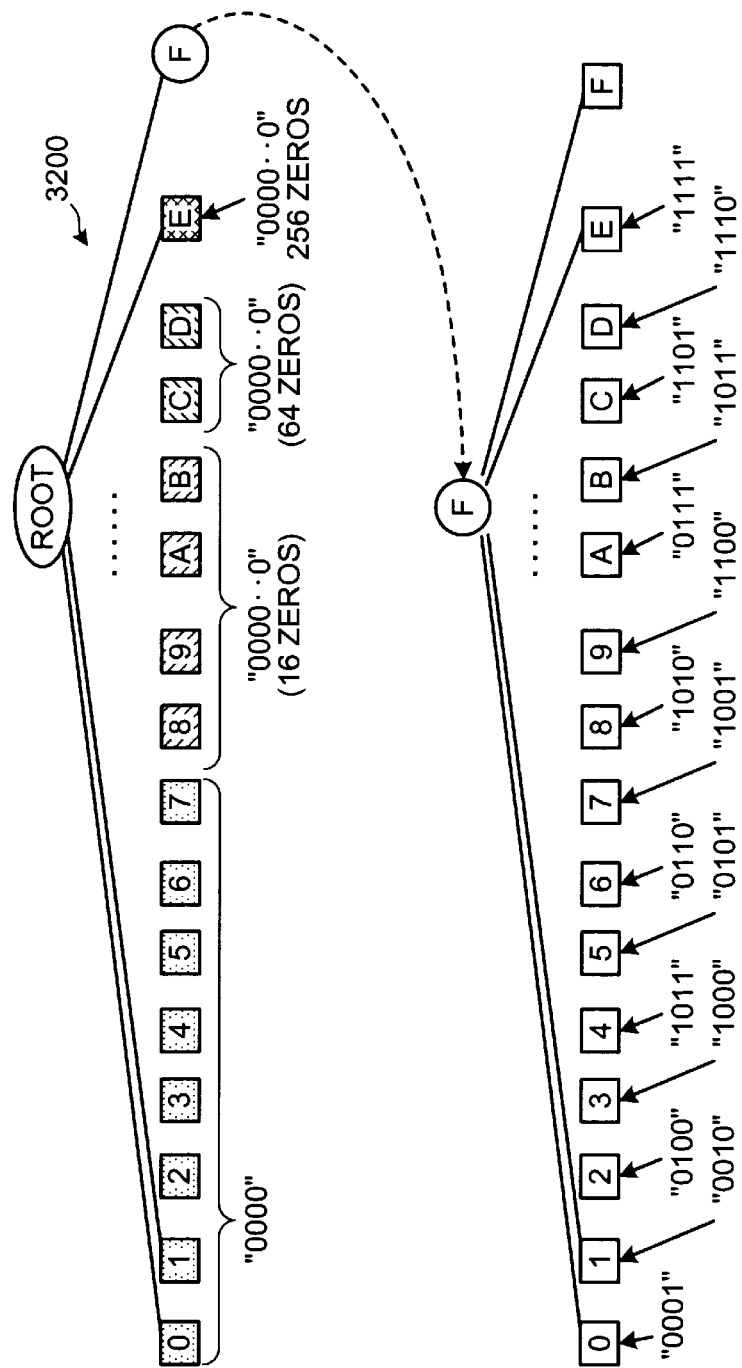
FIG. 32B is an explanatory diagram of a Huffman tree in area E.

FIG. 32B is an explanatory diagram of the Huffman tree in the area E. An area-E Huffman tree 3200 is configured in accordance with the relationship with the branches of FIG. 32A. In the area-E Huffman tree 3200, the decompression code "0000" is allocated to the leaves L(0) to L(7) pointed directly from the root. The decompression code "0000 . . . 0" (16 zeros) is allocated to the leaves L(8) to L(B). The decompression code "0000 . . . 0" (64 zeros) is allocated to the leaves L(C) and L(D). The decompression code "0000 . . . 0" (256 zeros) is allocated to the leaf L(E).

The area-E Huffman tree 3200 allocates the decompression code "0001" to the leaf L(F0) pointed from the node N(F), the decompression code "0010" to the leaf L(F1), the decompression code "0100" to the leaf L(F2), the decompression code "1000" to the leaf L(F3), the decompression code "0011" to the leaf L(F4), the decompression code "0101" to the leaf L(F5), the decompression code "0110" to the leaf L(F6), the decompression code "1001" to the leaf L(F7), the decompression code "1010" to the leaf L(F8), the decompression code "1100" to the leaf L(F9), the decompression code "0111" to the leaf L(FA), the decompression code "1011" to the leaf L(FB), the decompression code "1101" to the leaf L(FC), the decompression code "1110" to the leaf L(FD), and the decompression code "1111" to the leaf L(FE). The leaf L(FF) is a vacant area.

FIG. 32C is an explanatory diagram of a decompression code/compressed code table 3201 indicative of correlation among the decompression codes, the compressed codes, and the leaf numbers in the area-E Huffman tree 3200. In the decompression code/compressed code table 3201, the compressed code of the decompression code "0000" is "0". Since the decompression code "0000" has the highest occurrence probability (see FIG. 31A), the eight leaf numbers 0 to 7 (in the hexadecimal form; 0000 to 0111 in the binary form) are allocated. In the eight leaf numbers, the first symbol "0" is the compressed code "0" and the subsequent symbol strings "001" to "111" are unique symbol strings. Therefore, at the time of decompression, when the compressed code strings "0000" to "0111" are extracted, the compressed code strings "0000" to "0111" are all converted to the decompression code "0000". The lower three digits "001" to "111" of the compressed code strings are to be decompressed again.

Similarly, the compressed code of the decompression code "0000 . . . 0" (16 zeros) is "10". Since the decompression code "0000 . . . 0" (16 zeros) has a higher occurrence probability (see FIG. 31A), the four leaf numbers 8 to B (in the hexadecimal form; 1000 to 1011 in the binary form) are allocated. In the four leaf numbers, the symbol string "10" from the beginning is the compressed code "10" and the subsequent symbols "00" and "11" are unique symbol strings. Therefore, at the time of decompression, when the compressed code strings "1000" to "1011" are extracted, the compressed code strings "1000" to "1011" are all converted to the decompression code "0000 . . . 0" (16 zeros). The lower two digits "00" to "11" of the compressed code strings are to be decompressed again.

A decompression code having a lower appearance probability such as the decompression codes "0000 . . . 0" (256 zeros) and "0001" corresponds one-on-one to a leaf number. Only one leaf number is allocated. Therefore, at the time of decompression, when a leaf number corresponding one-on-one to the decompression code is extracted from the compressed code strings, the conversion to the decompression code is performed.

The decompression code/compressed code table 3201 includes the decompression codes (such as "0000 . . . 0" (256 zeros) and "0001") having a single leaf number allocated with a compressed code specific to the leaf number and the decompression codes (such as "0000", "0000 . . . 0" (16 zeros), and "0000 . . . 0" (64 zeros)) having plural leaf numbers allocated with a specific compressed code including a symbol common to the plurality of leaf numbers. Since a decompression code having a higher appearance rate is allocated with more leaves of the Huffman tree and with plural leaf numbers such that a compressed code is included at a higher bit, the compression process and the decompression process are more efficiently performed.

The area-B to area-E Huffman trees 2900 to 3200 have a structure for compression and a structure for decompression. The structure for compression will first be described for each of the divided areas. The structure for compression is used at the time of compression. A basic configuration of the structure for compression includes a header area and a leaf area.

FIG. 33 is an explanatory diagram of a structure for compression of the area-B Huffman tree 2900. A structure for compression (hereinafter, "area-B compression structure") 3300 of the area-B Huffman tree 2900 has a header area 3301 and a leaf area 3302. The header area 3301 stores a divided area ID (=B). The leaf area 3302 stores the decompression code/compressed code table 2901 depicted in FIG. 29C.

Figure 34:
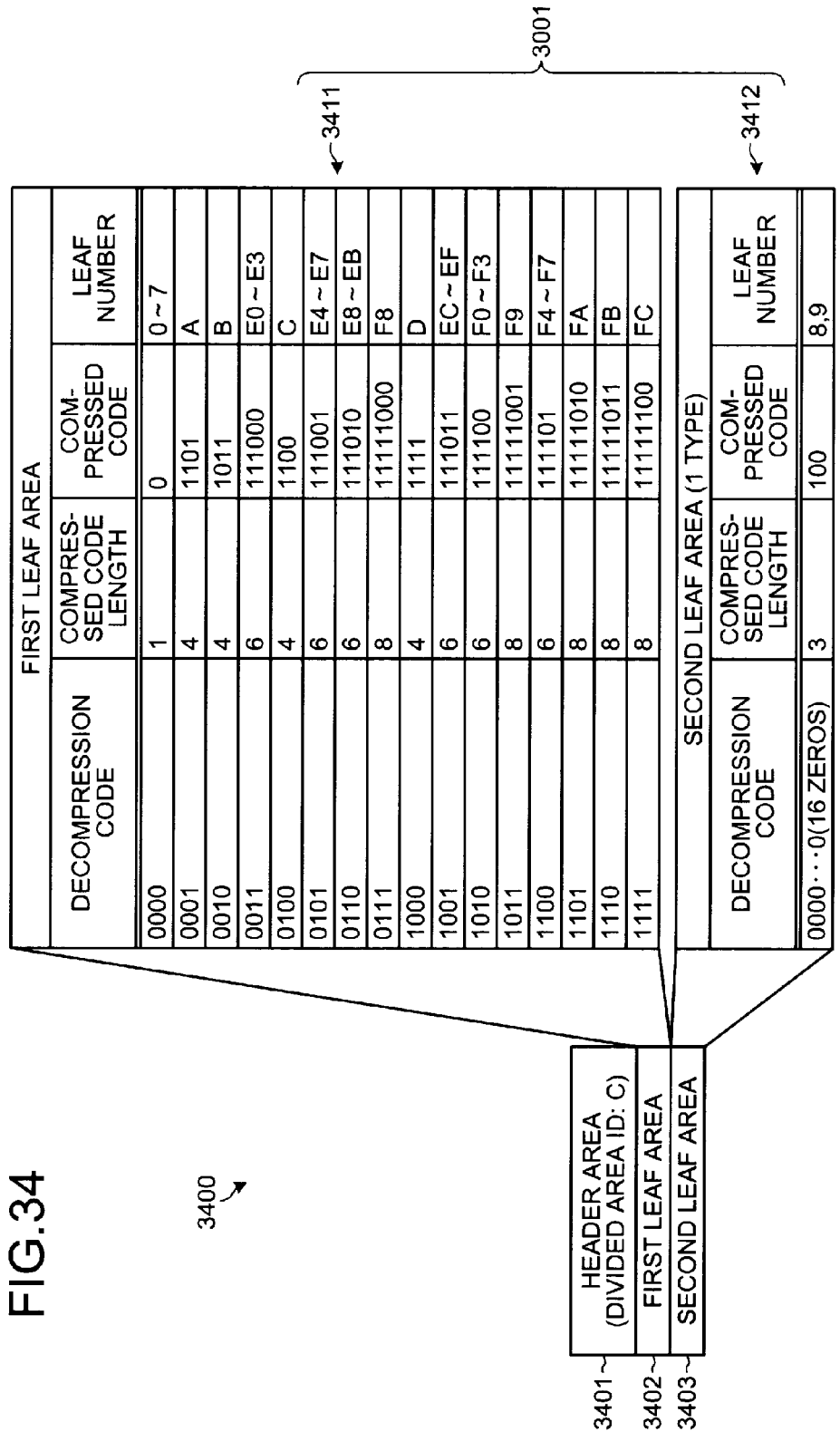
FIG. 34 is an explanatory diagram of a structure for compression of the area-C Huffman tree.

FIG. 34 is an explanatory diagram of a structure for compression of the area-C Huffman tree 3000. A structure for compression (hereinafter, "area-C compression structure") 3400 of the area-C Huffman tree 3000 has a header area 3401, a first leaf area 3402, and a second leaf area 3403. The header area 3401 stores a divided area ID (=C).

The first leaf area 3402 stores a partial table 3411 including the decompression codes "0000" to "1111" with the compressed code lengths and the compression codes thereof from the decompression code/compressed code table 3001 depicted in FIG. 30C. The second leaf area 3403 stores a partial table 3412 including the decompression code "0000 . . . 0" (16 zeros) with the compressed code length and the compression code thereof from the decompression code/compressed code table 3001 depicted in FIG. 30C.

Figure 35:
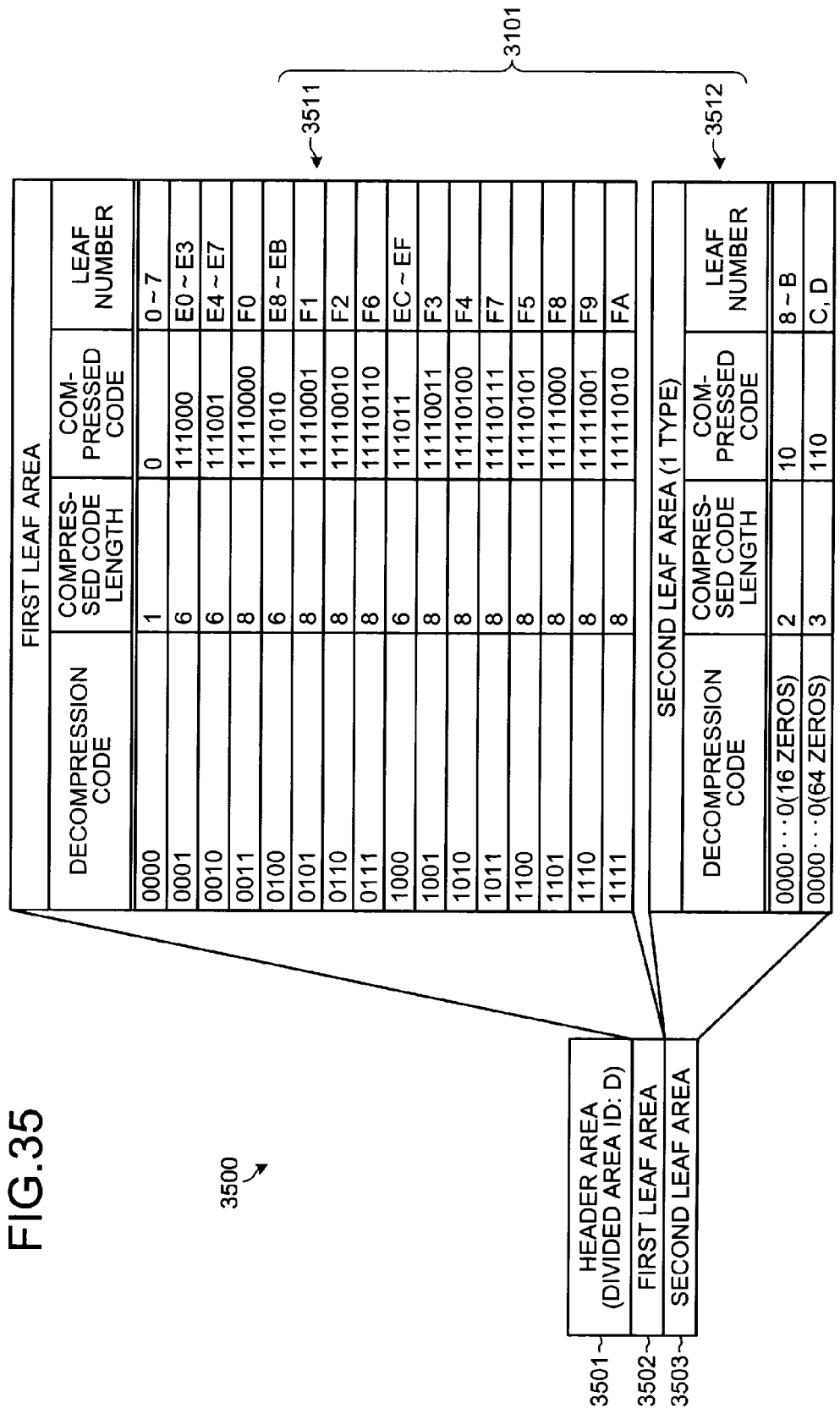
FIG. 35 is an explanatory diagram of a structure for compression of the area-D Huffman tree.

FIG. 35 is an explanatory diagram of a structure for compression of the area-D Huffman tree 3100. A structure for compression (hereinafter, "area-D compression structure") 3500 of the area-D Huffman tree 3100 has a header area 3501, a first leaf area 3502, and a second leaf area 3503. The header area 3501 stores a divided area ID (=D).

The first leaf area 3502 stores a partial table 3511 including the decompression codes "0000" to "1111" with the compressed code lengths and the compression codes thereof from the decompression code/compressed code table 3101 depicted in FIG. 31C. The second leaf area 3503 stores a partial table 3512 including the decompression code "0000 . . . 0" (16 zeros) with the compressed code length and the compression code thereof and the decompression code "0000 . . . 0" (64 zeros) with the compressed code length and the compression code thereof from the decompression code/compressed code table 3101 depicted in FIG. 31C.

Figure 36:
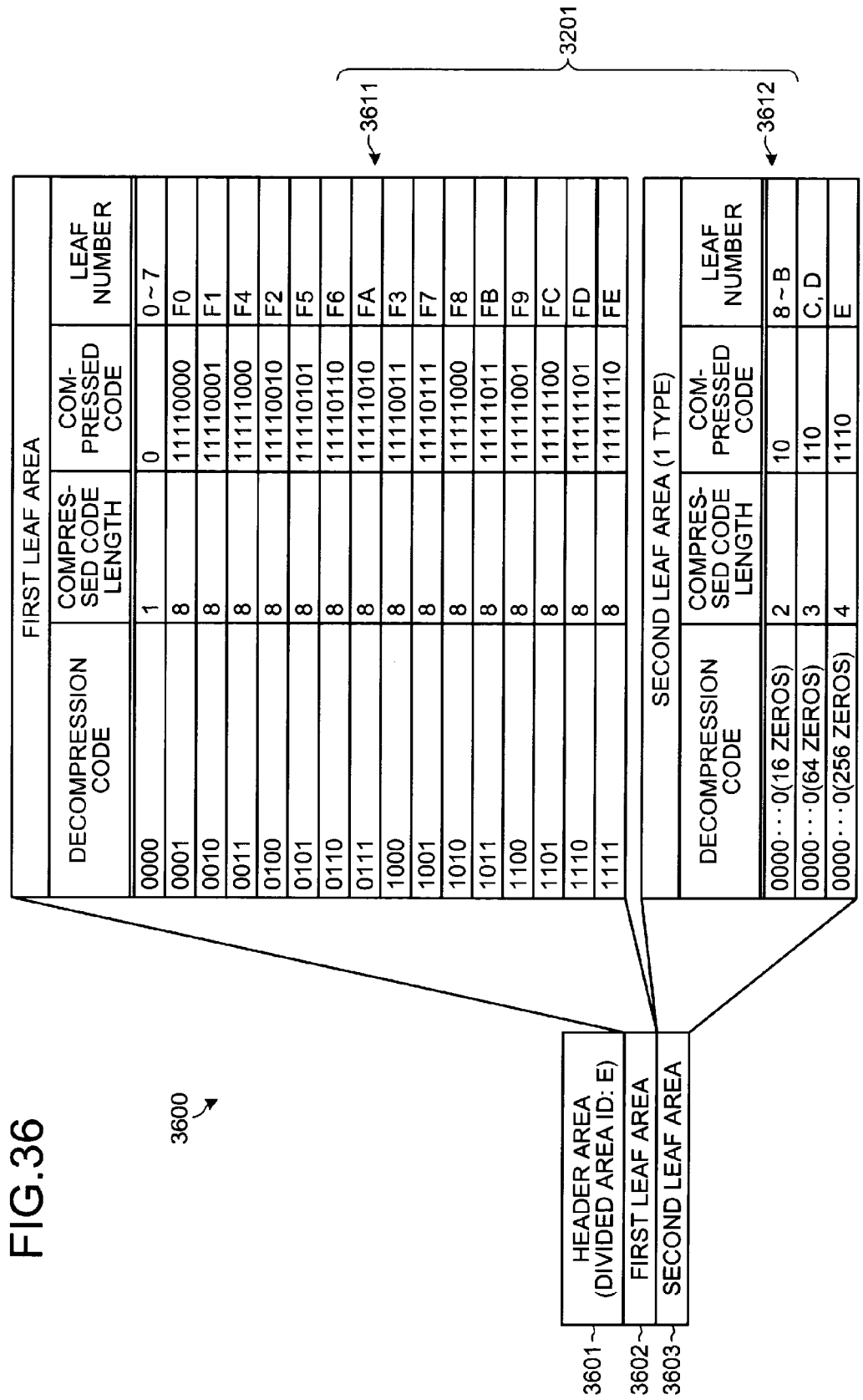
FIG. 36 is an explanatory diagram of a structure for compression of the area-E Huffman tree.

FIG. 36 is an explanatory diagram of a structure for compression of the area-E Huffman tree 3200. A structure for compression (hereinafter, "area-E compression structure") 3600 of the area-E Huffman tree 3200 has a header area 3601, a first leaf area 3602, and a second leaf area 3603. The header area 3601 stores a divided area ID (=E).

The first leaf area 3602 stores a partial table 3611 including the decompression codes "0000" to "1111" with the compressed code lengths and the compression codes thereof from the decompression code/compressed code table 3201 depicted in FIG. 32C. The second leaf area 3603 stores a partial table 3612 including the decompression code "0000 . . . 0" (16 zeros) with the compressed code length and the compression code thereof, the decompression code "0000 . . . 0" (64 zeros) with the compressed code length and the compression code thereof, and the decompression code "0000 . . . 0" (256 zeros) with the compressed code length and the compression code thereof from the decompression code/compressed code table 3201 depicted in FIG. 32C.

The structure for decompression is used at the time of decompression. A basic configuration of the structure for decompression includes a header area, a root area, a node area, and a leaf area.

FIG. 37A is an explanatory diagram of a structure for decompression of the area-B Huffman tree 2900. A structure for decompression (hereinafter, "area-B decompression structure") 3700 of the area-B Huffman tree 2900 has a header area 3701, a root area 3702, a first node area 3703, a second node area 3704, and a leaf area 3705. The header area 3701 stores a divided area ID (=B).

FIG. 37B is an explanatory diagram of storage contents of the root area 3702 of the area-B decompression structure 3700. The root area 3702 stores a node/leaf identifying flag, a node size, and pointers for respective leaf/node numbers. The node/leaf identifying flag is a flag identifying whether this area is a node area (=0) or a leaf area (=1). Since this area is the root, the node/leaf identifying flag is set to "0". The node size represents the number of branches from the node (the root in this case).

FIG. 37C is an explanatory diagram of storage contents of the first node area 3703 of the area-B decompression structure 3700. The first node area 3703 stores a node/leaf identifying flag, a node size, and pointers for respective leaf numbers. The node/leaf identifying flag is a flag identifying whether this area is a node area (=0) or a leaf area (=1). Since this area is the node N(E), the node/leaf identifying flag is set to "0". The node size represents the number of branches from the node (the node N(E) in this case).

FIG. 37D is an explanatory diagram of storage contents of a second node area 3704 of the area-B decompression structure 3700. The second node area 3704 stores a node/leaf identifying flag, a node size, and pointers for respective leaf numbers. The node/leaf identifying flag is a flag identifying whether this area is a node area (=0) or a leaf area (=1). Since this area is the node N(F), the node/leaf identifying flag is set to "0". The node size represents the number of branches from the node (the node N(F) in this case).

Figures 37E, 38A:
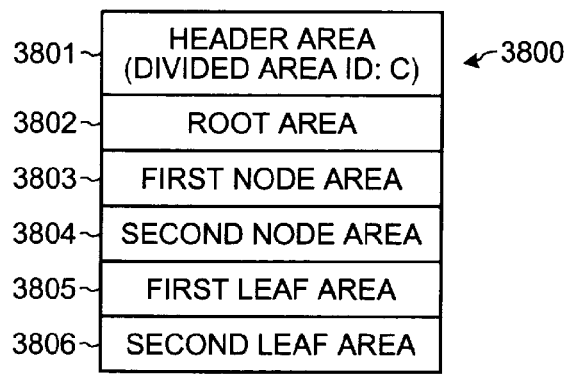
FIG. 37E is an explanatory diagram of storage contents of a leaf area of the area-B decompression structure.
FIG. 38A is an explanatory diagram of a structure for decompression of the area-C Huffman tree.

FIG. 37E is an explanatory diagram of storage contents of the leaf area 3705 of the area-B decompression structure 3700. The leaf area 3705 stores a node/leaf identifying flag, a leaf type flag, and the decompression codes and the compressed code lengths corresponding to the leaf numbers. The node/leaf identifying flag is a flag identifying whether this area is a node area (=0) or a leaf area (=1). Since this area is a leaf, the node/leaf identifying flag is set to "1". The leaf type flag is a flag identifying whether a decompression code serving as a leaf thereof is included in 16 types of leaves of "0000" to "1111" (=0) or in 3 types of leaves of "0000 . . . 0" (16, 64, and 256 zeros) (=1).

FIG. 38A is an explanatory diagram of a structure for decompression of the area-C Huffman tree 3000. A structure for decompression (hereinafter, "area-C decompression structure") 3800 of the area-C Huffman tree 3000 has a header area 3801, a root area 3802, a first node area 3803, a second node area 3804, a first leaf area 3805, and a second leaf area 3806. The header area 3801 stores a divided area ID (=C).

FIG. 38B is an explanatory diagram of storage contents of the root area 3802 of the area-C decompression structure 3800. The root area 3802 stores a node/leaf identifying flag, a node size, and pointers for respective leaf/node numbers. The node/leaf identifying flag is a flag identifying whether this area is a node area (=0) or a leaf area (=1). Since this area is the root, the node/leaf identifying flag is set to "0". The node size represents the number of branches from the node (the root in this case).

FIG. 38C is an explanatory diagram of storage contents of the first node area 3803 of the area-C decompression structure 3800. The first node area 3803 stores a node/leaf identifying flag, a node size, and pointers for respective leaf numbers. The node/leaf identifying flag is a flag identifying whether this area is a node area (=0) or a leaf area (=1). Since this area is the node N(E), the node/leaf identifying flag is set to "0". The node size represents the number of branches from the node (the node N(E) in this case).

FIG. 38D is an explanatory diagram of storage contents of the second node area 3804 of the area-C decompression structure 3800. The second node area 3804 stores a node/leaf identifying flag, a node size, and pointers for respective leaf numbers. The node/leaf identifying flag is a flag distinguishing whether this area is a node area (=0) or a leaf area (=1). Since this area is the node N(F), the node/leaf identifying flag is set to "0". The node size represents the number of branches from the node (the node N(F) in this case).

FIG. 38E is an explanatory diagram of storage contents of the first leaf area 3805 of the area-C decompression structure 3800. The first leaf area 3805 stores a node/leaf identifying flag, a leaf type flag, and the decompression codes and the compressed code lengths corresponding to the leaf numbers. The node/leaf identifying flag is a flag distinguishing whether this area is a node area (=0) or a leaf area (=1). Since this area is a leaf, the node/leaf identifying flag is set to "1". The leaf type flag is a flag distinguishing whether a decompression code serving as a leaf thereof is included in 16 types of leaves of "0000" to "1111" (=0) or in 3 types of leaves of "0000 . . . 0" (16, 64, and 256 zeros) (=1). Since this area is the first leaf area 3805, the leaf type flag is set to "0".

FIG. 38F is an explanatory diagram of storage contents of the second leaf area 3806 of the area-C decompression structure 3800. The second area 3806 stores a node/leaf identifying flag, a leaf type flag, and the decompression code and the compressed code length corresponding to the leaf number. The node/leaf identifying flag is a flag distinguishing whether this area is a node area (=0) or a leaf area (=1). Since this area is a leaf, the node/leaf identifying flag is set to "1". The leaf type flag is a flag distinguishing whether a decompression code serving as a leaf thereof is included in 16 types of leaves of "0000" to "1111" (=0) or in 3 types of leaves of "0000 . . . 0" (16, 64, and 256 zeros) (=1). Since this area is the second leaf area 3806, the leaf type flag is set to "1".

Figures 39A, 39B:
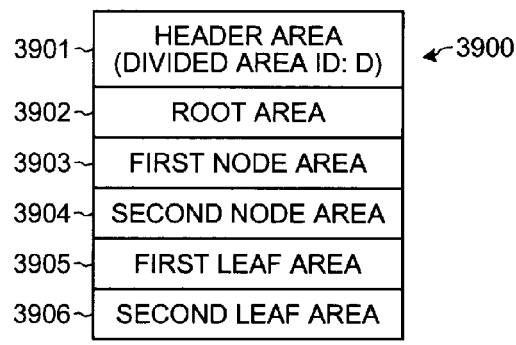
FIG. 39A is an explanatory diagram of a structure for decompression of the area-D Huffman tree.
FIG. 39B is an explanatory diagram of storage contents of a root area of the area-D decompression structure.

FIG. 39A is an explanatory diagram of a structure for decompression of the area-D Huffman tree 3100. A structure for decompression (hereinafter, "area-D decompression structure") 3900 of the area-D Huffman tree 3100 has a header area 3901, a root area 3902, a first node area 3903, a second node area 3904, a first leaf area 3905, and a second leaf area 3906. The header area 3901 stores a divided area ID (=D).

FIG. 39B is an explanatory diagram of storage contents of the root area 3902 of the area-D decompression structure 3900. The root area 3902 stores a node/leaf identifying flag, a node size, and pointers for respective leaf/node numbers. The node/leaf identifying flag is a flag distinguishing whether this area is a node area (=0) or a leaf area (=1). Since this area is the root, the node/leaf identifying flag is set to "0". The node size represents the number of branches from the node (the root in this case).

FIG. 39C is an explanatory diagram of storage contents of the first node area 3903 of the area-D decompression structure 3900. The first node area 3903 stores a node/leaf identifying flag, a node size, and pointers for respective leaf numbers. The node/leaf identifying flag is a flag identifying whether this area is a node area (=0) or a leaf area (=1). Since this area is the node N(E), the node/leaf identifying flag is set to "0". The node size represents the number of branches from the node (the node N(E) in this case).

FIG. 39D is an explanatory diagram of storage contents of the second node area 3904 of the area-D decompression structure 3900. The second node area 3904 stores a node/leaf identifying flag, a node size, and pointers for respective leaf numbers. The node/leaf identifying flag is a flag distinguishing whether this area is a node area (=0) or a leaf area (=1). Since this area is the node N(F), the node/leaf identifying flag is set to "0". The node size represents the number of branches from the node (the node N(F) in this case).

FIG. 39E is an explanatory diagram of storage contents of the first leaf area 3905 of the area-D decompression structure 3900. The first leaf area 3905 stores a node/leaf identifying flag, a leaf type flag, and the decompression codes and the compressed code lengths corresponding to the leaf numbers. The node/leaf identifying flag is a flag distinguishing whether this area is a node area (=0) or a leaf area (=1). Since this area is a leaf, the node/leaf identifying flag is set to "1". The leaf type flag is a flag distinguishing whether a decompression code serving as a leaf thereof is included in 16 types of leaves of "0000" to "1111" (=0) or in 3 types of leaves of "0000 . . . 0" (16, 64, and 256 zeros) (=1). Since this area is the first leaf area 3905, the leaf type flag is set to "0".

FIG. 39F is an explanatory diagram of storage contents of the second leaf area 3906 of the area-D decompression structure 3900. The second area 3906 stores a node/leaf identifying flag, a leaf type flag, and the decompression codes and the compressed code lengths corresponding to the leaf numbers. The node/leaf identifying flag is a flag distinguishing whether this area is a node area (=0) or a leaf area (=1). Since this area is a leaf, the node/leaf identifying flag is set to "1". The leaf type flag is a flag distinguishing whether a decompression code serving as a leaf thereof is included in 16 types of leaves of "0000" to "1111" (=0) or in 3 types of leaves of "0000 . . . 0" (16, 64, and 256 zeros) (=1). Since this area is the second leaf area 3906, the leaf type flag is set to "1".

Figures 40A, 40B:
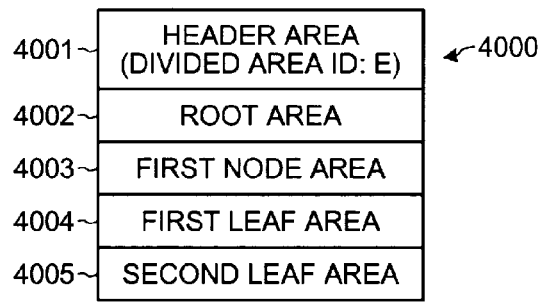
FIG. 40A is an explanatory diagram of a structure for decompression of the area-E Huffman tree.
FIG. 40B is an explanatory diagram of storage contents of a root area of the area-E decompression structure.

FIG. 40A is an explanatory diagram of a structure for decompression of the area-E Huffman tree 3200. A structure for decompression (hereinafter, "area-E decompression structure") 4000 of the area-E Huffman tree 3200 has a header area 4001, a root area 4002, a node area 4003, a first leaf area 4004, and a second leaf area 4005. The header area 4001 stores a divided area ID (=E).

FIG. 40B is an explanatory diagram of storage contents of the root area 4002 of the area-E decompression structure

4000. The root area 4002 stores a node/leaf identifying flag, a node size, and pointers for respective leaf/node numbers. The node/leaf identifying flag is a flag distinguishing whether this area is a node area (=0) or a leaf area (=1). Since this area is the root, the node/leaf identifying flag is set to "0". The node size represents the number of branches from the node (the root in this case).

FIG. 40C is an explanatory diagram of storage contents of the node area 4003 of the area-E decompression structure 4000. The node area 4003 stores a node/leaf identifying flag, a node size, and pointers for respective leaf numbers. The node/leaf identifying flag is a flag distinguishing whether this area is a node area (=0) or a leaf area (=1). Since this area is the node N(E), the node/leaf identifying flag is set to "0". The node size represents the number of branches from the node (the node N(E) in this case).

FIG. 40D is an explanatory diagram of storage contents of the first leaf area 4004 of the area-E decompression structure 4000. The first leaf area 4004 stores a node/leaf identifying flag, a leaf type flag, and the decompression codes and the compressed code lengths corresponding to the leaf numbers. The node/leaf identifying flag is a flag distinguishing whether this area is a node area (=0) or a leaf area (=1). Since this area is a leaf, the node/leaf identifying flag is set to "1". The leaf type flag is a flag distinguishing whether a decompression code serving as a leaf thereof is included in 16 types of leaves of "0000" to "1111" (=0) or in 3 types of leaves of "0000 ... 0" (16, 64, and 256 zeros) (=1). Since this area is the first leaf area 4004, the leaf type flag is set to "0".

FIG. 40E is an explanatory diagram of storage contents of the second leaf area 4005 of the area-E decompression structure 4000. The second leaf area 4005 stores a node/leaf identifying flag, a leaf type flag, and the decompression codes and the compressed code lengths corresponding to the leaf numbers. The node/leaf identifying flag is a flag distinguishing whether this area is a node area (=0) or a leaf area (=1). Since this area is a leaf, the node/leaf identifying flag is set to "1". The leaf type flag is a flag distinguishing whether a decompression code serving as a leaf thereof is included in 16 types of leaves of "0000" to "1111" (=0) or in 3 types of leaves of "0000 ... 0" (16, 64, and 256 zeros) (=1). Since this area is the second leaf area 4005, the leaf type flag is set to "1".

Because of the character data of the area B, the compression is performed by accessing the area-B compression structure 3300 depicted in FIG. 33.

FIG. 41 (A to E) is an explanatory diagram of an example of compression of an appearance bit string related to the character data of the area B. In this example, it is assumed that the appearance bit string to be compressed is "00000010000000011". In FIG. 41A, the appearance bit string is set in a 32-bit register. The bit counter is set to "0". To take out only the final four bits of the register, a mask pattern "0xF0000000" is set to execute a mask process (logical multiplication).

In FIG. 41B, the compressed code "0" corresponding to the decompression code "0000" of the mask process result (AND result) of FIG. 41A is read out from the leaf area 3302 of the area-B compression structure 3300. As a result, the 4-bit decompression code "0000" may be compressed to a 1-bit compressed code "0". Since the decompressed code "0000" of the mask process result (AND result) is four bits, a value of the bit counter is set to 4 (=0+4) to perform 4-bit shift. The appearance bit string "001000000011" after the 4-bit shift is subjected to the mask process (logical multiplication) with the mask pattern "0xF0000000".

In FIG. 41C, the compressed code "0010" corresponding to the decompression code "1011" of the mask process result (AND result) of FIG. 41B is read out from the leaf area 3302 of the area-B compression structure 3300. Since the decompressed code "0010" of the mask process result (AND result) is four bits, a value of the bit counter is set to 8 (=4+4) to perform 4-bit shift. The appearance bit string "00000011" after the 4-bit shift is subjected to the mask process (logical multiplication) with the mask pattern "0xF0000000".

In FIG. 41D, the compressed code "0000" corresponding to the decompression code "0" of the mask process result (AND result) of FIG. 41C is read out from the leaf area 3302 of the area-B compression structure 3300. As a result, the 4-bit decompression code "0000" may be compressed to a 1-bit compressed code "0". Since the decompressed code "0000" of the mask process result (AND result) is four bits, a value of the bit counter is set to 12 (=8+4) to perform 4-bit shift. The appearance bit string "0011" after the 4-bit shift is subjected to the mask process (logical multiplication) with the mask pattern "0xF0000000".

In FIG. 41E, the compressed code "0011" corresponding to the decompression code "1010" of the mask process result (AND result) of FIG. 41D is read out from the leaf area 3302 of the area-B compression structure 3300. Since the decompressed code "0000" of the mask process result (AND result) is four bits, a value of the bit counter is set to 16 (=12+4) to perform 4-bit shift. After this bit shift, the register becomes empty, ending a series of the shifting. Thus, the appearance bit string "10010001000000011" is compressed to the compressed code string "0101101010" obtained from the shifting depicted in FIGS. 41B to 41E.

Because of the character data of the area C, the compression is performed by accessing the area-C compression structure 3400 depicted in FIG. 34.

FIG. 42 is an explanatory diagram of an example of compression of an appearance bit string related to the character data of the area C. In this example, it is assumed that the appearance bit string to be compressed is the bit string depicted in FIG. 42A. In FIG. 42A, the head 32-bit string is set in a 32-bit register. The bit counter is set to "0". To take out only the final 16 bits of the register, a mask pattern "0xF0000000" is set to execute a mask process (logical multiplication).

In FIG. 42B, since the mask process result (AND result) of FIG. 42A is "0000 ... 0" (16-bit consecutive zeros) from the tail end, "0000 ... 0" (16-bit consecutive zeros) of the mask process result (AND result) is directly used as the decompression code. The compressed code "100" corresponding to this decompression code "0000 ... 0" (16-bit consecutive zeros) is read out from the second leaf area 3412 of the area-C compression structure 3400. As a result, the decompression code "0000 ... 0" (16-bit consecutive zeros) may be compressed to the mere 3-bit compressed code "100". Since the decompression code "0000 ... 0" (16-bit consecutive zeros) of the mask process result (AND result) is 16 bits, a value of the bit counter is set to 16 (=0+16) to perform 16-bit shift. The appearance bit string after the 16-bit shift is subjected to the mask process (logical multiplication) with the mask pattern "0xFFFF0000".

In FIG. 42C, since the mask process result (AND result) of FIG. 42B is "0000 ... 0" (16-bit consecutive zeros) from the tail end, "0011" (4-bits) of the mask process result (AND result) is directly used as the decompression code. The compressed code "1011" corresponding to this decompression code "11111001" is read out from the first leaf area 3402 of the area-C compression structure 3400. Since the decompression code "1011" of the mask process result (AND result) is 4 bits, a value of the bit counter is set to 20 (=16+4) to perform 4-bit shift. The appearance bit string after the 4-bit shift is subjected to the mask process (logical multiplication) with the mask pattern "0xFFFF0000".

In FIG. 42D, since the mask process result (AND result) of FIG. 42C is "0000 . . . 0" (16-bit consecutive zeros) from the tail end, "0010" (4-bits) of the mask process result (AND result) is directly used as the decompression code. The compressed code "1011" corresponding to this decompression code "1011" is read out from the first leaf area 3402 of the area-C compression structure 3400. Since the decompression code "1010" of the mask process result (AND result) is 4 bits, a value of the bit counter is set to 4 (=20+4) to perform 4-bit shift. The appearance bit string after the 4-bit shift is subjected to the mask process (logical multiplication) with the mask pattern "0xFFFF0000".

In FIG. 42E, since the mask process result (AND result) of FIG. 42D is "0000 . . . 0" (16-bit consecutive zeros) from the tail end, "0000" (4-bits) of the mask process result (AND result) is directly used as the decompression code. The compressed code "0000" corresponding to this decompression code "0" is read out from the second leaf area 3403 of the area-C compression structure 3400. Since the decompression code "0000" of the mask process result (AND result) is 4 bits, a value of the bit counter is set to 28 (=24+4) to perform 4-bit shift. The appearance bit string after the 4-bit shift is subjected to the mask process (logical multiplication) with the mask pattern "0xFFFF0000".

In FIG. 42F, since the mask process result (AND result) of FIG. 42E is "0000 . . . 0" (16-bit consecutive zeros) from the tail end, "0011" (4-bits) of the mask process result (AND result) is directly used as the decompression code. The compressed code "0011" corresponding to this decompression code "1010" is read out from the first leaf area 3402 of the area-C compression structure 3400. Since the decompression code "0011" of the mask process result (AND result) is 4 bits, a value of the bit counter is set to 2 (=28+4) to perform 4-bit shift. The appearance bit string after the 4-bit shift is subjected to the mask process (logical multiplication) with the mask pattern "0xFFFF0000".

In FIG. 42G, since the mask process result (AND result) of FIG. 42F is "0000 . . . 0" (16-bit consecutive zeros) from the tail end, "0000 . . . 0" (16-bits of consecutive zeros) of the mask process result (AND result) is directly used as the decompression code. The compressed code "0000 . . . 0" (16-bits of consecutive zeros) corresponding to this decompression code "100" is read out from the second leaf area 3403 of the area-C compression structure 3400. As a result, the decompression code "0000 . . . 0" (16-bit consecutive zeros) may be compressed to the mere 3-bit compressed code "100". Since the decompression code "0000 . . . 0" (16-bit consecutive zeros) of the mask process result (AND result) is 16 bits, a value of the bit counter is set to 48 (=32+16) to perform 16-bit shift. Since the register becomes empty after the 16-bit shift, the process is terminated. As above, the appearance bit string to be compressed may be compressed to the compressed code strings acquired from FIGS. 42B to 42G.

Because of the character data of the area D, the compression is performed by accessing the area-D compression structure 3500 depicted in FIG. 35.

FIG. 43 is an explanatory diagram of an example of compression of an appearance bit string related to the character data of the area D. In this example, it is assumed that the appearance bit string to be compressed is the bit string depicted in FIG. 43A. In FIG. 43A, the head 32-bit string is set in a 32-bit register. The bit counter and a continuation counter are set to "0". To take out only the final 16 bits of the register, a mask pattern "0xF0000000" is set to execute a mask process (logical multiplication).

In FIG. 43B, since the mask process result (AND result) of FIG. 43A is "0000 . . . 0" (16-bit consecutive zeros) from the tail end, "0000 . . . 0" (16-bit consecutive zeros) of the mask process result (AND result) is directly used as the decompression code and temporarily retained in the buffer. A value of the bit counter is set to 16 (=0+16) to perform 16-bit shift. The appearance bit string after the 16-bit shift is subjected to the mask process (logical multiplication) with the mask pattern "0xFFFF0000". Since "0000 . . . 0" (16-bit consecutive zeros) is acquired, a value of the continuation counter is set to 1 (=0+1).

In FIG. 43C, since the mask process result (AND result) of FIG. 43B is "0000 . . . 0" (16-bit consecutive zeros) from the tail end, "0000 . . . 0" (16-bit consecutive zeros) of the mask process result (AND result) is directly used as the decompression code and temporarily retained in the buffer. A value of the bit counter is set to 32 (=16+16) to perform 16-bit shift. The appearance bit string after the 16-bit shift is subjected to the mask process (logical multiplication) with the mask pattern "0xFFFF0000". Since "0000 . . . 0" (16-bit consecutive zeros) is acquired, a value of the continuation counter is set to 2 (=1+1).

In FIG. 43D, since the mask process result (AND result) of FIG. 43C is "0000 . . . 0" (16-bit consecutive zeros) from the tail end, "0000 . . . 0" (16-bit consecutive zeros) of the mask process result (AND result) is directly used as the decompression code and temporarily retained in the buffer. A value of the bit counter is set to 48 (=32+16) to perform 16-bit shift. The appearance bit string after the 16-bit shift is subjected to the mask process (logical multiplication) with the mask pattern "0xFFFF0000". Since "0000 . . . 0" (16-bit consecutive zeros) is acquired, a value of the continuation counter is set to 3 (=2+1).

In FIG. 43E, since the mask process result (AND result) of FIG. 43D is "0000 . . . 0" (16-bit consecutive zeros) from the tail end, "0000 . . . 0" (16-bit consecutive zeros) of the mask process result (AND result) is directly used as the decompression code and temporarily retained in the buffer. A value of the bit counter is set to 64 (=46+16) to perform 16-bit shift. The appearance bit string after the 16-bit shift is subjected to the mask process (logical multiplication) with the mask pattern "0xFFFF0000". Since "0000 . . . 0" (16-bit consecutive zeros) is acquired, a value of the continuation counter is set to 4 (=3+1).

Since the value of the continuation counter is set to "4", the buffer stores four sequences of "0000 . . . 0" (16-bit consecutive zeros), i.e., one sequence of "0000 . . . 0" (64-bit consecutive zeros). Therefore, this "0000 . . . 0" (64-bit consecutive zeros) is used as a decompression code to read the compressed code "110" corresponding to the decompression code from the second leaf area 3503 of the area-D compression structure 3500. As a result, the decompression code "0000 . . . 0" (64-bit consecutive zeros) in the appearance bit string may be compressed to the mere 3-bit compressed code "100".

Figure 44:
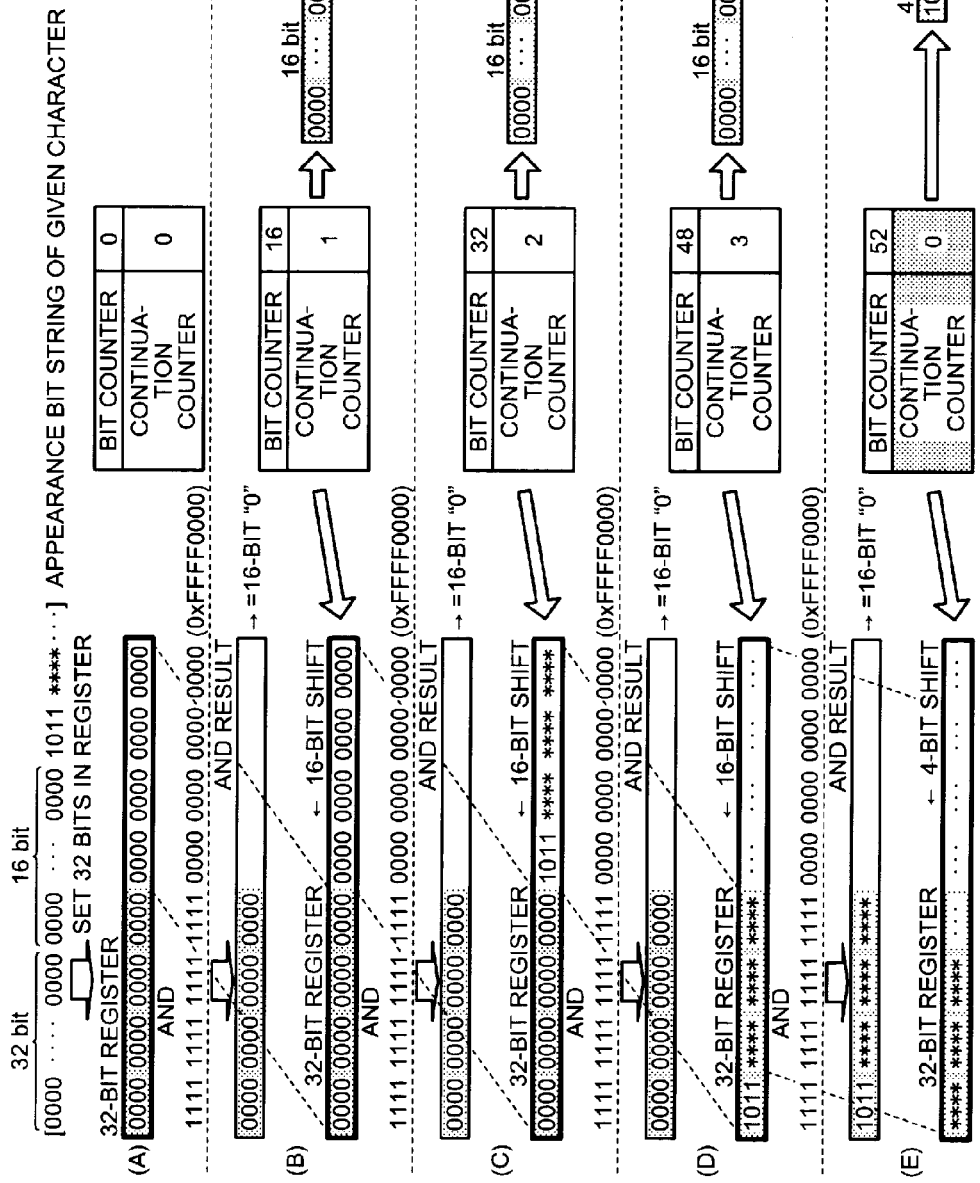
FIG. 44 (A to E) is an explanatory diagram of a second example of compression of an appearance bit string related to the character data of the area D.

FIG. 44 (A to E) is an explanatory diagram of a second example of compression of an appearance bit string related to the character data of the area D. Although the example depicted is an example that enables compression of the decompression code "0000 . . . 0" (64-bit consecutive zeros) to the 3-bit compressed code "110", this example describes an example of compression when the decompression code "0000 . . . 0" (64-bit consecutive zeros) is not acquired.

In this example, it is assumed that the appearance bit string to be compressed is a bit string depicted in FIG. 44A. In FIG.

44A, the leading 32 bits of the appearance bit string are set in the 32-bit register. The bit counter and the continuation counter are set to "0". To take out only the final 16 bits of the register, a mask pattern "0xFFFF0000" is set to execute a mask process (logical multiplication).

In FIG. 44B, since the mask process result (AND result) of FIG. 44A is "0000 . . . 0" (16-bit consecutive zeros) from the tail end, "0000 . . . 0" (16-bit consecutive zeros) of the mask process result (AND result) is directly used as the decompression code and temporarily retained in the buffer. A value of the bit counter is set to 16 (=0+16) to perform 16-bit shift. The appearance bit string after the 16-bit shift is subjected to the mask process (logical multiplication) with the mask pattern "0xFFFF0000". Since "0000 . . . 0" (16-bit consecutive zeros) is acquired, a value of the continuation counter is set to 1 (=0+1).

In FIG. 44C, since the mask process result (AND result) of FIG. 44B is "0000 . . . 0" (16-bit consecutive zeros) from the tail end, "0000 . . . 0" (16-bit consecutive zeros) of the mask process result (AND result) is directly used as the decompression code and temporarily retained in the buffer. A value of the bit counter is set to 32 (=16+16) to perform 16-bit shift. The appearance bit string after the 16-bit shift is subjected to the mask process (logical multiplication) with the mask pattern "0xFFFF0000". Since "0000 . . . 0" (16-bit consecutive zeros) is acquired, a value of the continuation counter is set to 2 (=1+1).

In FIG. 44D, since the mask process result (AND result) of FIG. 44C is "0000 . . . 0" (16-bit consecutive zeros) from the tail end, "0000 . . . 0" (16-bit consecutive zeros) of the mask process result (AND result) is directly used as the decompression code and temporarily retained in the buffer. A value of the bit counter is set to 48 (=32+16) to perform 16-bit shift. The appearance bit string after the 16-bit shift is subjected to the mask process (logical multiplication) with the mask pattern "0xFFFF0000". Since "0000 . . . 0" (16-bit consecutive zeros) is acquired, a value of the continuation counter is set to 3 (=2+1).

In FIG. 44E, since the mask process result (AND result) of FIG. 44D is "0000 . . . 0" (16-bit consecutive zeros) from the tail end, "1011" (4-bits) of the mask process result (AND result) is directly used as the decompression code. The compressed code "1011" corresponding to this decompression code "11111001" is read out from the first leaf area 3502 of the area-D compression structure 3500. Since the decompression code "1011" of the mask process result (AND result) is 4 bits, a value of the bit counter is set to 52 (=48+4) to perform 4-bit shift. The appearance bit string after the 4-bit shift is subjected to the mask process (logical multiplication) with the mask pattern "0xFFFF0000". Further, since "0000 . . . 0" (16-bit consecutive zeros) is not obtained, the continuation counter is reset to "0".

In accordance with this reset of the continuation counter, the respective compressed codes "1100" corresponding to the decompression codes "0000 . . . 0" (16-bit consecutive zeros) retained in the buffer in FIGS. 44B to 44D are read from the second leaf area 3512 of the area-D compression structure 3500. Therefore, even if the decompression code "0000 . . . 0" (64-bit consecutive zeros) does not appear, the compression may be performed for every 16 bits.

Because of the character data of the area E, the compression is performed by accessing the area-E compression structure 3600 depicted in FIG. 36.

Figure 45:
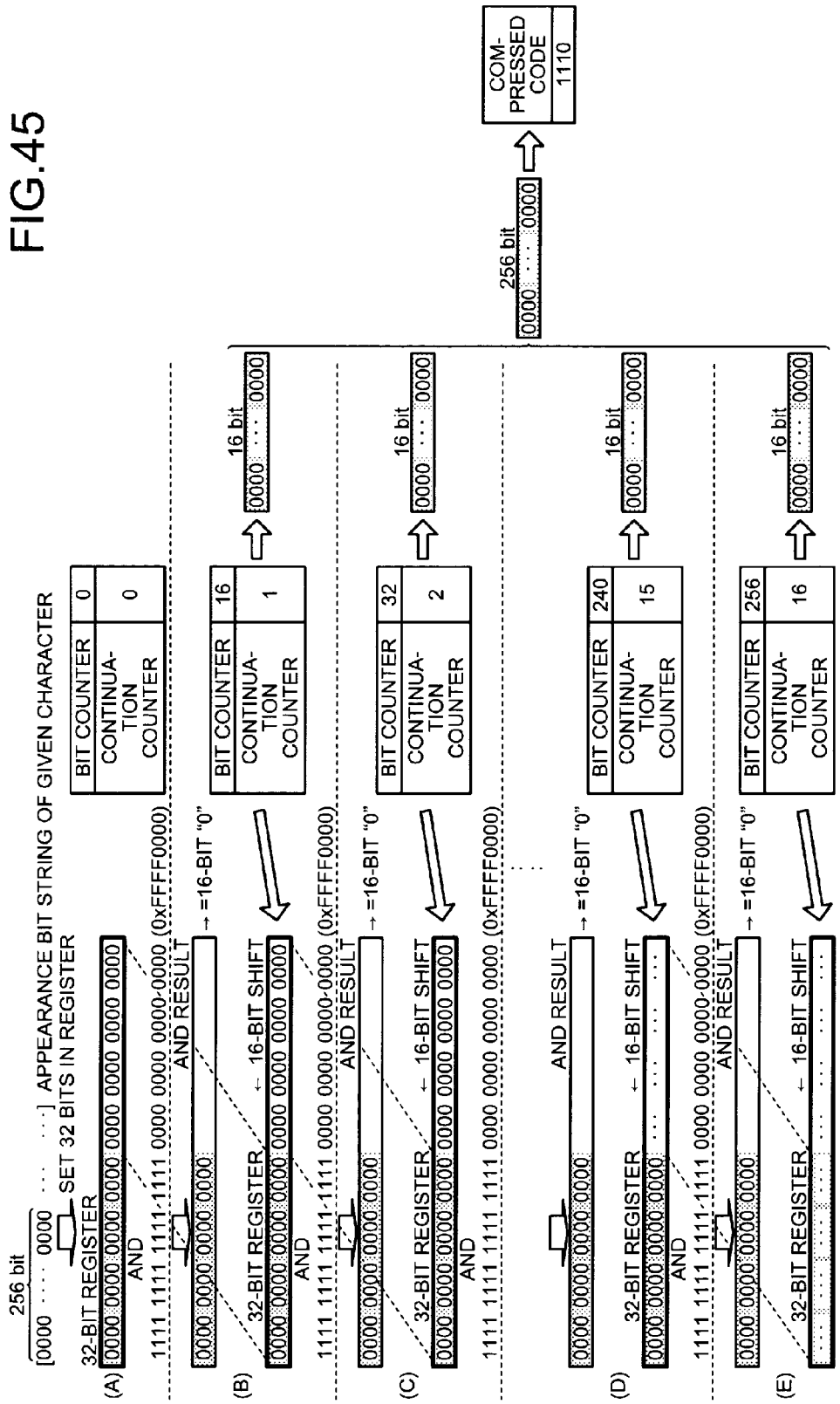
FIG. 45 is an explanatory diagram of an example of compression of an appearance bit string related to the character data of the area E.

FIG. 45 is an explanatory diagram of an example of compression of an appearance bit string related to the character data of the area E. In this example, it is assumed that the appearance bit string to be compressed is the bit string depicted in FIG. 42A. In FIG. 42A, the head 32-bit string is set in a 32-bit register. The bit counter and the continuation counter are set to "0". To take out only the final 16 bits of the register, a mask pattern "0xF0000000" is set to execute a mask process (logical multiplication).

In FIG. 45B, since the mask process result (AND result) of FIG. 45A is "0000 . . . 0" (16-bit consecutive zeros) from the tail end, "0000 . . . 0" (16-bit consecutive zeros) of the mask process result (AND result) is directly used as the decompression code and temporarily retained in the buffer. A value of the bit counter is set to 16 (=0+16) to perform 16-bit shift. The appearance bit string after the 16-bit shift is subjected to the mask process (logical multiplication) with the mask pattern "0xFFFF0000". Since "0000 . . . 0" (16-bit consecutive zeros) is acquired, a value of the continuation counter is set to 1 (=0+1).

In FIG. 45C, since the mask process result (AND result) of FIG. 45B is "0000 . . . 0" (16-bit consecutive zeros) from the tail end, "0000 . . . 0" (16-bit consecutive zeros) of the mask process result (AND result) is directly used as the decompression code and temporarily retained in the buffer. A value of the bit counter is set to 32 (=16+16) to perform 16-bit shift. The appearance bit string after the 16-bit shift is subjected to the mask process (logical multiplication) with the mask pattern "0xFFFF0000". Since "0000 . . . 0" (16-bit consecutive zeros) is acquired, a value of the continuation counter is set to 2 (=1+1). It is assumed that the same contents are subsequently repeated until the bit counter value of 224 and the continuation counter value of 14.

In FIG. 45D, since the mask process result (AND result) of FIG. 45C is "0000 . . . 0" (16-bit consecutive zeros) from the tail end, "0000 . . . 0" (16-bit consecutive zeros) of the mask process result (AND result) is directly used as the decompression code and temporarily retained in the buffer. A value of the bit counter is set to 240 (=224+16) to perform 16-bit shift. The appearance bit string after the 16-bit shift is subjected to the mask process (logical multiplication) with the mask pattern "0xFFFF0000". Since "0000 . . . 0" (16-bit consecutive zeros) is acquired, a value of the continuation counter is set to 15 (=14+1).

In FIG. 45E, since the mask process result (AND result) of FIG. 45D is "0000 . . . 0" (16-bit consecutive zeros) from the tail end, "0000 . . . 0" (16-bit consecutive zeros) of the mask process result (AND result) is directly used as the decompression code and temporarily retained in the buffer. A value of the bit counter is set to 256 (=240+16) to perform 16-bit shift. The appearance bit string after the 16-bit shift is subjected to the mask process (logical multiplication) with the mask pattern "0xFFFF0000". Since "0000 . . . 0" (16-bit consecutive zeros) is acquired, a value of the continuation counter is set to 16 (=15+1).

Since the value of the continuation counter is "16", the buffer stores 16 sequences of "0000 . . . 0" (16-bit consecutive zeros), i.e., one sequence of "0000 . . . 0" (256-bit consecutive zeros). Therefore, this "0000 . . . 0" (256-bit consecutive zeros) is used as a decompression code to read the compressed code "1110" corresponding to the decompression code from the second leaf area 3603 of the area-E compression structure 3600. As a result, the decompression code "0000 . . . 0" (256-bit consecutive zeros) in the appearance bit string may be compressed to the mere 4-bit compressed code "1110".

Figure 46:
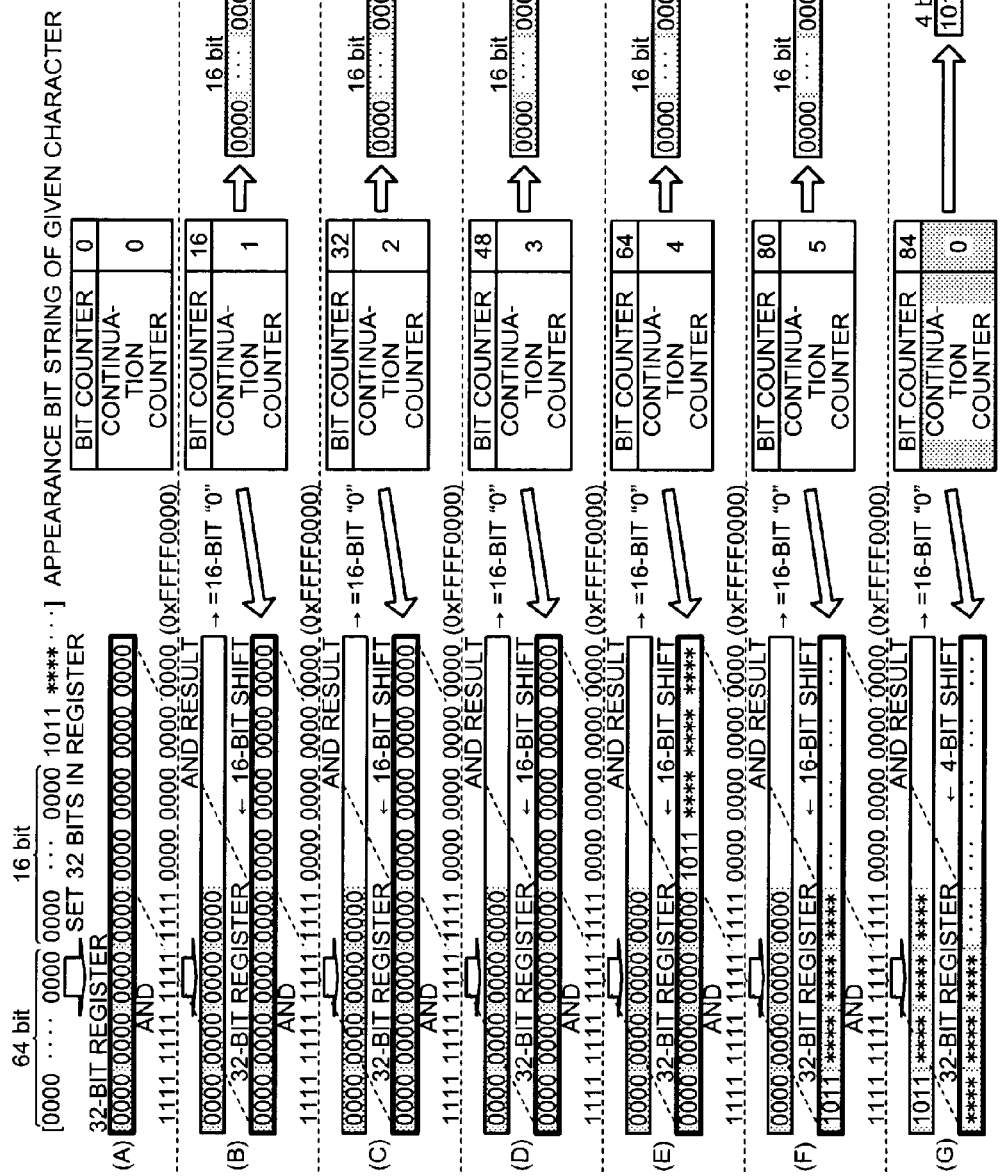
FIG. 46 is an explanatory diagram of a second example of compression of an appearance bit string related to the character data of the area D.

FIG. 46 is an explanatory diagram of a second example of compression of an appearance bit string related to the character data of the area D. Although the example depicted in FIG. 45 is an example that enables compression of the decompression code "0000 . . . 0" (256-bit consecutive zeros) to the 4-bit compressed code "1110", this example describes an example of compression when the decompression code "0000 . . . 0" (256-bit consecutive zeros) is not acquired.

In this example, it is assumed that the appearance bit string to be compressed is a bit string depicted in FIG. 45A. In FIG. 45A, the leading 32 bits of the appearance bit string are set in the 32-bit register. The bit counter and the continuation counter are set to "0". To take out only the final 16 bits of the register, a mask pattern "0xFFFF0000" is set to execute a mask process (logical multiplication).

In FIG. 46B, since the mask process result (AND result) of FIG. 46A is "0000 . . . 0" (16-bit consecutive zeros) from the tail end, "0000 . . . 0" (16-bit consecutive zeros) of the mask process result (AND result) is directly used as the decompression code and temporarily retained in the buffer. A value of the bit counter is set to 16 (=0+16) to perform 16-bit shift. The appearance bit string after the 16-bit shift is subjected to the mask process (logical multiplication) with the mask pattern "0xFFFF0000". Since "0000 . . . 0" (16-bit consecutive zeros) is acquired, a value of the continuation counter is set to 1 (=0+1).

In FIG. 46C, since the mask process result (AND result) of FIG. 46D is "0000 . . . 0" (16-bit consecutive zeros) from the tail end, "0000 . . . 0" (16-bit consecutive zeros) of the mask process result (AND result) is directly used as the decompression code and temporarily retained in the buffer. A value of the bit counter is set to 32 (=16+16) to perform 16-bit shift. The appearance bit string after the 16-bit shift is subjected to the mask process (logical multiplication) with the mask pattern "0xFFFF0000". Since "0000 . . . 0" (16-bit consecutive zeros) is acquired, a value of the continuation counter is set to 2 (=1+1).

In FIG. 46D, since the mask process result (AND result) of FIG. 46C is "0000 . . . 0" (16-bit consecutive zeros) from the tail end, "0000 . . . 0" (16-bit consecutive zeros) of the mask process result (AND result) is directly used as the decompression code and temporarily retained in the buffer. A value of the bit counter is set to 48 (=32+16) to perform 16-bit shift. The appearance bit string after the 16-bit shift is subjected to the mask process (logical multiplication) with the mask pattern "0xFFFF0000". Since "0000 . . . 0" (16-bit consecutive zeros) is acquired, a value of the continuation counter is set to 3 (=2+1).

In FIG. 46E, since the mask process result (AND result) of FIG. 46D is "0000 . . . 0" (16-bit consecutive zeros) from the tail end, "0000 . . . 0" (16-bit consecutive zeros) of the mask process result (AND result) is directly used as the decompression code and temporarily retained in the buffer. A value of the bit counter is set to 64 (=48+16) to perform 16-bit shift. The appearance bit string after the 16-bit shift is subjected to the mask process (logical multiplication) with the mask pattern "0xFFFF0000". Since "0000 . . . 0" (16-bit consecutive zeros) is acquired, a value of the continuation counter is set to 4 (=3+1).

In FIG. 46F, since the mask process result (AND result) of FIG. 46E is "0000 . . . 0" (16-bit consecutive zeros) from the tail end, "0000 . . . 0" (16-bit consecutive zeros) of the mask process result (AND result) is directly used as the decompression code and temporarily retained in the buffer. A value of the bit counter is set to 80 (=64+16) to perform 16-bit shift. The appearance bit string after the 16-bit shift is subjected to the mask process (logical multiplication) with the mask pattern "0xFFFF0000". Since "0000 . . . 0" (16-bit consecutive zeros) is acquired, a value of the continuation counter is set to 5 (=4+1).

In FIG. 46G, since the mask process result (AND result) of FIG. 46F is "0000 . . . 0" (16-bit consecutive zeros) from the tail end, "1011" (4-bits) of the mask process result (AND result) is directly used as the decompression code. The compressed code "1011" corresponding to this decompression code "11111001" is read out from the first leaf area 3602 of the area-E compression structure 3600. Since the decompression code "1011" of the mask process result (AND result) is 4 bits, a value of the bit counter is set to 84 (=80+4) to perform 4-bit shift. The appearance bit string after the 4-bit shift is subjected to the mask process (logical multiplication) with the mask pattern "0xFFFF0000". Further, since "0000 . . . 0" (16-bit consecutive zeros) is not obtained, the continuation counter is reset to "0".

The buffer stores four sequences of "0000 . . . 0" (16-bit consecutive zeros), i.e., one sequence of "0000 . . . 0" (64-bit consecutive zeros). Therefore, in accordance with this reset of the continuation counter, "0000 . . . 0" (64-bit consecutive zeros) retained in the buffer in FIGS. 46B to 46E is used as a decompression code to read the compressed code "110" corresponding to the decompression code from the second leaf area 3612 of the area-E compression structure 3600. As a result, the decompression code "0000 . . . 0" (64-bit consecutive zeros) may be compressed to the mere 3-bit compressed code "110".

The buffer stores one sequence of "0000 . . . 0" (16-bit consecutive zeros) due to the process of FIG. 46F. Therefore, in accordance with this reset of the continuation counter, "0000 . . . 0" (164-bit consecutive zeros) retained in the buffer in FIG. 46F is used as a decompression code to read the compressed code "10" corresponding to the decompression code from the second leaf area 3612 of the area-E compression structure 3600. As a result, the decompression code "0000 . . . 0" (16-bit consecutive zeros) may be compressed to the mere 2-bit compressed code "10".

Figure 47:
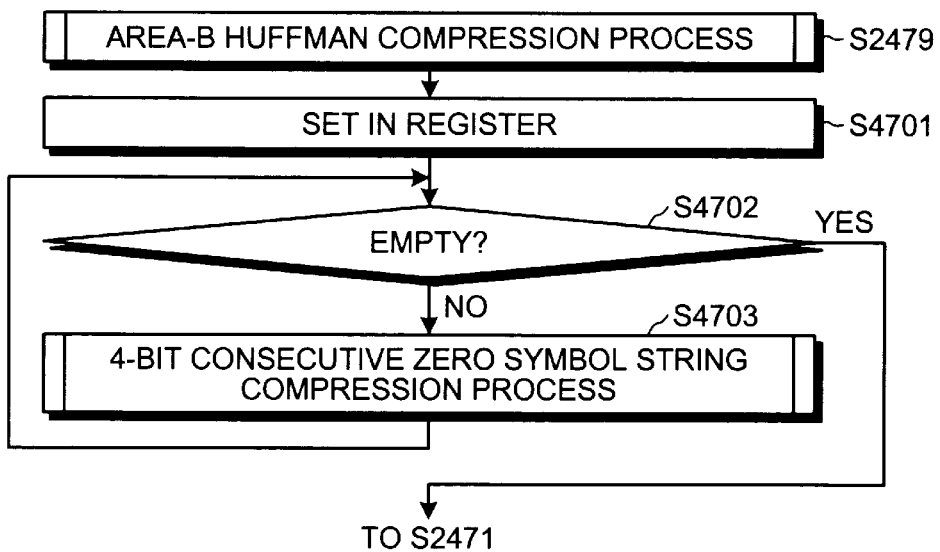
FIG. 47 is a flowchart of the area-B Huffman compression process procedures.

FIG. 47 is a flowchart of the area-B Huffman compression process procedures. In this flowchart, the compression process as depicted in FIG. 41 is automatically executed in the Huffman compression (step S2479) of FIG. 24B.

First, the appearance bit string of the selected character data is set in the register (step S4701) and it is determined whether the register is empty (step S4702). If the register is not empty (step S4702: NO), a 4-bit consecutive zero symbol string compression process is executed (step S4703) and the procedure goes back to step S4702. If the register is empty at step S4702 (step S4702: YES), the area-B Huffman compression process is terminated and the procedure goes back to step S2471.

Figure 48:
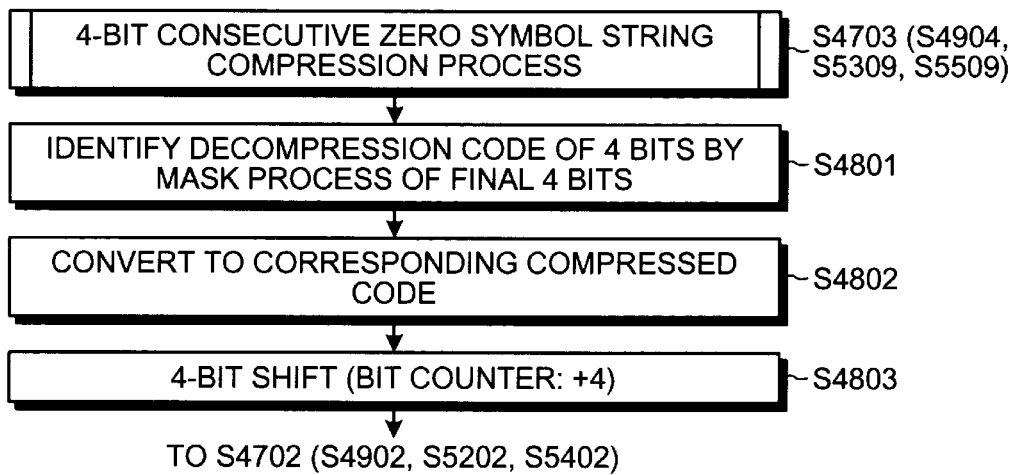
FIG. 48 is a flowchart of a 4-bit consecutive zero symbol string compression process.

The detailed process procedures of the 4-bit consecutive zero symbol string compression process will then be described. FIG. 48 is a flowchart of the detailed process procedures of the 4-bit consecutive zero symbol string compression process. First, the 4-bit decompression code is identified by the mask process of the final four bits (step S4801). A compressed code corresponding to the identified decompressed code is read from the leaf area 3302 of the area-B compression structure 3300 for the conversion to the compressed code (step S4802). The bit counter is incremented by 4 to perform the 4-bit shift of the bit string in the register (step S4803). The subsequent bit strings are sequentially set in the empty area of the register. The procedure goes back to step S4702.

Figure 49:
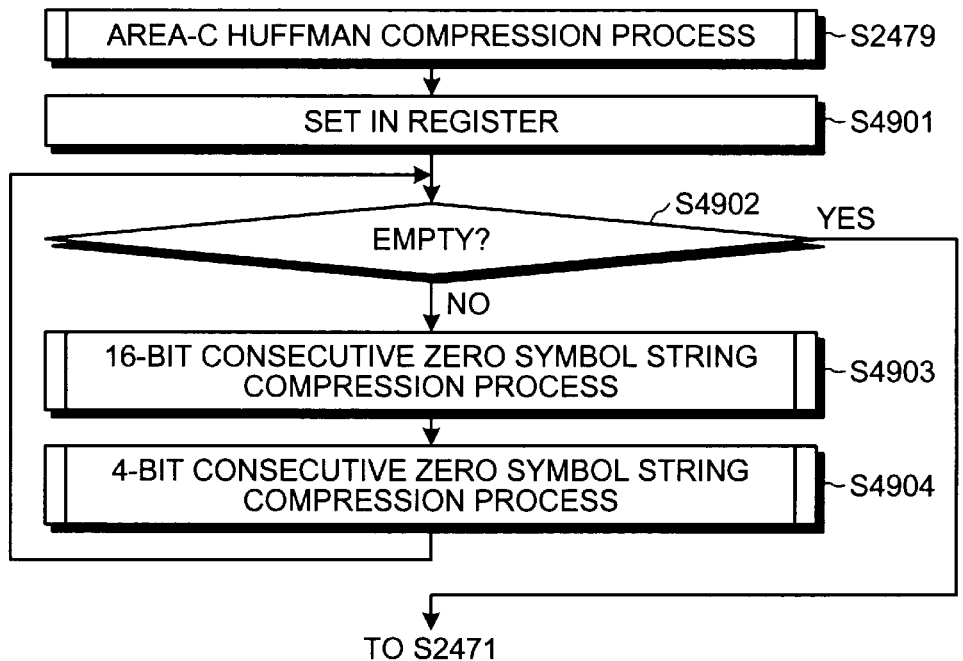
FIG. 49 is a flowchart of the area-C Huffman compression process procedures.

The area-C Huffman compression process procedures will then be described. FIG. 49 is a flowchart of the area-C Huffman compression process procedures. In this flowchart, the compression process as depicted in FIG. 42 is automatically executed in the Huffman compression (step S2479) of FIG. 24B. First, the appearance bit string of the selected character data is set in the register (step S4901) and it is determined whether the register is empty (step S4902). If the register is not empty (step S4902: NO), a 16-bit consecutive zero symbol string compression process is executed (step S4903).

The 4-bit consecutive zero symbol string compression process is then executed (step S4904) and the procedure goes back to step S4902. If the register is empty at step S4902 (step S4902: YES), the area-C Huffman compression process is terminated and the procedure goes back to step S2471. The 4-bit consecutive zero symbol string compression process (step S4904) has the process procedures depicted in FIG. 48.

Figure 50:
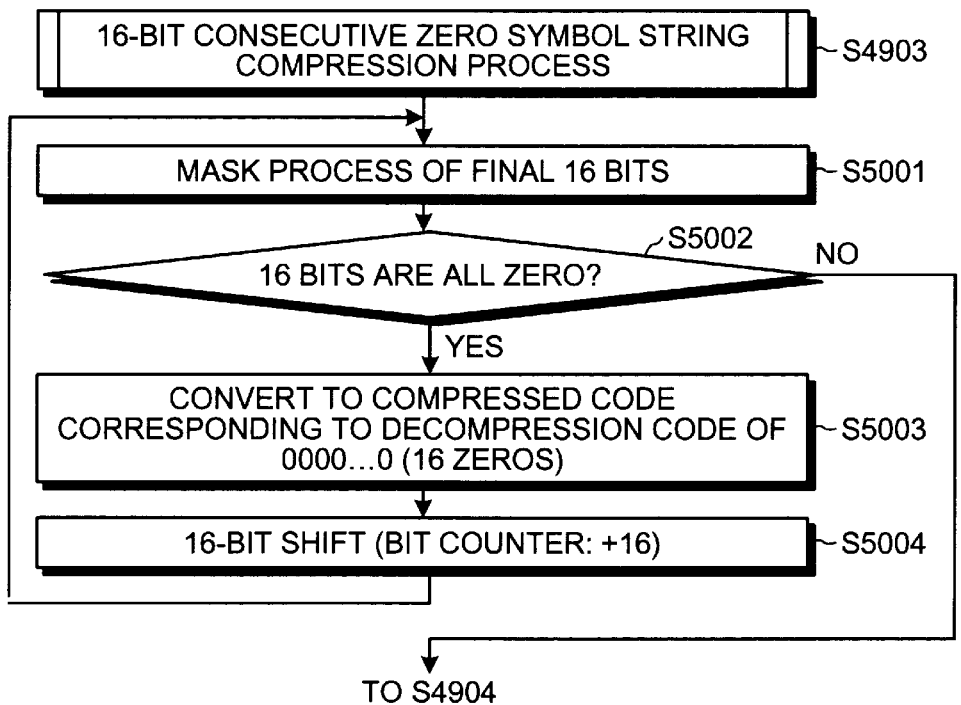
FIG. 50 is a flowchart of a 16-bit consecutive zero symbol string compression process.

The detailed process procedures of the 16-bit consecutive zero symbol string compression process will then be described. FIG. 50 is a flowchart of the detailed process procedures of the 16-bit consecutive zero symbol string compression process. First, the mask process is executed for the final 16 bits (step S5001) and it is determined whether the final 16 bits are all zero (step S5002). If all zero (step S5002: YES), the compressed code corresponding to the decompression code of "0000 . . . 0" (16 zeros) is read from the second leaf area 3403 of the area-C compression structure 3400 for the conversion to the compressed code (step S5003).

The bit counter is incremented by 16 to perform the 16-bit shift of the bit string in the register (step S5004). The subsequent bit strings are sequentially set in the empty area of the register and the procedure goes back to step S5001. On the other hand, if not all the 16 bits are zero at step S5002 (step S5002: NO), the procedure goes to step S4904 to execute the 4-bit consecutive zero symbol string compression process (step S4904).

Figure 51:
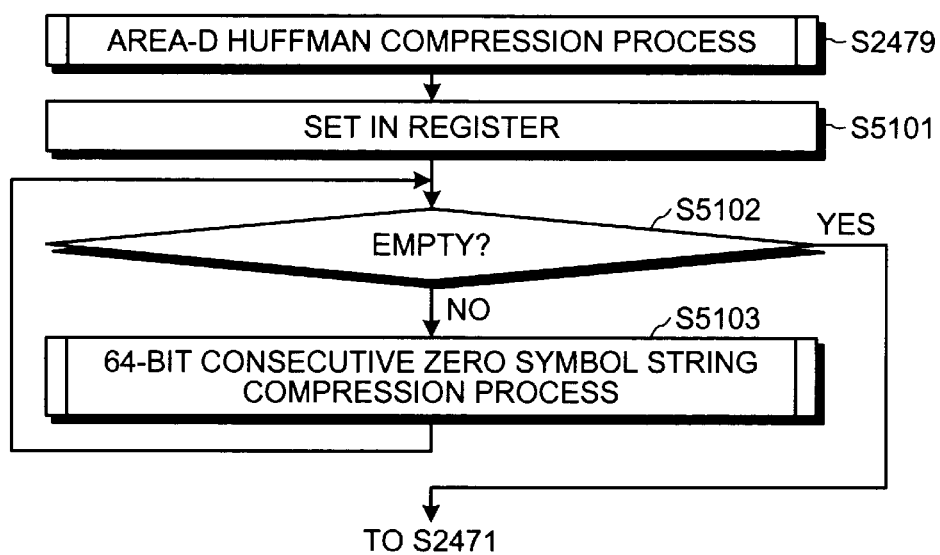
FIG. 51 is a flowchart of the area-D Huffman compression process procedures.

FIG. 51 is a flowchart of the area-D Huffman compression process procedures. In this flowchart, the compression process as depicted in FIGS. 43 and 44 is automatically executed. First, the appearance bit string of the selected character data is set in the register (step S5101) and it is determined whether the register is empty (step S5102). If the register is not empty (step S5102: NO), a 64-bit consecutive zero symbol string compression process is executed (step S5103) and the procedure goes back to step S5102. If the register is empty at step S5102 (step S5102: YES), the procedure goes back to step S2471.

Figure 52:
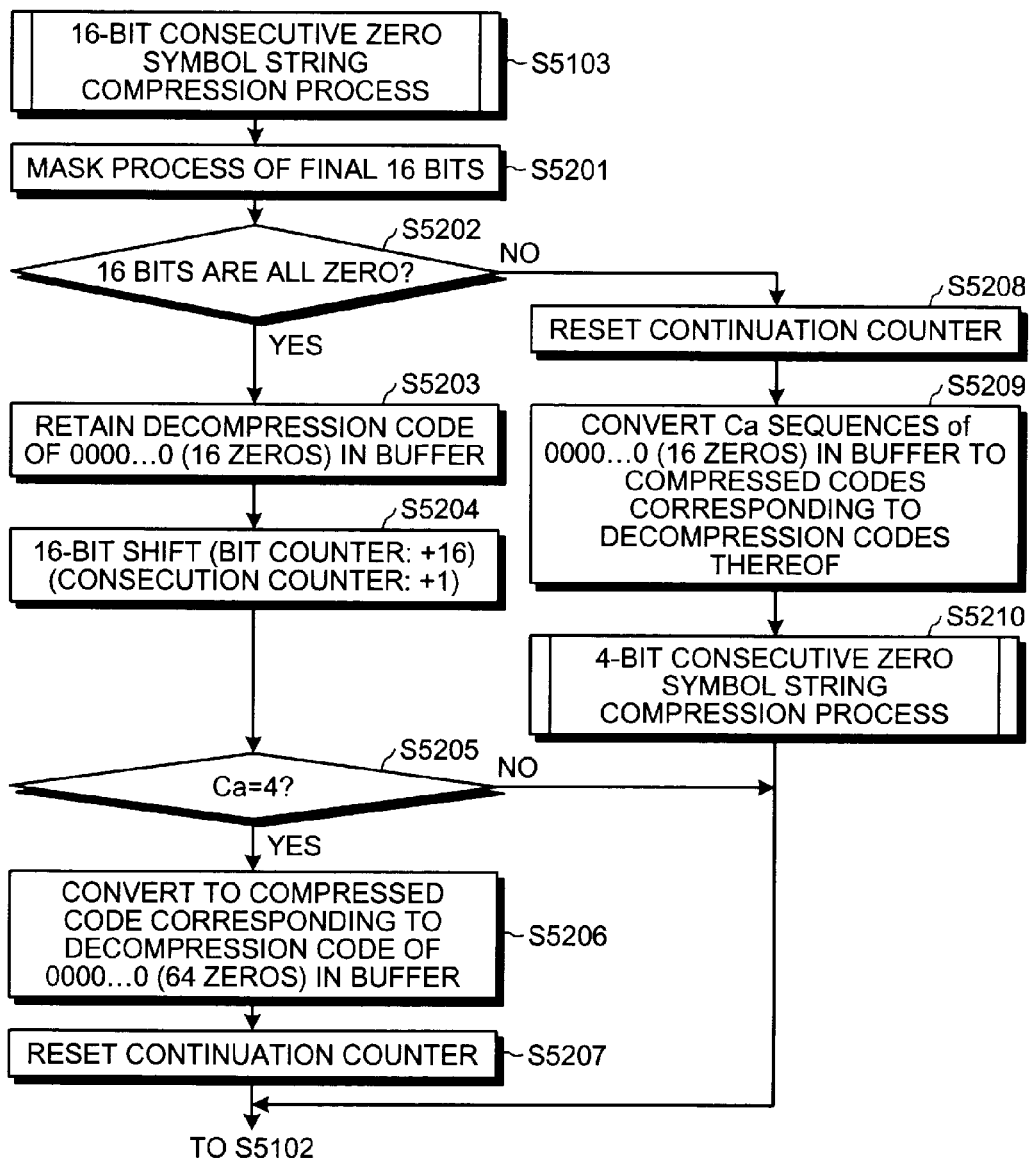
FIG. 52 is a flowchart of a 64-bit consecutive zero symbol string compression process.

The detailed process procedures of the 64-bit consecutive zero symbol string compression process will then be described. FIG. 52 is a flowchart of the detailed process procedures of the 64-bit consecutive zero symbol string compression process. First, the mask process is executed for the final 16 bits (step S5001) and it is determined whether the final 16 bits are all zero (step S5202). If all zero (step S5202: YES), the decompression code of "0000 . . . 0" (16 zeros) is retained in the buffer (step S5203). The bit counter is incremented by 16 to perform the 16-bit shift of the bit string in the register (step S5204). The subsequent bit strings are sequentially set in the empty area of the register. The continuation counter is incremented by one.

It is determined whether a continuation counter value Ca is Ca=4 (step S5205). If Ca=4 (step S5205: YES), since the buffer retains four sequences of "0000 . . . 0" (16 zeros), i.e., one sequence of "0000 . . . 0" (64 zeros), a compressed code corresponding to the decompressed code "0000 . . . 0" (64 zeros) is read from the second leaf area 3503 of the area-D compression structure 3500 for the conversion to the compressed code (step S5206). The continuation counter value Ca is then reset (Ca=0) (step S5207) and the procedure goes back to step S5102. On the other hand, if not Ca=4 at step S5205 (step S5205: NO), the procedure goes back to step S5102.

On the other hand, it is determined that not all the final 16 bits are zero at step S5202 (step S5202: NO), the continuation counter value Ca is reset (Ca=0) (step S5208) and the sequences of "0000 . . . 0" (16 zeros) in the buffer are used as the respective decompression codes. The compressed codes corresponding to the decompression codes are read from the second leaf area 3503 of the area-D compression structure 3500 for the conversion to the compressed codes (step S5209). The 4-bit consecutive zero symbol string compression process is executed (step S5210) and the procedure goes back to step S5102. The 4-bit consecutive zero symbol string compression process (step S5210) has the process procedures depicted in FIG. 48.

Figure 53:
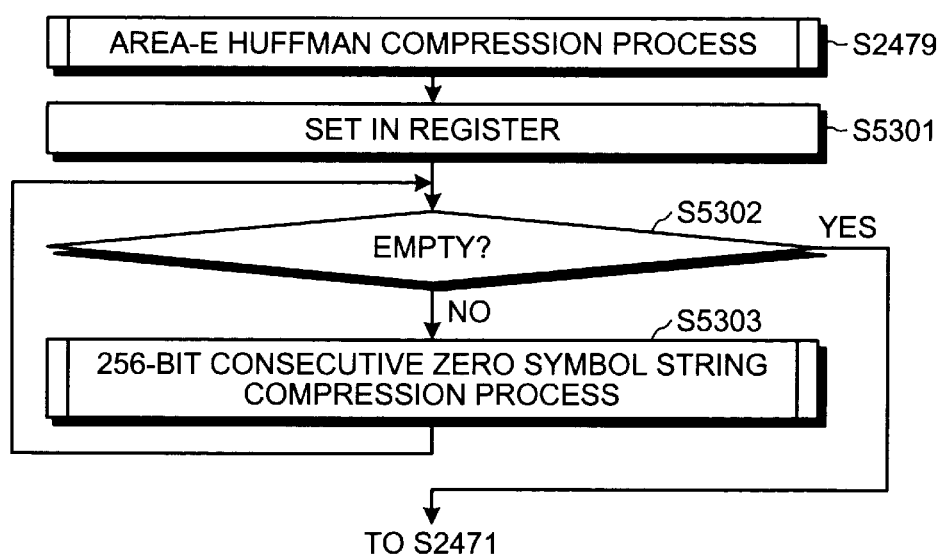
FIG. 53 is a flowchart of area-E Huffman compression process procedures.

FIG. 53 is a flowchart of the area-E Huffman compression process procedures. In this flowchart, the compression process as depicted in FIGS. 45 and 46 is automatically executed. First, the appearance bit string of the selected character data is set in the register (step S5301) and it is determined whether the register is empty (step S5302). If the register is not empty (step S5302: NO), a 256-bit consecutive zero symbol string compression process is executed (step S5303) and the procedure goes back to step S5302. If the register is empty at step S5302 (step S5302: YES), the procedure goes back to step S2471.

Figure 54:
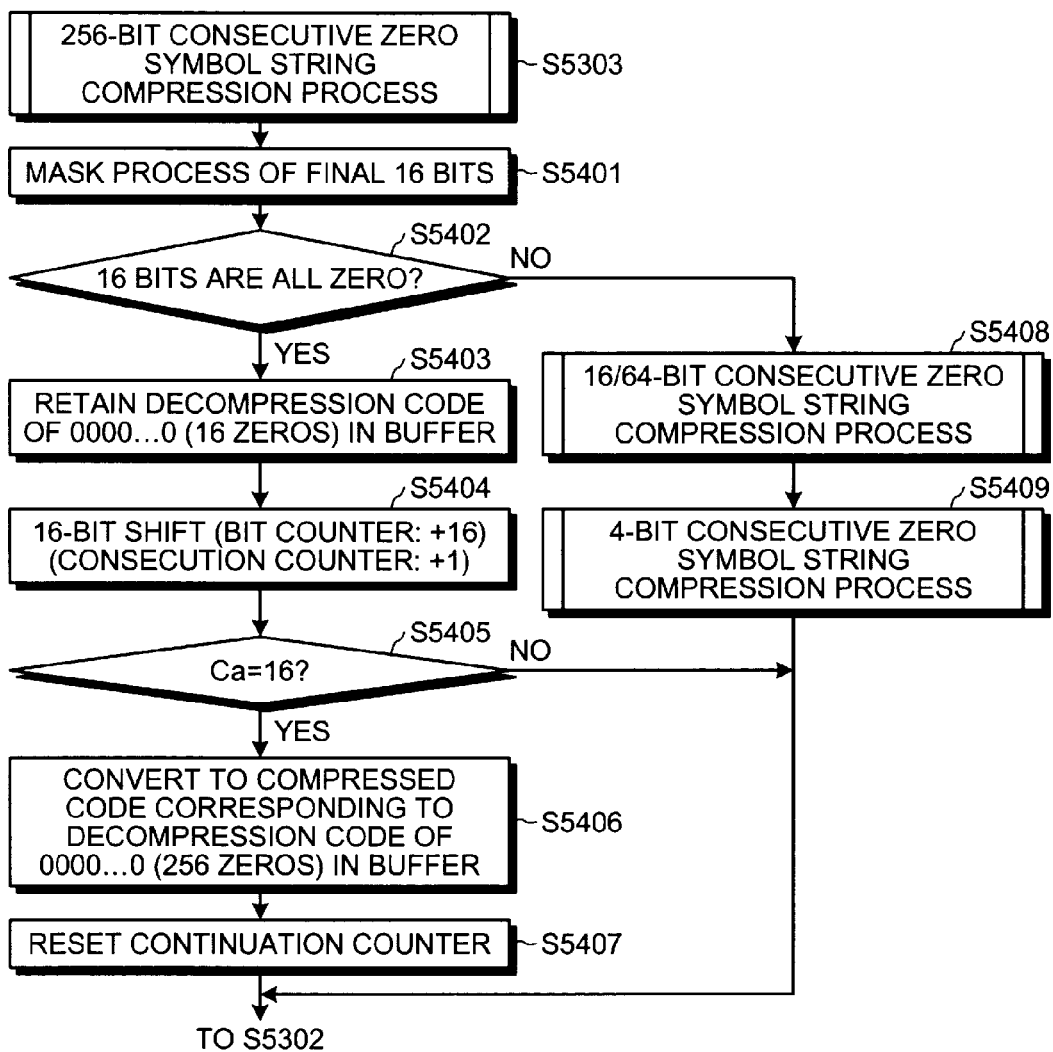
FIG. 54 is a flowchart of a 256-bit consecutive zero symbol string compression process.

The detailed process procedures of the 256-bit consecutive zero symbol string compression process will then be described. FIG. 54 is a flowchart of the detailed process procedures of the 256-bit consecutive zero symbol string compression process. First, the mask process is executed for the final 16 bits (step S5401) and it is determined whether the final 16 bits are all zero (step S5402). If all zero (step S5402: YES), the decompression code of "0000 . . . 0" (16 zeros) is retained in the buffer (step S5403). The bit counter is incremented by 16 to perform the 16-bit shift of the bit string in the register (step S5404). The subsequent bit strings are sequentially set in the empty area of the register. The continuation counter is incremented by one.

It is determined whether the continuation counter value Ca is Ca=16 (step S5405). If Ca=16 (step S5405: YES), since the buffer retains 16 sequences of "0000 . . . 0" (16 zeros), i.e., one sequence of "0000 . . . 0" (256 zeros), a compressed code corresponding to the decompressed code "0000 . . . 0" (256 zeros) is read from the second leaf area 3603 of the area-E compression structure 3600 for the conversion to the compressed code (step S5406). The continuation counter value Ca is then reset (Ca=0) (step S5407) and the procedure goes back to step S5302. On the other hand, if not Ca=16 at step S5405 (step S5405: NO), the procedure goes back to step S5302.

On the other hand, it is determined that not all the final 16 bits are zero at step S5402 (step S5402: NO), the 16/64-bit consecutive zero symbol string compression process is executed (step S5408). The 4-bit consecutive zero symbol string compression process is subsequently executed (step S5409) and the procedure goes back to step S5402. The 4-bit consecutive zero symbol string compression process (step S5409) has the process procedures depicted in FIG. 48.

Figure 55:
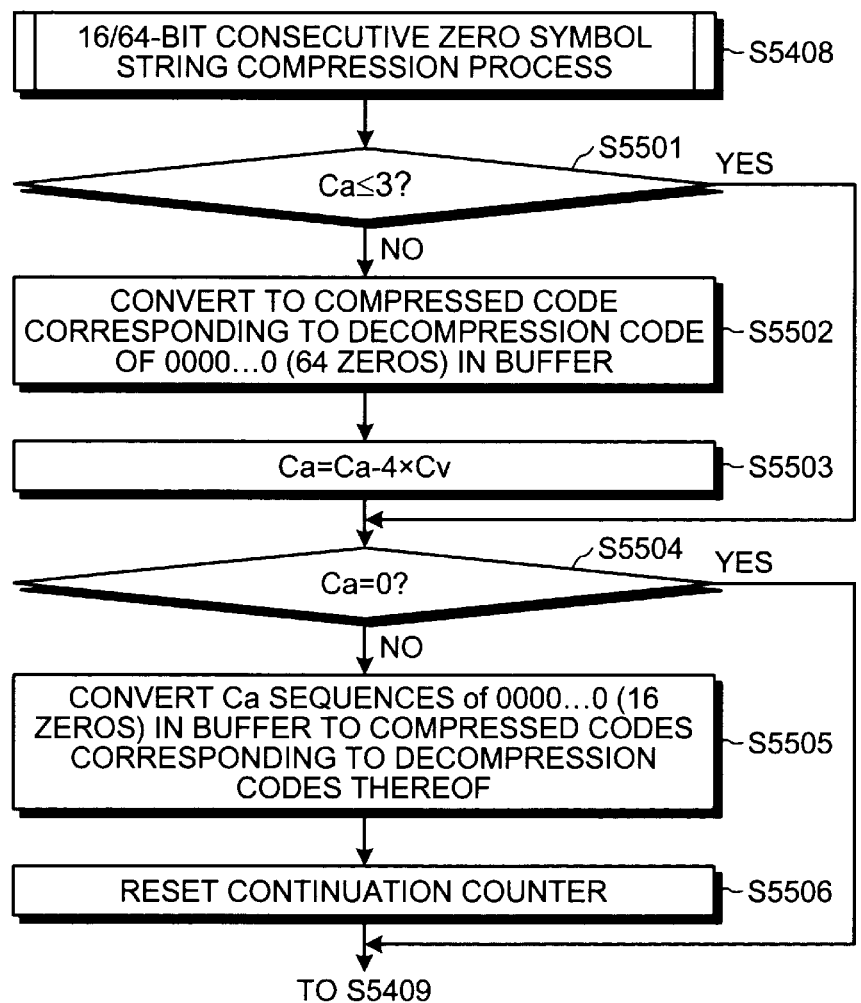
FIG. 55 is a flowchart of a 16/64-bit consecutive zero symbol string compression process.

The detailed process procedures of the 16/64-bit consecutive zero symbol string compression process will then be described. FIG. 55 is a flowchart of the detailed process procedures of the 16/64-bit consecutive zero symbol string compression process. First, it is determined whether the continuation counter value Ca is Ca≤3 (step S5501). If not Ca≤3 (step S5501: NO), the sequences of "0000 . . . 0" (64 zeros) in the buffer are used as the decompression codes. In this case, one to three depression codes are acquired.

The compressed codes corresponding to these decompression codes are read from the second leaf area 3603 of the area-E compression structure 3600 for the conversion to the compressed codes (step S5502). The number Cv of the decompression codes is used to update the continuation counter value Ca (step S5503) and the procedure goes to step S5504.

On the other hand, if Ca≤3 at step S5501 (step S5501: YES), the procedure goes to step S5504. At step S5504, it is determined whether Ca=0 (step S5504). If not Ca=0 (step S5504: NO), the sequences of "0000 . . . 0" (16 zeros) in the buffer are used as the decompression codes. In this case, one or two depression codes are acquired.

The compressed codes corresponding to these decompression codes are read from the second leaf area 3612 of the area-E compression structure 3600 for the conversion to the compressed codes (step S5505). The continuation counter value Ca is reset (Ca=0) (step S5506) and the procedure goes to step S5409. On the other hand, if Ca=0 at step S5504 (step S5504: YES), the procedure goes back to step S5409.

The area-B to area-E decompression structures 3700 to 4000 are used in the decompression process. The decompression structure to be used is dependent on the divided area to which the selected character data belongs to.

FIG. 56 is an explanatory diagram of a mask pattern table 5600. Mask patterns are used for identifying a compressed code string at the time of decompression. The mask patterns are used depending on bit address values of 0 to 7.

An example of decompression of the compressed code string will be described. The example of decompression will be described for the compressed code string of the appearance bit string related to the character data of the area C by way of example.

FIGS. 57A to 57H are an explanatory diagram of an example of decompression of the compressed code string of the appearance bit string related to the character data of the area C. First, in FIG. 57A, the compressed code string is set in the 32-bit register. Because of the initial state, a bit counter, a byte address, and a bit address value Abi are all set to "0".

Since the bit address value Abi is Abi=0, a mask pattern (0xF0000000) is set by reference to the mask pattern table 5600. The byte address is a quotient when the bit counter value is divided by eight and the bit address is the remainder. The mask process (logical multiplication) is executed with the mask pattern (0xF0000000) for the compressed code string set in the register.

In FIG. 57B, a leaf/node number matching the 4-bit code "1001" of the mask process result (AND result) of FIG. 57A is identified from the root area 3802 of the area-C decompression structure 3800. In this case, the leaf number 9 (=1001) is identified and a pointer to the decompression code "0000 . . . 0" (16 zeros) is read to point the second leaf area 3806. As a result, the decompression code "0000 . . . 0" (16 zeros) is read from the second leaf area 3806 for the conversion to the decompression code. Since the compressed code length "3" is also read, the bit counter is set to +3 and the byte address and the bit address are calculated.

Since the bit address value Abi is Abi=3, a mask pattern (0xF0000000) is set by reference to the mask pattern table 5600. The mask process (logical multiplication) is executed with the mask pattern (0x1E000000) for the compressed code string set in the register.

In FIG. 57C, a leaf/node number matching the 4-bit code "1111" of the mask process result (AND result) of FIG. 57B is identified from the root area 3802 of the area-C decompression structure 3800. In this case, the node number F (=1111) is identified and a pointer to the node N(F) is read to point to the second node area 3804. If a node is pointed instead of a leaf as above, since the compressed code length is unidentifiable, the bit counter is set to +4 and the byte address and the bit address are calculated.

Since the bit address value Abi is Abi=7, a mask pattern (0xF0000000) is set by reference to the mask pattern table 5600. The mask process (logical multiplication) is executed with the mask pattern (0x1E000000) for the compressed code string set in the register.

In FIG. 57D, the 4-bit code "1001" is acquired as the mask process result (AND result) of FIG. 57C. Since the second node area 3804 is pointed by the node number F (=1111) in FIG. 57C, the leaf number F9 (=11111001) is identified. Therefore, a pointer corresponding to the leaf number F9 is read from the second node area 3804 of the area-C decompression structure 3800 to point the fist leaf area 3805. As a result, the decompression code "1011" is read from the first leaf area 3805 for the conversion to the decompression code. Although the compressed code length "8" is also read, the bit counter is set to +(8−4) to compensate for +4 added in FIG. 57C, and the byte address and the bit address are calculated.

Since the byte address is incremented by +1, the compressed code string in the register is shifted by eight bits. Since the bit address value Abi is Abi=3, a mask pattern (0x1E000000) is set by reference to the mask pattern table 5600. The compressed code string set in the register after the 8-bit shift is subjected to the mask process (logical multiplication) with the mask pattern "0x1E000000".

In FIG. 57E, a leaf/node number matching the 4-bit code "1001" of the mask process result (AND result) of FIG. 57D is identified from the root area 3802 of the area-C decompression structure 3800. In this case, the leaf number B (=1011) is identified and a pointer to the decompression code "0010" is read to point the first leaf area 3805. As a result, the decompression code "0010" is read from the first leaf area 3805 for the conversion to the decompression code. Since the compressed code length "4" is also read, the bit counter is set to +4 and the byte address and the bit address are calculated.

Since the bit address value Abi is Abi=7, a mask pattern (0xF0000000) is set by reference to the mask pattern table 5600. The mask process (logical multiplication) is executed with the mask pattern (0x1E000000) for the compressed code string set in the register.

In FIG. 57F, a leaf/node number matching the 4-bit code "0101" of the mask process result (AND result) of FIG. 57E is identified from the root area 3802 of the area-C decompression structure 3800. In this case, the leaf number 5 (=0101) is identified and a pointer to the decompression code "0000" is read to point the first leaf area 3805. As a result, the decompression code "0000" is read from the first leaf area 3805 for the conversion to the decompression code. Since the compressed code length "1" is also read, the bit counter is set to +1 and the byte address and the bit address are calculated.

Since the bit address value Abi is Abi=0, a mask pattern (0xF0000000) is set by reference to the mask pattern table 5600. The mask process (logical multiplication) is executed with the mask pattern (0x1E000000) for the compressed code string set in the register.

In FIG. 57G, a leaf/node number matching the 4-bit code "1010" of the mask process result (AND result) of FIG. 57F is identified from the root area 3802 of the area-C decompression structure 3800. In this case, the leaf number A (=1010) is identified and a pointer to the decompression code "0000" is read to point the first leaf area 3805. As a result, the decompression code "0001" is read from the first leaf area 3805 for the conversion to the decompression code. Since the compressed code length "4" is also read, the bit counter is set to +4 and the byte address and the bit address are calculated.

Since the bit address value Abi is Abi=4, a mask pattern (0xF0000000) is set by reference to the mask pattern table

5600. The mask process (logical multiplication) is executed with the mask pattern (0x1E000000) for the compressed code string set in the register.

Since the compression code string in the register is short of one bit in FIG. 57H, "0" is added ("1" is also available) as a dummy (depicted by using an underscore in FIG. 57G). In FIG. 57G, a leaf/node number matching the 4-bit code "1000" of the mask process result (AND result) of FIG. 57F is identified from the root area 3802 of the area-C decompression structure 3800. In this case, the leaf number 8 (=1000) is identified and a pointer to the decompression code "0000 . . . 0" (16-bit consecutive zeros) is read to point the second leaf area 3806. As a result, the decompression code "0000 . . . 0" (16-bit consecutive zeros) is read from the second leaf area 3806 for the conversion to the decompression code.

Figure 57:
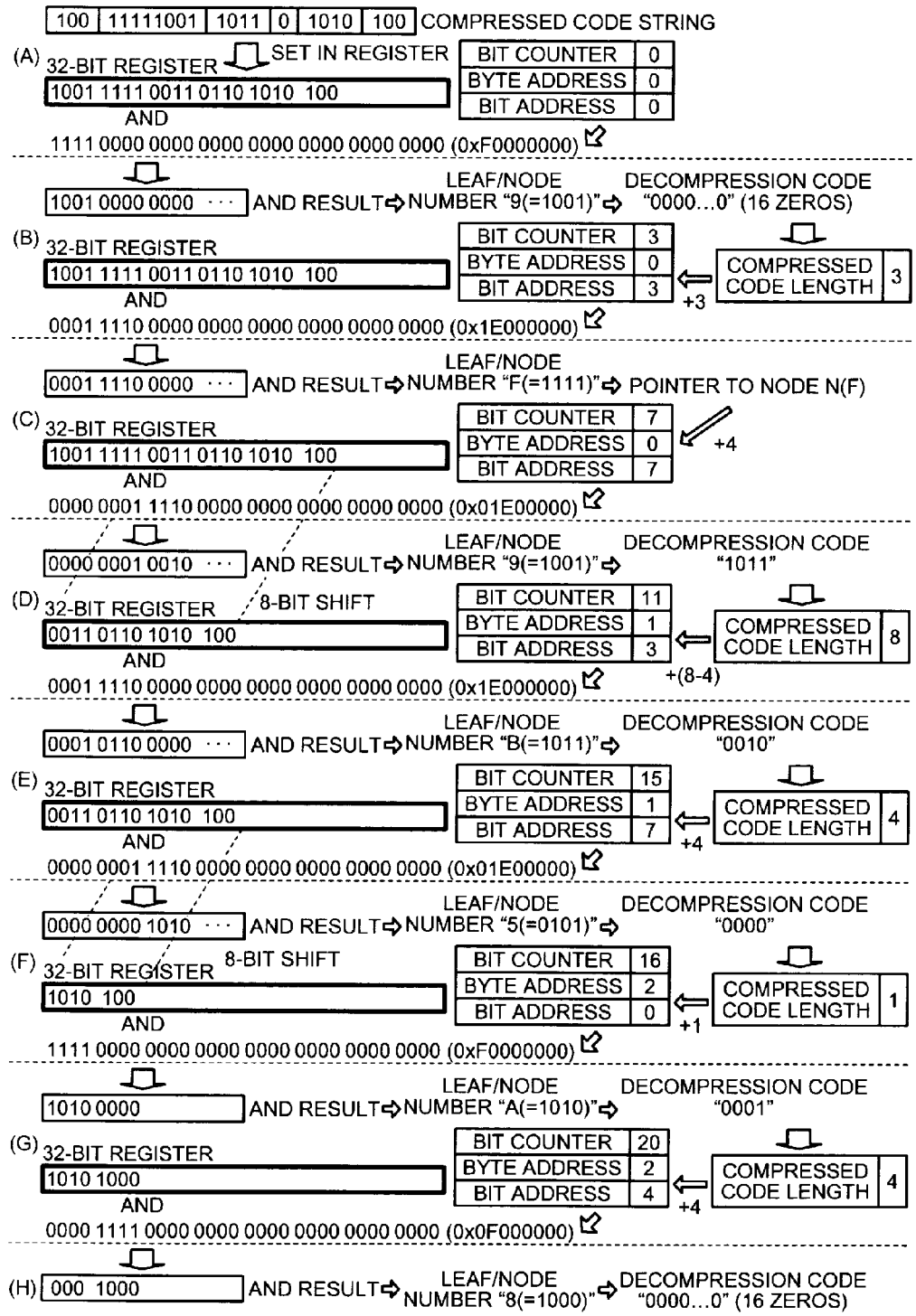
FIG. 57 (A to H) is an explanatory diagram of an example of decompression of the compressed code string of the appearance bit string related to the character data of the area C.
Figure 58:
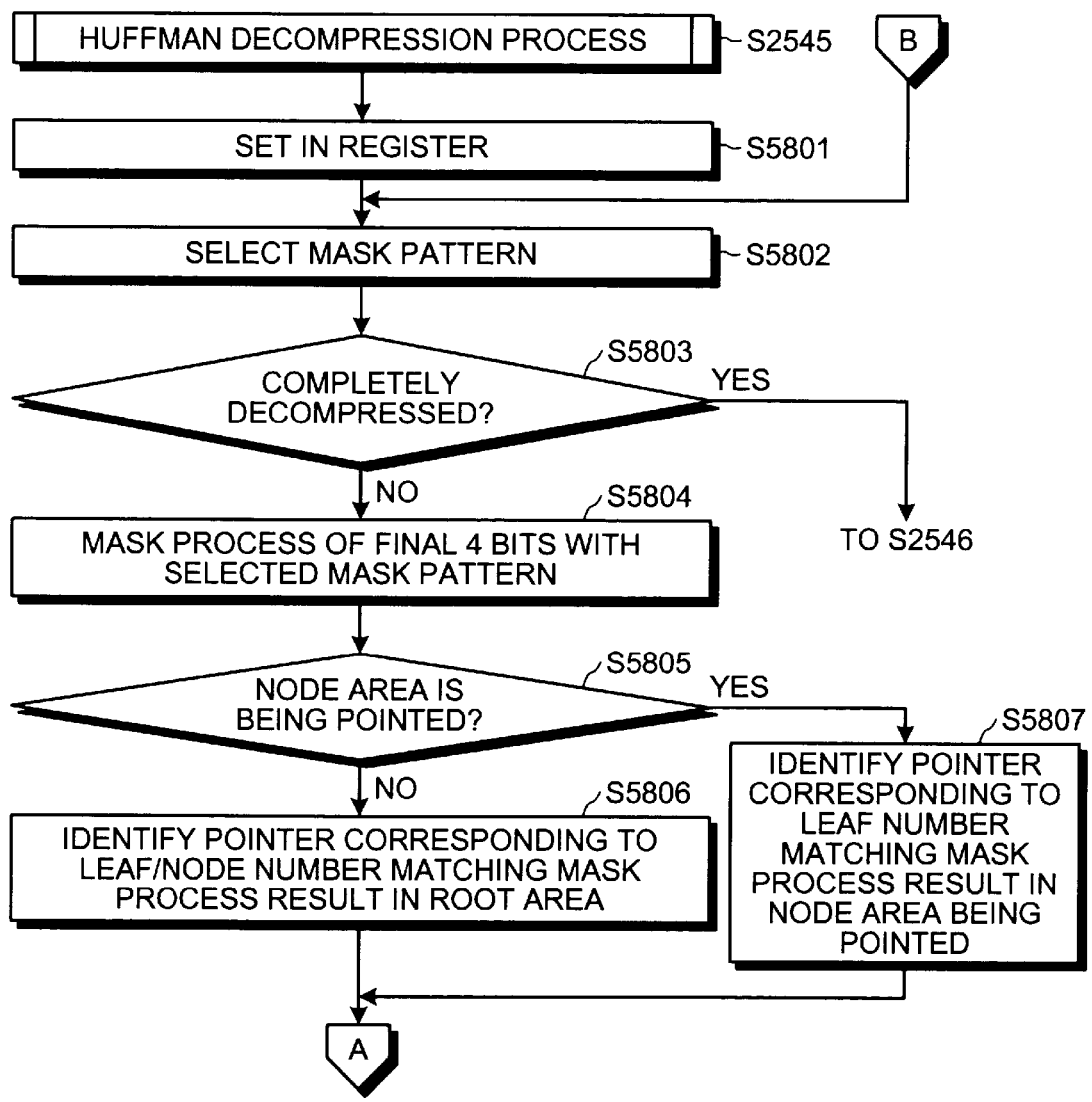

FIGS. 58 and 59 are flowcharts of the decompression process procedures to the appearance map in the second embodiment. In these flowcharts, the compression process as depicted in FIG. 57 is automatically executed in the Huffman decompression (step S2545) of FIG. 25B.

The bit counter, the byte address, and the bit address are all zero in the default state. The compressed code string of the appearance bit string of the selected character data is set in the register (step S5801) and a mask pattern corresponding to the bit address is selected from the mask pattern table 5600 (step S5802).

It is determined whether the decompression is entirely performed (step S5803). This determination may be made by determining whether a dummy bit is added, whether the register is empty, or whether a mask process with a mask pattern is unable to be performed (due to absence of corresponding compression code string).

If the decompression is not entirely performed (step S5803: NO), the mask process of the final four bits is executed with the selected mask pattern (step S5804). It is determined whether the node area is being pointed (step S5805). If the node area is not being pointed (step S5805: NO), a pointer is identified that corresponds to the leaf/node number matching the mask process result (step S5806). The procedure goes to step S5901. On the other hand, if the node area is being pointed (step S5805: YES), a point is identified that corresponds to the leaf number matching the mask process result in the node area being pointed (step S5807). The procedure goes to step S5901.

In FIG. 59, it is determined whether the pointed destination is the leaf area (step S5901). If the destination is the leaf area (step S5901: YES), a corresponding decompression code is acquired (step S5902); a compressed code length L of the decompressed code is acquired (step S5903); and the procedure goes to step S5905. On the other hand, if the pointed destination is not the leaf area (step S5901: NO), since the node area is being pointed, the decompression code and the compressed code length L are unable to be acquired. Therefore, the compressed code length L is temporarily set to L=4 (step S5904) and the procedure goes to step S5905.

At step S5905, the compressed code length L is added to a bit counter value Cb to update the bit counter value Cb (step S5905). The updated bit counter value Cb is used for calculating a byte address value Aby (step S5906). It is determined whether the byte address turns to +1 (step S5907), and if turning to +1 (step S5907: YES), the compressed code string is shifted by eight bits (step S5908). The procedure goes to step S5909.

On the other hand, if not turning to +1 (step S5907: NO), the procedure goes to step S5909. At step S5909, the bit address value Abi is calculated (step S5909). The procedure goes back to step S5802. If the decompression is entirely performed at step S5803 of FIG. 58 (step S5803: YES), the procedure goes back to step S2546.

As above, in the second embodiment, the Huffman tree depending on the appearance rate may be selected by using the appearance rate of each character data as the compression parameter. The special Huffman tree having a longer special symbol string may be selected when the appearance rate is lower. On the other hand, the normal Huffman tree may be selected rather than the special Huffman tree when the appearance rate is higher. Therefore, the compression efficiency of the appearance map 904 may be improved.

Wasteful compression processes may be prevented by not compressing the divided areas with poor compression efficiencies without allocating the Huffman trees to achieve the acceleration of the compression speed. The amount of the Huffman trees may be reduced to a half by making the divided areas symmetrical relative to the boundary at the appearance probability of 50%. Therefore, the memory saving may be implemented.

The appearance map 904 stored in a mini SD or HD is efficiently compressed by using the special Huffman tree. Since the special Huffman tree has the NULL sequence symbol string having 4-bit boundaries added to the 4-bit normal Huffman tree, the high-speed compression/decompression may be implemented with a slow CPU or a small memory mounted on mobile terminals such as portable telephones.

Although the 16-branch Huffman tree having n=4 is used in the second embodiment, not only n=4 but also 2n-branch (n=2, 3, . . . ) Huffman trees are applicable. In this case, the compression/decompression may be performed by changing the bit length of the decompression code, the compressed code, and the compressed code length depending on a value of n.

Although the descriptions are made by taking an example of an HTML file as a file to be retrieved in all the above embodiments, the file may be described in not only HTML but also other markup languages such as XML. Although the consecutive characters are replaced with the non-standard characters, the consecutive characters may be replaced with not only the consecutive characters but also tags of HTML or HML included in the file to be retrieved and may be included in the substitution table. As a result, the compression rate of the file to be retrieved may further be improved.

As described, the embodiments realize improved compression rate, security, and the speed of a full-text search of contents.

According to embodiments, instead of the file to be retrieved, a group of the bit strings used for narrowing down the files to be retrieved (corresponding to an appearance map) may be compressed by a normal Huffman tree.

Further, an appearance rate of each character data, i.e., a rate of the number of ON bits to the number of total bits may be used as a compression parameter.

According to the embodiments, if a bit string includes a symbol string having a series of symbols meaning that no character data appears, the compression may more efficiently be performed than the normal Huffman tree.

According to the embodiments, the special Huffman tree having a longer special symbol string may be selected when the appearance rate is lower.

Further, the special Huffman tree having a shorter special symbol string may be selected when the appearance rate is higher.

Moreover, the normal Huffman tree may be selected rather than the special Huffman tree when the appearance rate is higher.

According to the embodiments, compression may be prevented in a divided area having a poor compression efficiency to achieve improved compression speed.

According to the embodiments, the same Huffman tree may be shared between one divided area and another divided area.

According to the embodiments, an effect is achieved whereby compression/decompression is performed efficiently in a resource saving environment such as a slow PC, a small memory, or a small disk space.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable recording medium storing therein an information retrieval program that causes a computer to execute, with respect to content consisting of files, a retrieval process in which files to be retrieved are narrowed down by using a bit string for each character in the files to find characters making up a retrieval keyword to retrieve a keyword identical to or related to the retrieval keyword in the files to be retrieved, the bit strings being indicative of the presence of the characters in the files, the information retrieval program causing the computer to execute:

acquiring an appearance rate representative of a rate of files that include the character to be compressed among the files to be retrieved;

extracting, from among the bit strings, a bit string of an arbitrary character having the acquired appearance rate;

extracting, from a Huffman tree group having a plurality of types of special Huffman trees, a special Huffman tree corresponding to the acquired appearance rate, each type of special Huffman tree having a different number of bits of special symbol strings, the special Huffman tree having leaves of a plurality of types of symbol strings covering patterns represented by a predetermined number of bits and a special symbol string having a number of bits greater than the predetermined number of bits; and compressing the extracted bit string, by using the extracted special Huffman tree, wherein a range of appearance probability is divided into areas according to the special Huffman trees, and when an appearance probability identified by a divided area of a first special Huffman tree is set lower than an appearance probability identified by a divided area of a second special Huffman tree having a leaf of a special symbol string having a number of bits greater than the special symbol string of the first special Huffman tree, the extracting of the special Huffman tree includes extracting the special Huffman tree belonging to the divided area including the appearance rate.

2. The computer-readable recording medium according to claim 1, wherein the special symbol string is a symbol string having consecutive symbols indicating that the character data does not appear.

3. The computer-readable recording medium according to claim 1, wherein the divided areas of the first special Huffman tree are set wider than the divided areas of the second special Huffman tree.

4. The computer-readable recording medium according to claim 1, wherein:

the Huffman tree group includes a normal Huffman tree having only leaves of the plurality of types of the symbol strings, and when an appearance probability identified by a divided area of the normal Huffman tree is set higher than the highest appearance probability identified by a divided area of a special Huffman tree, the extracting includes extracting the normal Huffman tree, when the divided area including the appearance rate is the divided area of the normal Huffman tree.

5. The computer-readable recording medium according to claim 1, wherein when an appearance probability identified by a divided area not used by any Huffman tree for compression is set higher than an appearance probability identified by a divided area of a normal Huffman tree, the compressing includes not compressing the bit string, when the divided area including the acquired appearance rate is the divided area not used by any Huffman tree.

6. The computer-readable recording medium according to claim 1, wherein when the range of the appearance probability is divided symmetrically relative to a boundary at an appearance probability of 50% to make pairs of corresponding divided areas, the extracting includes, when the acquired appearance rate is equal to or greater than 50%, extracting from the Huffman tree group, a Huffman tree for a divided area corresponding to the divided area including the appearance rate and having the appearance probability equal to 0% or more and less than 50%, and the compressing includes compressing an inverted bit string of the extracted bit string, by using the extracted Huffman tree for the divided area corresponding to the divided area including the appearance rate.

7. The computer-readable recording medium according to claim 1, wherein the Huffman tree is a $2^n$-branch ($n \geq 2$) Huffman tree.

8. The computer-readable recording medium according to claim 7, wherein:

the Huffman tree has a structure for compression, the structure for compression storing a first symbol string allocated a compressed code with respect to one leaf number among leaf numbers identifying leaves of the Huffman tree, and a second symbol string allocated a compressed code that includes a common symbol that is for a plurality of leaf numbers and has an appearance probability higher than the first symbol string, and the compressing includes compressing a bit string matching the first or the second symbol string into a compressed code of the symbol string matching the bit string, by using the structure for compression.

9. The computer-readable recording medium according to claim 8, wherein:

the Huffman tree has a structure for decompression, the structure for decompression having a root area storing a pointer to a symbol string of a leaf from a root of the Huffman tree, the pointer being correlated with the leaf number, and a leaf area that stores a symbol string of the destination indicated by the pointer, and the information retrieval program further causes the computer to execute:

decompressing the compressed code string by extracting the leaf number from the compressed code string, identifying the pointer of the symbol string from the root area in the structure for decompression, and identifying the symbol string of the destination indicated by the pointer from the root area in the structure for decompression to decompress.

10. The computer-readable recording medium according to claim 9, wherein:

the root area of the structure for decompression further stores a pointer that points to a node from the root of the Huffman tree and is correlated with a node number, the structure for decompression further has a node area that stores a pointer that points to a symbol string of a leaf from a node in the Huffman tree and is correlated with a leaf number, the leaf area of the structure for decompression stores a symbol string of the destination of the pointer stored in the node area, and the decompressing includes, when the node number is extracted from the compressed code string, decompressing the compressed code string by identifying a pointer of the node from the root area in the structure for decompression, identifying a pointer to the symbol string of the destination of the pointer to the node from the node area in the structure for decompression, and identifying a symbol string of the destination of the pointer to the symbol string from the leaf area in the structure for decompression.

11. An information retrieval method comprising:

acquiring an appearance rate representative of a rate of files that include the character to be compressed among the files to be retrieved;

extracting, from among bit strings each of which is for character data in files to be retrieved and indicates the presence of the character in the files, a bit string having the acquired appearance rate;

extracting, from a Huffman tree group having a plurality of types of special Huffman trees, a special Huffman tree corresponding to the acquired appearance rate, each type of special Huffman tree having a different number of bits of special symbol strings, the special Huffman tree having leaves of a plurality of types of symbol strings covering patterns represented by a predetermined number of bits and a special symbol string having a number of bits greater than the predetermined number of bits; and compressing the extracted bit string, by using the extracted special Huffman tree, wherein a range of appearance probability is divided into areas according to the special Huffman trees, and when an appearance probability identified by a divided area of a first special Huffman tree is set lower than an appearance probability identified by a divided area of a second special Huffman tree having a leaf of a special symbol string having a number of bits greater than the special symbol string of the first special Huffman tree, the extracting of the special Huffman tree includes extracting the special Huffman tree belonging to the divided area including the appearance rate.

12. An information retrieval apparatus comprising:

a memory; and a processor that executes a program, including a method, on the memory, the method including:

acquiring an appearance rate representative of a rate of files that include the character to be compressed among the files to be retrieved;

extracting, from among bit strings each of which is for character data in files to be retrieved and indicates the presence of the character in the files, a bit string having the acquired appearance rate;

extracting, from a Huffman tree group having a plurality of types of special Huffman trees, a special Huffman tree corresponding to the acquired appearance rate, each type of special Huffman tree having a different number of bits of special symbol strings, the special Huffman tree having leaves of a plurality of types of symbol strings covering patterns represented by a predetermined number of bits and a special symbol string having a number of bits greater than the predetermined number of bits; and compressing the extracted bit string, by using the extracted special Huffman tree, wherein a range of appearance probability is divided into areas according to the special Huffman trees, and when an appearance probability identified by a divided area of a first special Huffman tree is set lower than an appearance probability identified by a divided area of a second special Huffman tree having a leaf of a special symbol string having a number of bits greater than the special symbol string of the first special Huffman tree, the extracting of the special Huffman tree includes extracting the special Huffman tree belonging to the divided area including the appearance rate.

* * * * *